US008647541B2

(12) United States Patent
Peno et al.

(10) Patent No.: US 8,647,541 B2
(45) Date of Patent: Feb. 11, 2014

(54) APPARATUSES AND METHODS FOR THE SIMULTANEOUS PRODUCTION OF MICROFIBERS AND NANOFIBERS

(75) Inventors: Ed Peno, Mission, TX (US); Roger Lipton, Austin, TX (US)

(73) Assignee: FibeRio Technology Corporation, McAllen, TX (US)

( * ) Notice: Subject to any disclaimer, the term of this patent is extended or adjusted under 35 U.S.C. 154(b) by 101 days.

(21) Appl. No.: 13/368,087

(22) Filed: Feb. 7, 2012

(65) Prior Publication Data

US 2012/0292795 A1 Nov. 22, 2012

Related U.S. Application Data

(60) Provisional application No. 61/440,219, filed on Feb. 7, 2011.

(51) Int. Cl.
*B29B 9/00* (2006.01)

(52) U.S. Cl.
USPC ..... 264/8; 264/6; 264/10; 425/8; 425/174.8 E

(58) Field of Classification Search
None
See application file for complete search history.

(56) References Cited

U.S. PATENT DOCUMENTS

| | | |
|---|---|---|
| 2,609,566 A | 9/1952 | Slayter et al. |
| 3,245,112 A | 4/1966 | Williamson |
| 3,388,194 A | 6/1968 | Vinicki |
| 3,428,724 A | 2/1969 | Billheimer |
| 3,912,799 A * | 10/1975 | Chisholm .............. 264/403 |
| 3,920,362 A | 11/1975 | Bradt |
| 4,043,331 A | 8/1977 | Martin et al. |
| 4,323,524 A | 4/1982 | Snowden |
| 4,323,525 A | 4/1982 | Bornat |
| 4,374,074 A | 2/1983 | Ueda et al. |
| 4,526,525 A | 7/1985 | Oiso et al. |
| 4,790,736 A | 12/1988 | Keuchel |
| 4,793,782 A | 12/1988 | Sullivan |
| 4,872,821 A | 10/1989 | Weiss |
| 5,066,430 A | 11/1991 | Matthews |
| 5,165,940 A | 11/1992 | Windley |
| 5,242,633 A | 9/1993 | Rook et al. |
| 5,326,241 A | 7/1994 | Rook et al. |
| 5,344,297 A | 9/1994 | Hills |
| 5,419,794 A | 5/1995 | Hauber et al. |

(Continued)

FOREIGN PATENT DOCUMENTS

| | | |
|---|---|---|
| CN | 1472373 | 2/2004 |
| DE | 102005048939 | 1/2007 |

(Continued)

OTHER PUBLICATIONS

Badrossamay et al. "Nanofiber Assembly by Rotary Jet-Spinning" Nano Lett. 2010, 10, 2257-2261.

(Continued)

*Primary Examiner* — Mary F Theisen
(74) *Attorney, Agent, or Firm* — Meyertons, Hood, Kivlin, Kowert & Goetzel, P.C.; Eric B. Meyertons

(57) ABSTRACT

Described herein are apparatuses and methods of creating fibers, such as microfibers and nanofibers. The methods discussed herein employ centrifugal forces to transform material into fibers. Apparatuses that may be used to create fibers are also described. The apparatuses and methods described herein may be used to simultaneously create microfibers and nanofibers.

26 Claims, 39 Drawing Sheets

(56) References Cited

U.S. PATENT DOCUMENTS

| | | |
|---|---|---|
| 5,441,754 A | 8/1995 | Evans, Sr. |
| 5,445,769 A * | 8/1995 | Rutkowski et al. ............... 264/8 |
| 5,447,423 A | 9/1995 | Fuisz et al. |
| 5,458,823 A | 10/1995 | Perkins et al. |
| 5,460,498 A | 10/1995 | Steel et al. |
| 5,480,598 A | 1/1996 | Gentile et al. |
| 5,556,589 A | 9/1996 | Sibal |
| 5,582,841 A | 12/1996 | Watton et al. |
| 5,622,671 A | 4/1997 | Pellegrin et al. |
| 5,667,814 A | 9/1997 | Shah |
| 5,698,146 A | 12/1997 | Schippers et al. |
| 5,718,716 A | 2/1998 | Goddard et al. |
| 5,785,996 A | 7/1998 | Snyder |
| 5,911,942 A | 6/1999 | Fofonoff et al. |
| 5,939,120 A | 8/1999 | Bogue et al. |
| 6,110,590 A | 8/2000 | Zarkoob et al. |
| 6,128,929 A * | 10/2000 | Peterson et al. ................ 65/521 |
| 6,159,597 A | 12/2000 | Meerman et al. |
| 6,216,430 B1 | 4/2001 | Oppermann |
| 6,221,487 B1 | 4/2001 | Luo et al. |
| 6,235,392 B1 | 5/2001 | Luo et al. |
| 6,382,526 B1 | 5/2002 | Reneker et al. |
| 6,511,930 B1 | 1/2003 | Luo et al. |
| 6,524,514 B1 | 2/2003 | Volokitin et al. |
| 6,548,166 B2 | 4/2003 | Figuly et al. |
| 6,596,033 B1 | 7/2003 | Luo et al. |
| 6,682,677 B2 | 1/2004 | Lobovsky et al. |
| 6,713,011 B2 | 3/2004 | Chu et al. |
| 6,753,454 B1 | 6/2004 | Smith et al. |
| 6,783,708 B2 | 8/2004 | Konishi |
| 6,787,090 B2 | 9/2004 | Dalton et al. |
| 6,843,902 B1 | 1/2005 | Penner et al. |
| 6,852,410 B2 | 2/2005 | Veedu et al. |
| 6,858,168 B1 | 2/2005 | Vollrath et al. |
| 6,872,311 B2 | 3/2005 | Koslow |
| 6,904,745 B2 | 6/2005 | Badiali et al. |
| 7,018,188 B2 | 3/2006 | James et al. |
| 7,032,664 B2 | 4/2006 | Lord et al. |
| 7,036,592 B2 | 5/2006 | Nguyen et al. |
| 7,056,455 B2 | 6/2006 | Matyjaszewski et al. |
| 7,056,849 B2 | 6/2006 | Wan et al. |
| 7,067,444 B2 | 6/2006 | Luo et al. |
| 7,118,698 B2 | 10/2006 | Armantrout et al. |
| 7,127,294 B1 | 10/2006 | Wang et al. |
| 7,134,857 B2 | 11/2006 | Andrady et al. |
| 7,146,792 B2 | 12/2006 | Badiali et al. |
| 7,169,374 B2 | 1/2007 | Siochi et al. |
| 7,186,474 B2 | 3/2007 | Jang |
| 7,208,546 B2 | 4/2007 | Rajagopalan et al. |
| 7,288,306 B2 | 10/2007 | Kersey |
| 7,316,723 B2 | 1/2008 | Chung et al. |
| 7,332,050 B2 | 2/2008 | Kim |
| 7,655,175 B2 | 2/2010 | Michael et al. |
| 7,691,168 B2 | 4/2010 | Fox et al. |
| 7,763,228 B2 | 7/2010 | Oya et al. |
| 7,857,608 B2 | 12/2010 | Fabbricante et al. |
| 7,901,195 B2 | 3/2011 | Fabbricante et al. |
| 7,931,456 B2 | 4/2011 | Bryner et al. |
| 8,110,136 B2 | 2/2012 | Takahashi et al. |
| 8,163,227 B2 | 4/2012 | Sumida et al. |
| 8,277,711 B2 | 10/2012 | Huang et al. |
| 8,303,874 B2 | 11/2012 | Marshall et al. |
| 2002/0106509 A1 | 8/2002 | Figuly et al. |
| 2004/0076661 A1 | 4/2004 | Chu et al. |
| 2004/0096533 A1 | 5/2004 | Dubson et al. |
| 2005/0054830 A1 | 3/2005 | Islam et al. |
| 2005/0081506 A1 | 4/2005 | Badiali et al. |
| 2005/0136253 A1 | 6/2005 | Michael et al. |
| 2005/0163955 A1 | 7/2005 | Schaefer et al. |
| 2006/0024399 A1 | 2/2006 | Chang et al. |
| 2006/0048355 A1 | 3/2006 | Kim |
| 2006/0049542 A1 | 3/2006 | Chu et al. |
| 2006/0091582 A1 | 5/2006 | James et al. |
| 2006/0228435 A1 | 10/2006 | Andrady et al. |
| 2007/0023958 A1 | 2/2007 | LaVietes et al. |
| 2007/0057414 A1 | 3/2007 | Hartge |
| 2007/0184079 A1 | 8/2007 | Gabbay |
| 2008/0023888 A1 | 1/2008 | Brang et al. |
| 2008/0029617 A1 | 2/2008 | Marshall et al. |
| 2008/0050304 A1 | 2/2008 | Oya et al. |
| 2008/0136054 A1 | 6/2008 | Fabbricante et al. |
| 2008/0211121 A1 | 9/2008 | Lai et al. |
| 2008/0242171 A1 | 10/2008 | Huang et al. |
| 2009/0020921 A1 | 1/2009 | Cakmak et al. |
| 2009/0042475 A1 | 2/2009 | Pourdeyhimi |
| 2009/0102100 A1 | 4/2009 | Hellring et al. |
| 2009/0155326 A1 | 6/2009 | Mack et al. |
| 2009/0160099 A1 | 6/2009 | Huang |
| 2009/0162468 A1 | 6/2009 | Barinov et al. |
| 2009/0232920 A1 | 9/2009 | Lozano et al. |
| 2009/0269429 A1 | 10/2009 | Lozano et al. |
| 2009/0280207 A1 | 11/2009 | Lozano et al. |
| 2009/0280325 A1 | 11/2009 | Lozano et al. |
| 2010/0233115 A1 | 9/2010 | Patel et al. |
| 2010/0285291 A1 | 11/2010 | Reibel et al. |
| 2011/0156319 A1 | 6/2011 | Kurokawa et al. |
| 2012/0056342 A1 * | 3/2012 | Koslow ............................ 264/8 |
| 2012/0135448 A1 | 5/2012 | Parker et al. |
| 2012/0292796 A1 | 11/2012 | Peno |
| 2012/0292810 A1 | 11/2012 | Peno |
| 2012/0294966 A1 | 11/2012 | Peno |
| 2012/0295021 A1 | 11/2012 | Peno |
| 2012/0304613 A1 | 12/2012 | Peno |

FOREIGN PATENT DOCUMENTS

| | | |
|---|---|---|
| EP | 0003908 | 9/1979 |
| EP | 0306033 | 3/1989 |
| EP | 0709035 | 5/1996 |
| EP | 1673493 | 7/2009 |
| JP | 2001073222 | 3/2001 |
| JP | 2009270221 | 11/2009 |
| KR | 20040052685 | 6/2004 |
| WO | 03042436 | 5/2003 |
| WO | 2004056716 | 7/2004 |
| WO | 2005042813 | 5/2005 |
| WO | 2008077349 | 7/2008 |
| WO | 2008121338 | 10/2008 |
| WO | 2009079523 | 6/2009 |
| WO | 2010132636 | 11/2010 |
| WO | 2012068402 | 5/2012 |
| WO | 2013/096672 | 6/2013 |

OTHER PUBLICATIONS

Champion et al. "Making Micro- and Nanoparticles of Complex Shapes" PNAS, 104:11901-11904, 2007.
"Cotton Candy Express" Available at http://cottoncandyexpress.com/resimachine, Jun. 8, 2009.
Dauner "Centrifuge Spinning—An Economic Alternative to Electrospinning" Nano-Cluster Bodensee, NanoEurope 2006, Sep. 14, 2006.
Foster et al. "Centrifugally Spun Polyhydroxybutyrate Fibres: Accelerated Hydrolytic Degredation Studies" Polymer Degradation and Stability, 87(1), 2005, 1-10. (Abstract).
Greensfelder "Nanofibers Created in Orderly Fashion"UC Berkeley Press Release, Jun. 1, 2009.
"Manufacturing: Synthetic and Cellulosic Fiber Formation Technology", Fibersource.com, Aug. 23, 2007.
Mellado et al. "A simple model for nanofiber formation by rotary jet-spinning" Applied Physics Letters 99, 203107 (2011).
"Nonwovens Interactive", Jun. 8, 2009.
Patel et al. "Novel Preparation Method of Silicon Carbide Nanofibers by Use of Polymer Blend and Melt Spinning Techniques" Journal of Ceramic Society of Japan, 112:S901-S903, 2004.
Quintero et al. "Rapid Production of Ultralong Amorphous Ceramic Nanofibers by Laser Spinning" App. Physics Let, 90:153109, 2007.
Rodriguez et al. "Preparation of Electrospun Chitosa-PEO Fibers" Bioengineering Conference, 2006, Proceedings of the IEEE 32nd Annual Northeast, 87-88, Apr. 2006.
Teo et al. "A Review on Electrospinning Design and Nanofiber Assemblies" Nanotechnology, 17:R89-R106, 2006.

(56) References Cited

OTHER PUBLICATIONS

Warner et al. "Cost Effective Nanofiber Formation: Melt Electrospinning" National Textile Center Annual Report, Nov. 2005.
Weitz et al. "Polymer Nanofibers Via Nozzle-Free Centrifugal Spinning" Nano Letters, 8:1187-1191, 2008.
International Search Report and Written Opinion for PCT Application No. PCT/US2009/037277, Dec. 17, 2009.
International Preliminary Report on Patentability for PCT Application No. PCT/US2009/037277, Apr. 20, 2010.
International Search Report and Written Opinion for PCT Application No. PCT/US2009/037275, Jul. 8, 2009.
International Preliminary Report on Patentability for PCT Application No. PCT/US2009/037275, Jul. 8, 2009.
International Search Report and Written Opinion for PCT Application No. PCT/US2009/037284, May 12, 2009.
International Preliminary Report on Patentability for PCT Application No. PCT/US2009/037284, May 12, 2009.
International Search Report and Written Opinion for PCT Application No. PCT/US2009/037288, May 18, 2009.
International Preliminary Report on Patentability for PCT Application No. PCT/US2009/037288, May 18, 2009.
International Search Report and Written Opinion for PCT Application No. PCTUS2012028503 issued Oct. 23, 2012.
International Search Report and Written Opinion for PCT Application No. PCTUS2012024109 issued Sep. 26, 2012.
International Search Report and Written Opinion for PCT Application No. PCTUS2012024154 issued Feb. 7, 2012.
International Search Report and Written Opinion for PCT Application No. PCTUS2012024103 issued Sep. 26, 2012.
International Search Report and Written Opinion for PCT Application No. PCTUS2012024142 issued Jan. 2, 2013.
International Search Report and Written Opinion for PCT Application No. PCTUS2012024145 issued Sep. 27, 2012.
Supplemental European Search Report for EP2257660 issued Nov. 25, 2011.
Supplemental European Search Report for EP2268467 issued Nov. 25, 2011.
Supplemental European Search Report for EP2271796 issued Nov. 28, 2011.
Supplemental European Search Report for EP2265752 issued Nov. 25, 2011.
Office Action for U.S. Appl. No. 12/404,907 issued Jan. 11, 2013.
Office Action for U.S. Appl. No. 12/404,937 issued Jun. 6, 2011.
Office Action for U.S. Appl. No. 12/404,937 issued Nov. 10, 2011.
Office Action for U.S. Appl. No. 12/404,937 issued Feb. 21, 2013.
Office Action for U.S. Appl. No. 12/404,948 issued Jun. 9, 2011.
Office Action for U.S. Appl. No. 12/404,948 issued Dec. 1, 2011.
Office Action for U.S. Appl. No. 12/404,970 issued Jun. 6, 2011.

* cited by examiner

APPARATUSES AND METHODS FOR THE SIMULTANEOUS PRODUCTION OF MICROFIBERS AND NANOFIBERS

PRIORITY CLAIM

This application claims the benefit of U.S. Provisional Application No. 61/440,219 filed on Feb. 7, 2011.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

Described herein are apparatuses and methods of creating fibers, such as microfibers and nanofibers. The methods discussed herein employ centrifugal forces to transform material into fibers. In one embodiment a fiber producing system includes a fiber producing device and a driver capable of rotating the fiber producing device. The fiber producing device, in one embodiment, includes a body having one or more openings and a coupling member, wherein the body is configured to receive material to be produced into a fiber; and one or more nozzles coupled to one or more of the openings, wherein the one or more nozzles comprise a nozzle orifice. The body of the fiber producing device is couplable to the driver through the coupling member. During use rotation of the fiber producing device coupled to the driver causes material in the body to be passed through one or more openings, into one or more nozzles, and ejected through one or more nozzle orifices to produce microfibers and/or nanofibers. In some embodiments, fiber producing system may be configured to substantially simultaneously produce microfibers and nanofibers.

The nozzles of the fiber producing device, in one embodiment, are removably couplable to the body. Alternatively, nozzles of the fiber producing device may be an integral part of the body. A sealing ring may be positioned between one or more of the nozzles and the body to help maintain a secure fitting between the nozzle and the body. In one embodiment, the body includes a locking system used to couple one or more nozzles to the openings, wherein the locking system locks the coupled nozzles in a predetermined orientation with respect to the body.

A nozzle may be removably couplable to a fiber producing device. Alternatively, a nozzle may be formed on a sidewall of the body of the fiber producing device such that the body and nozzle are formed from a single, unitary material. Alternatively, an opening extending through the sidewall may be formed at the junction of a pair of joined circular plates that have an alignment ring or pins. A nozzle may include a nozzle body, the nozzle body defining an internal cavity and having a proximal end and a distal end, wherein the proximal end comprises a coupling portion that allows the nozzle to be coupled to a fiber producing device. The coupling portion of the nozzle, may, in one embodiment, be a threaded end which mates with a corresponding threaded portion of the fiber producing device. A nozzle tip may be coupled to the distal end of the nozzle body, wherein the nozzle tip has an internal diameter that is less than the internal diameter of the nozzle body. The nozzle body includes an opening extending through a wall of the nozzle body, the nozzle tip being aligned with the nozzle opening such that material disposed in the nozzle body passes through the opening into the nozzle tip during use. The internal diameter of the nozzle tip may be set such that microfibers and/or nanofibers are produced when material is ejected through the nozzle tip when the nozzle is coupled to a fiber producing device.

In an embodiment, the nozzle tip and the nozzle body are formed from a single, unitary material. Alternatively, the nozzle tip may be removably couplable to the nozzle body. A nozzle may have a length of at least about 2 mm. An internal diameter of the nozzle tip may be less than about 1 mm. A portion of the interior wall of the nozzle body is substantially flat and another portion of the interior wall of the nozzle body is angled and/or rounded from the flat portion toward the opening formed in the nozzle body. In one embodiment, a nozzle tip may have an angled and/or rounded nozzle outlet end. A nozzle may have a non-cylindrical outer surface. In one embodiment, a nozzle has an outer surface having a tapered edge. During rotation of the body, gasses contact the tapered edge of the nozzle, creating a region of negative pressure on the side opposite to the tapered edge.

One or more outlet conduits may couple one or more nozzles to one or more openings. Outlet conduits may have a length to help set the material diameter before ejection from the nozzle (e.g., from 1 mm to about 10 mm, or about 2 mm to about 7 mm, or about 5 mm). Nozzles may include a nozzle orifice.

The body of the fiber producing device comprises one or more sidewalls and a top together defining an internal cavity, wherein one or more openings extend through a sidewall of the body, communicating with the internal cavity. In an embodiment, an interior surface of the sidewall is angled from a bottom wall toward one or more of the openings. In an alternate embodiment, an interior surface of the sidewall is rounded from a bottom wall toward one or more of the openings. An interior surface of the sidewall may have an oval shape such that the long axis of the oval interior sidewall is in alignment with one or more of the openings.

The driver may be positioned below the fiber producing device or above the fiber producing device, when the fiber producing device is coupled to the driver. The driver may be capable of rotating the fiber producing device at speeds of greater than about 1000 RPM In one embodiment, a heating device is thermally coupled to the fiber producing device. In an embodiment, a fluid level sensor is coupled to the fiber producing device, the fluid level sensor being positioned to detect a level of fluid inside the fiber producing device.

The fiber producing device may be enclosed in a chamber, wherein the environment inside the chamber is controllable. A fiber producing system may include a collection system surrounding at least a portion of the fiber producing device, wherein fibers produced during use are at least partially collected on the collection system. The collection system, in one embodiment, includes one or more collection elements coupled to a collection substrate, wherein the one or more collection elements at least partially surround the fiber producing device. In one embodiment, the collection elements comprise an arcuate or straight projection extending from the collection substrate surface.

In another embodiment a fiber producing system includes a fiber producing device and a driver capable of rotating the fiber producing device. The fiber producing device, in one embodiment, includes a body having one or more openings and a coupling member, wherein the body is configured to receive material to be produced into a fiber; and one or more needle ports coupled to one or more of the openings, wherein one or more needles are removably couplable to the needle ports during use. The body of the fiber producing device is couplable to the driver through the coupling member. During use rotation of the fiber producing device coupled to the driver causes material in the body to be ejected through one or more needles coupled to one or more needle ports to produce microfibers and/or nanofibers. In one embodiment, needles coupled to the one or more needle ports have an angled and/or rounded outlet.

In another embodiment a fiber producing system includes a fiber producing device and a driver capable of rotating the fiber producing device. The fiber producing device, in one embodiment, includes a body comprising two or more chambers and a coupling member, wherein a first chamber comprises one or more openings and is configured to receive material to be produced into a fiber; and wherein a second chamber comprises one or more openings and is configured to receive material to be produced into a fiber. The body of the fiber producing device is couplable to the driver through the coupling member. During use, rotation of the fiber producing device coupled to the driver causes material in at least the first chamber and the second chamber to be ejected through the one or more openings to produce microfibers and/or nanofibers.

In another embodiment a fiber producing system includes a fiber producing device and a driver capable of rotating the fiber producing device. The fiber producing device, in one embodiment, includes a body comprising one or more openings and a coupling member, wherein the body is configured to receive material to be produced into a fiber. The body of the fiber producing device is couplable to the driver through the coupling member. The fiber producing system further includes a collection system that collects fibers produced by the fiber producing device during use, the collection system comprising one or more collecting elements coupled to a collection element substrate, wherein one or more collection elements comprise an arcuate projection extending from the collection element substrate. During use, rotation of the body coupled to the driver causes material in the body to be ejected through one or more openings to produce microfibers and/or nanofibers that are at least partially collected on the collecting elements.

In an embodiment, a collection system of a fiber producing system includes one or more collecting elements coupled to a collection element substrate, wherein the collection elements are positioned surrounding at least a portion of the fiber producing device, and wherein the position of the collection elements with respect to the fiber producing device is adjustable by moving the collection elements along a portion of the collection element substrate.

In another embodiment, a collection system of a fiber producing system includes one or more collecting elements coupled to a collection element substrate and a collection container, wherein the collection container at least partially surrounds the fiber producing device and wherein the collection elements are removably positionable in the collection container.

In another embodiment, a collection system of a fiber producing device is configured to collect fibers produced by the fiber producing device. During use rotation of the fiber producing device causes material in the body to be ejected through one or more openings to produce microfibers and/or nanofibers. The collection system produces a vacuum or activated a gas flow device that causes a flow of produced fibers to the collection system.

In another embodiment a fiber producing system includes a fiber producing device and a driver capable of rotating the fiber producing device. The fiber producing device, in one embodiment, includes a body comprising one or more openings and a coupling member, wherein the body is configured to receive material to be produced into a fiber. The body of the fiber producing device is couplable to the driver through the coupling member. The fiber producing system further includes a deposition system that collects fibers produced by the fiber producing device during use and directs the collected fibers toward a substrate disposed in the deposition system during use. During use, rotation of the body coupled to the driver causes material in the body to be ejected through one or more openings to produce microfibers and/or nanofibers that are at least partially transferred to the deposition system.

BRIEF DESCRIPTION OF THE DRAWINGS

Advantages of the present invention will become apparent to those skilled in the art with the benefit of the following detailed description of embodiments and upon reference to the accompanying drawings in which.

Figure 1A:
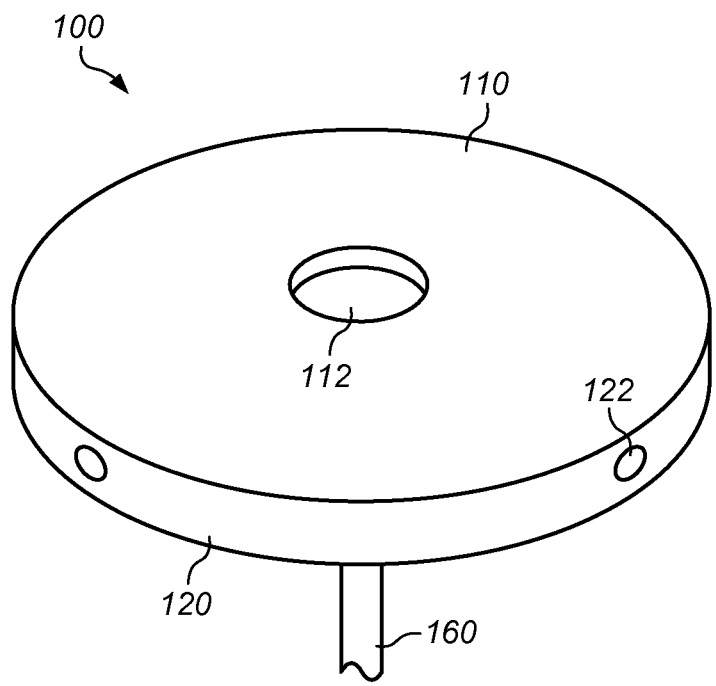
FIG. 1A depicts a perspective view of an embodiment of a fiber producing device that includes peripheral openings.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; and 2009/0280207 entitled "Superfine Fiber Creating Spinneret and Uses Thereof" to Lozano et al., all of which are incorporated herein by reference.

One embodiment of a fiber producing device is shown in FIG. 1A. Fiber producing device 100 includes a top 110 that is coupled to body 120. Body 120 acts as a reservoir which holds material to be spun into fibers. Top 110 has an opening 112 to allow introduction of material to be spun. For this type of fiber producing device, typical amounts of material range from 50-100 mL, but amounts less than this may be used as well as amounts greater than this, as the size of the reservoir and the fiber producing device may each vary. Body 120 includes one or more openings 122. A coupling member 160 is coupled to the body. Coupling member 160 may be used to couple fiber producing device 100 to a driver that is capable of rotating the fiber producing device. Coupling member 160 may be an elongated member extending from the body which may be coupled to a portion of the driver (e.g., a chuck or a universal threaded joint of the driver). Alternatively, coupling member may be a receiver which will accept an elongated member from a driver (e.g., the coupling member may be a chuck or a universal threaded joint). Suitable drivers include commercially available variable electric motors, such as a brushless DC motor.

During use, rotation of the fiber producing device causes material to be ejected through one or more openings 122 to produce fibers. In some embodiments, openings 122 may have a size and/or shape that causes the creation of microfibers and/or nanofibers as the material is ejected through the openings.

Figure 1B:
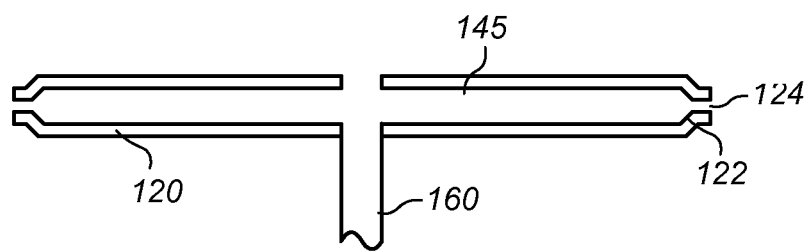
FIG. 1B depicts a cross-sectional side view of an embodiment of a fiber producing device that includes peripheral openings.

FIG. 1B depicts a cross-sectional side view of an embodiment of fiber producing device 100. Body 120 of fiber producing device 100 may further include a tip 124 coupled to one or more openings 122. Body 120 also defines an internal cavity 145 from which material flows toward openings 122 and, optionally, through tip 124. In some embodiments, tip 124 has an internal diameter that is less than the diameter of the opening. Tip 124 is coupled to an opening 122 formed in a wall of body 120 such that the tip is substantially aligned with opening. Thus, material disposed in internal cavity 145 passes through opening 122 and through tip 124 when exiting fiber producing device 100. The internal diameter and/or shape of tip 124 is selected such that microfibers and/or nanofibers are produced when the material is ejected from body 120 of a spinning fiber producing device through the tip. Tip 124 may be removably coupled to body 120. Alternatively, tip 124 and body 120 are formed from a single, unitary material such that the tip is not removable from the body, but instead is an integral part of the body.

Figure 2:
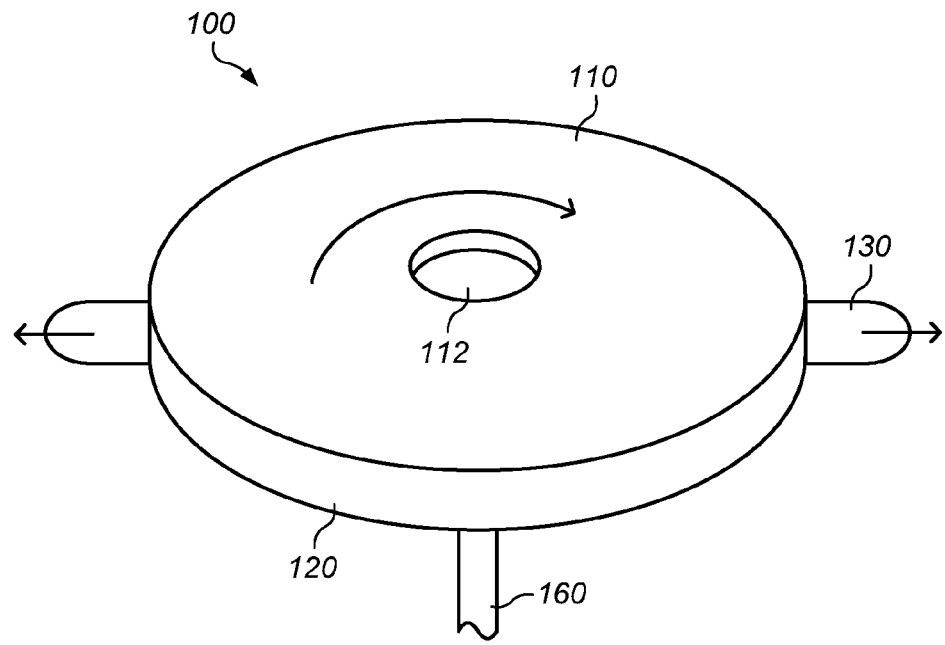
FIG. 2 depicts one or more nozzles coupled to one or more openings of a fiber producing device.
Figure 3:
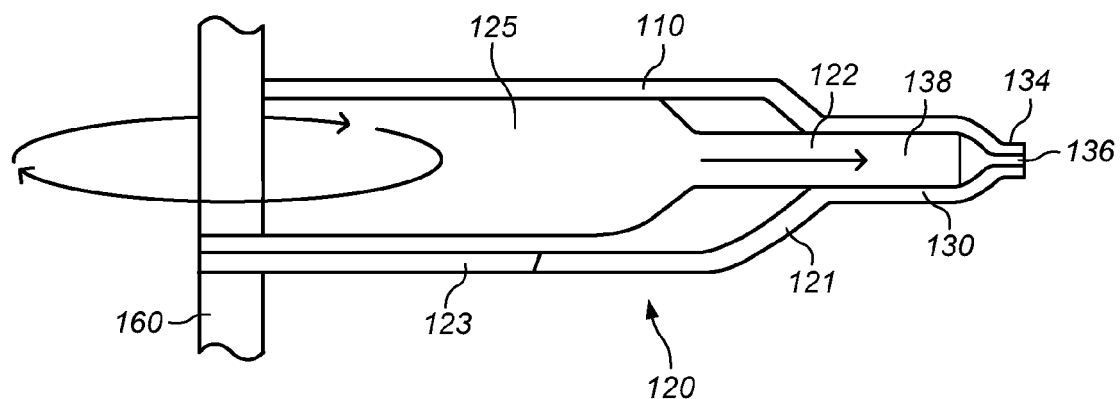
FIG. 3 shows a cross-sectional view of the fiber producing device of FIG. 2.

In an embodiment depicted in FIG. 2, one or more nozzles 130 may be coupled to one or more openings 122 of fiber producing device 100. As used herein a "nozzle" is a mechanical device designed to control the direction or characteristics of a fluid flow as it exits (or enters) an enclosed chamber or pipe via an orifice. Nozzles may have an internal cavity 138 running through the longitudinal length of the nozzle, as depicted in FIG. 3. Internal cavity 138 may be substantially aligned with opening 122 when nozzle 130 is coupled to an opening. Spinning of fiber producing device 100 causes material to pass thorough one or more of openings 122 and into one or more nozzles 130. The material is then ejected from one or more nozzles 130 through nozzle orifice 136 to produce fibers. Nozzle 130 may include a nozzle tip 134 having an internal diameter smaller than an internal diameter of nozzle internal cavity 138. In some embodiments, internal cavity 138 of nozzle 130 and/or nozzle orifice 136 may have a size and/or shape that causes the creation of microfibers and/or nanofibers by ejecting of the material through the nozzle.

It should be understood that while opposing openings are depicted, the openings may be placed in any position on the body of a fiber producing device. The position of the openings may be varied to create different kinds of fibers. In some embodiments, openings may be placed in different planes of the fiber producing device. In other embodiments, openings may be clustered in certain locations. Such alternate positioning of the openings may increase the fiber dispersion patterns and/or increase the fiber production rates. In some embodiments, the openings, regardless of the position, may accept an outlet element (e.g., a nozzle or needle).

FIG. 3 shows a cross-sectional view of fiber producing device of FIG. 2. Body 120 includes one or more sidewalls 121 and a bottom 123 which together define an internal cavity 125. In one embodiment, body 120 is substantially circular or oval and includes a singular continuous sidewall 121, for example, sidewall and bottom are a single, unitary component of the fiber producing device. Openings 122 are formed in sidewall 121 of body 120, extending through the sidewall such that the opening allows transfer of material from internal cavity 125 through the sidewall. In an embodiment, sidewall 121 is angled from bottom 123 toward one or more openings 122. Alternatively, sidewall 121 may be rounded from bottom 123 toward one or more openings 122. Having an angled or rounded sidewall extending toward one or more openings facilitates flow of material in the body toward the openings when the fiber producing device is being rotated. As the fiber producing device is rotated the material rides up the angled or rounded walls toward the openings. This minimizes the occurrence of regions where material is inhibited from traveling toward the openings.

Figure 4:
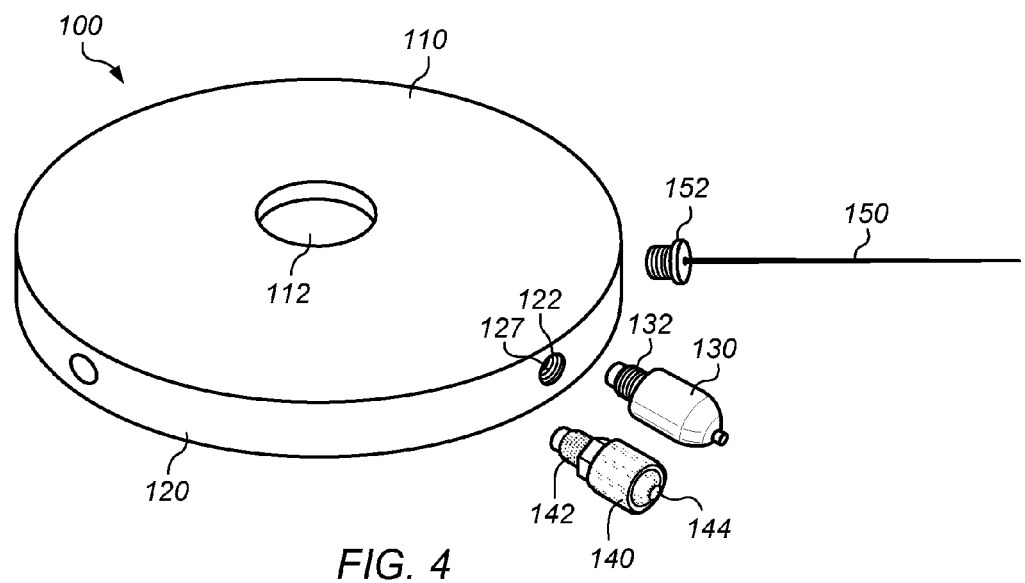
FIG. 4 shows a removably coupleable nozzle, needle port and needle that have been removed from a fiber producing device.

In an embodiment, nozzle(s) 130 may be removably coupled to body 120. For example, nozzle 130 may include a nozzle coupling portion 132 which is couplable to a corresponding coupling portion 127 of one or more of openings 122. FIG. 4 shows a removably coupleable nozzle 130 that has been removed from fiber producing device 100. In this embodiment, nozzle 130 includes a threaded coupling portion 132, which has threading that matches threading 127 formed in opening 122. Nozzle 130 may be coupled to body 120 by fastening threaded coupling portion 132 onto threading 127 of opening 122. Removably coupling a nozzle to a fiber producing device allows removal of the nozzles allowing the ability to customize the production of fibers by allowing the outlet parameters to be changed by changing the nozzle. Additionally clean up of the fiber producing device is improved by allowing the nozzle to be removed and separately cleaned.

Figure 5:
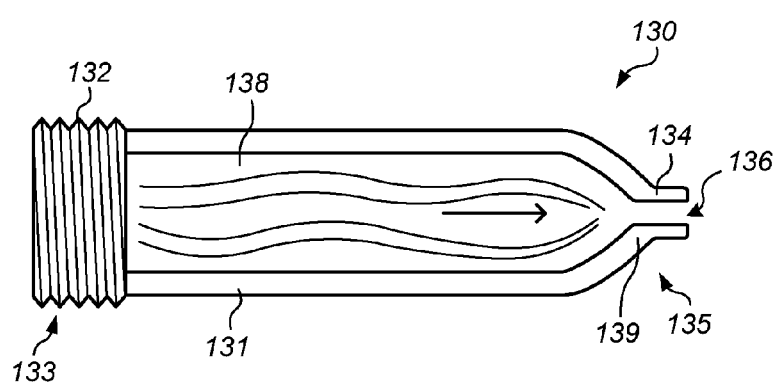
FIG. 5 depicts a cross section view of an embodiment of a nozzle that is couplable to a fiber producing device.

FIG. 5 depicts a cross section view of an embodiment of a nozzle 130 that is couplable to a body of a fiber producing device. Nozzle 130 includes a nozzle body 131 having a proximal end 133 and a distal end 135. Proximal end 133 includes a coupling portion 132 that allows nozzle 130 to be coupled to the body of a fiber producing device. Coupling portion 132 may include a threaded portion which has threading that matches threading formed in an opening of a fiber producing device.

Nozzle 130 further includes a nozzle tip 134 coupled to distal end 135 of the nozzle. Nozzle body 131 defines an internal cavity 138 through which material flows from the body of a fiber producing device toward nozzle orifice 136. In some embodiments, nozzle tip 134 has an internal diameter that is less than the diameter of internal cavity 138. Nozzle tip 134 is coupled to an opening 139 formed in a wall of nozzle body 131. Nozzle tip 134 is aligned with opening 139 such that material disposed in internal cavity 138 passes through opening 139 into the nozzle tip. The internal diameter and/or shape of nozzle tip 134 is selected such that microfibers and/or nanofibers are produced when the material is ejected form the body of a spinning fiber producing device through the nozzle.

Nozzle tip 134 may be removably coupled to nozzle body 131. Alternatively, nozzle tip 134 and nozzle body 131 are formed from a single, unitary material such that the nozzle tip is not removable from the nozzle body, but instead is an integral part of the nozzle body. Nozzle tip may be angled with respect to nozzle body. In some embodiments, nozzle 130 has a length of at least about 10 mm. In some embodiments, nozzle 130 has a length of between about 5 mm to about 15 mm. An internal diameter of nozzle 130 may range from about 1.0 mm to about 1 mm, depending on the size of fibers to be produced and the viscosity of the material being used to produce the fibers.

To facilitate transfer of material through nozzle 130, a portion of nozzle body 131 may be angled or rounded toward opening 139. For example, distal portion 135 of nozzle body 131 may be angled from a flat portion of the nozzle body toward opening 139. Alternatively, distal portion 135 of nozzle body 131 may be rounded, as depicted in FIG. 5, from a flat portion of the nozzle body toward opening 139.

In another embodiment, a needle port 140 may be coupled to an opening 122 of body 120. FIG. 4 depicts an embodiment of a removably couplable needle port that has been removed from fiber producing device 100. Needle port 140 may include a coupling portion 142 and a needle receiving portion 144. Needle receiving portion 144 may be used to removably couple a needle to needle port 140. In an embodiment, needle port 140 is a luer-lock connector. Coupling portion 142 of needle port 140 is couplable to a corresponding coupling portion 127 of one or more of openings 122. For example, needle port 140 may include a threaded coupling portion 142, which has threading that matches threading 127 formed in opening 122. Needle port 140 may be coupled to body 120 by fastening the threaded coupling portion 142 of the needle port onto threading 127 of opening 122. Removably coupling a needle port to a fiber producing device allows easy removal of the needle port for clean up. Needle ports offer an additional advantage of allowing customization of the fiber producing device by allowing needles to be removably coupled to the fiber producing device.

In another embodiment, a needle 150 may be coupled to an opening 122 of body 120. FIG. 4 depicts an embodiment of a removably couplable needle that has been removed from fiber producing device 100. Needle 150 may include a coupling portion 152. Coupling portion 152 of needle port 150 is couplable to a corresponding coupling portion 127 of one or more of openings 122. For example, needle 150 may include a threaded coupling portion 152, which has threading that matches threading 127 formed in opening 122. Needle 150 may be coupled to body 120 by fastening the threaded coupling portion 152 of the needle onto threading 127 of opening 122. Removably coupling a needle to a fiber producing device allows easy removal of the needle for clean up. Having a coupling formed on a needle ports offer an additional advantage of allowing customization of the fiber producing device by allowing needles to be removably coupled to the fiber producing device.

Figure 6:
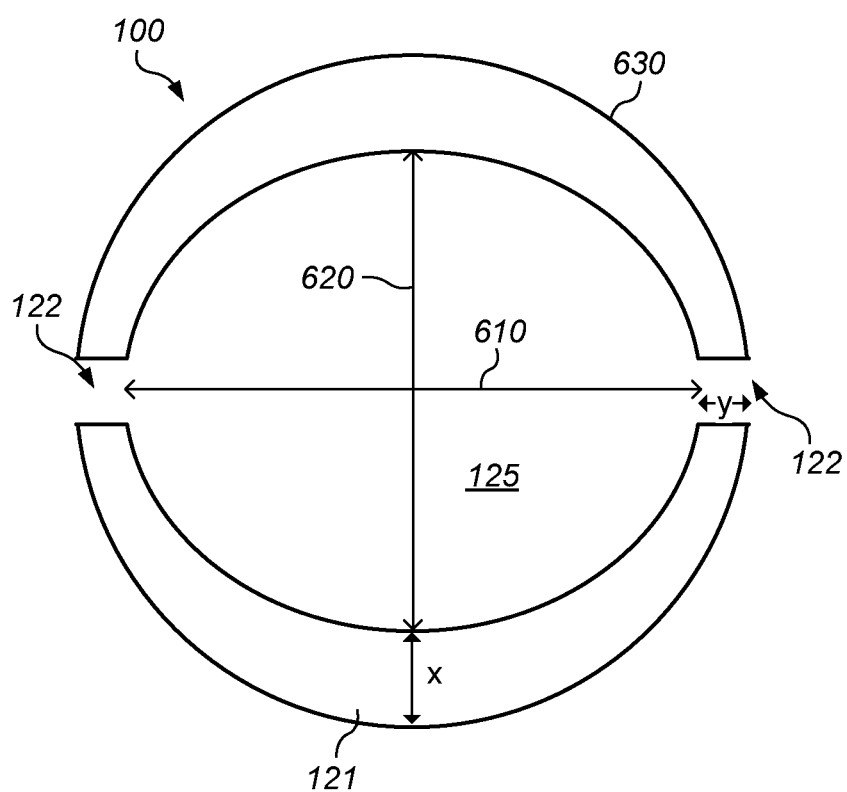
FIG. 6 depicts a cross-sectional top view of a fiber producing device.

FIG. 6 depicts a cross-sectional top view of fiber producing device 100. To further facilitate transfer of material, fiber producing device 100 may have a substantially oval internal cavity 125. For example, sidewall 121 may define an internal cavity 125 having a substantially oval cross-sectional shape. The oval internal cavity has a long axis 610 and a short axis 620. Long axis 610 of internal cavity 125 may be aligned with one or more openings 122. While internal cavity 125 has a substantially oval shape, the external shape of body may be substantially circular. This may be accomplished by varying the sidewall width to create an oval internal cavity while maintaining a circular external surface 630 of the body. As shown in FIG. 6, sidewall thickness "x" along the short axis 620 may be larger than the sidewall thickness "y" along long axis 610. This creates an oval shape for internal cavity 125 while maintaining a circular external surface 630. Having an oval internal cavity helps to drive the material along the long axis of the oval when the fiber producing device is spinning. When the long axis is aligned with one or more openings, the material is thus directed to the openings, helping to minimize waste and ensure a continuous flow of material through the openings.

Figure 7A:
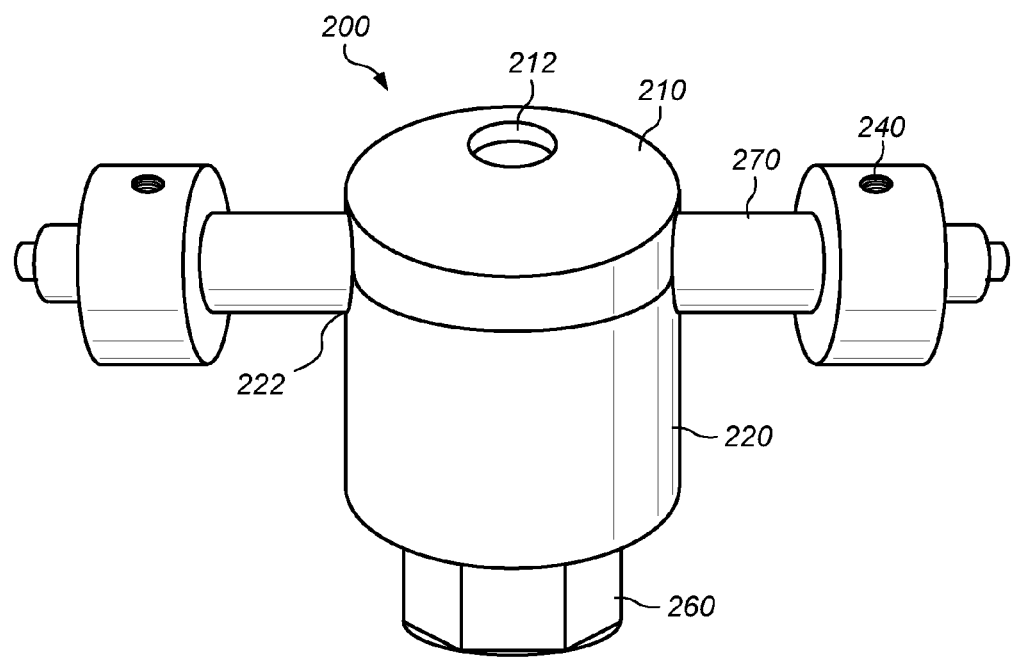
FIG. 7A depicts an alternate embodiment of a fiber producing device.

An alternate embodiment of a fiber producing device is shown in FIG. 7A. Fiber producing device 200 includes a top 210 that is coupled to body 220. Body 220 acts as a reservoir which holds material to be spun into fibers. Top 210 has an opening 212 to allow introduction of material to be spun while the top is fastened to body 220. Alternatively, top 210 may be removed from body 220 and the material added to the body prior to fastening the top to the body. Body 220 includes one or more openings 222 and a coupling member 260 coupled to the body. Coupling member 260 may be used to couple fiber producing device 200 to a driver that is capable of rotating the fiber producing device. Coupling member 260 may be an elongated member extending from the body which may be coupled to a portion of the driver (e.g., a chuck or a universal threaded joint of the driver). Alternatively, coupling member may be a receiver which will accept an elongated member from a driver (e.g., the coupling member may be a chuck or a universal threaded joint).

Figure 7B:
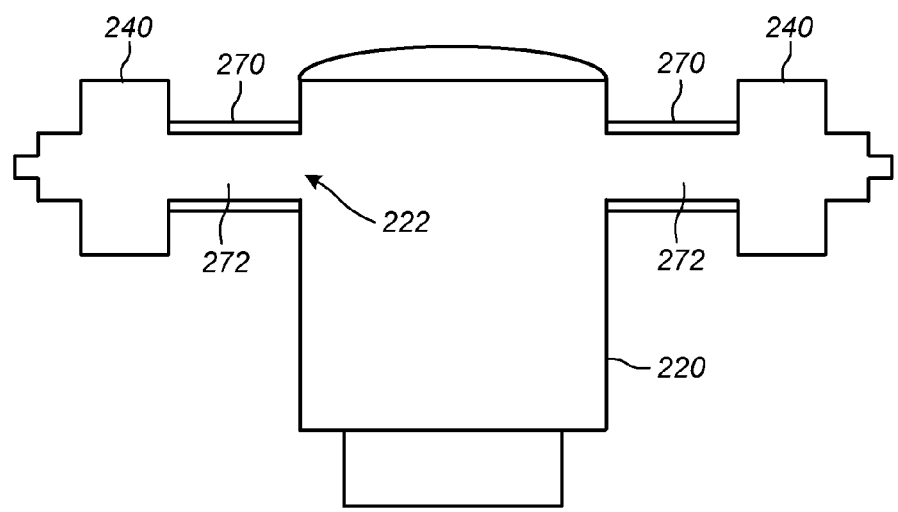
FIG. 7B depicts cross-section view of an alternate embodiment of a fiber producing device.

One or more needle ports 240 may be coupled to one or more openings 222 via one or more outlet conduits 270. Outlet conduits 270 may have an annular passageway 272 extending through the longitudinal length of the outlet conduit, as depicted in cross section view FIG. 7B. Outlet conduit 270 may have a length of at least about 10 mm, at least about 20 mm, at least about 30 mm, at least about 40 mm, at least about 50 mm, at least about 60 mm inches, or at least about 70 mm. Outlet conduit 270 may have a length of between about 10 mm to about 250 mm, at least about 20 mm to about 200 mm, or at least about 30 mm to about 150 mm.

When material is ejected from an opening during spinning of a fiber producing body, the material tends to expand as it leaves an opening. It has been found that by "setting" the diameter of the material prior to the material exiting the fiber producing device, expansion of the material as it leaves the fiber producing device may be minimized. To "set" the diameter of the material annular passageway 272 may have a substantially constant diameter. In some embodiments, the annular passage has a constant diameter of between about 4 mm and about 30 mm over a length of about 10 mm to about 250 mm. Holding the material at a constant diameter over a predetermined length, sets the diameter of the material, reducing the expansion of the material as it exits the outlet conduit and nozzle. Reduction of swelling helps to improve the consistency of the produced fibers with regard to size and length. The length and/or diameter of annular passage 272 may be selected based, at least in part, on the type of material being used. Generally, as the viscosity of the material increases, a longer conduit may be used to properly set the diameter of the material before the material exits the fiber producing device.

Figure 8:
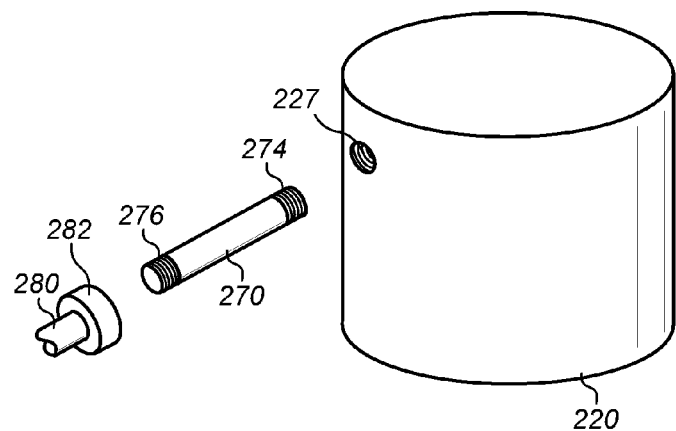
FIG. 8 depicts an embodiment of a removably couplable outlet conduit.

In an embodiment, outlet conduits 270 may be removably coupled to body 220. FIG. 8 depicts an embodiment of a removably couplable outlet conduit 270. Outlet conduit 270 may include a first coupling portion 274 which is couplable to a complementary coupling portion 227 of a body 220 and a second coupling portion 276 couplable to an outlet element

280. An outlet element, as used herein includes, but is not limited to, a nozzle, a needle port, a needle or a combination of an outlet conduit coupled to a nozzle, needle port or needle. Outlet element 280 includes a complementary coupling portion 282, which is couplable to second coupling portion 276 of outlet conduit 270. An outlet element 280 may be coupled to outlet conduit 270 by mating second coupling portion 276 of the outlet conduit onto coupling portion 282 of the outlet element. Removably coupling an outlet conduit to a body allows easy removal of outlet conduits. Having removably coupled outlet conduits improves the ability to customize the production of fibers by allowing the outlet parameters to be changed by changing the outlet conduit length and diameter as well and the outlet element that is coupled to the outlet conduit. Additionally clean up of the fiber producing device is improved by allowing the outlet conduit to be removed and separately cleaned. Outlet elements such as nozzle 130, needle port 140 and needle 150, as depicted in FIG. 4, may be coupled to second coupling portion 276 of outlet conduit 270.

Figures 9A, 9B:
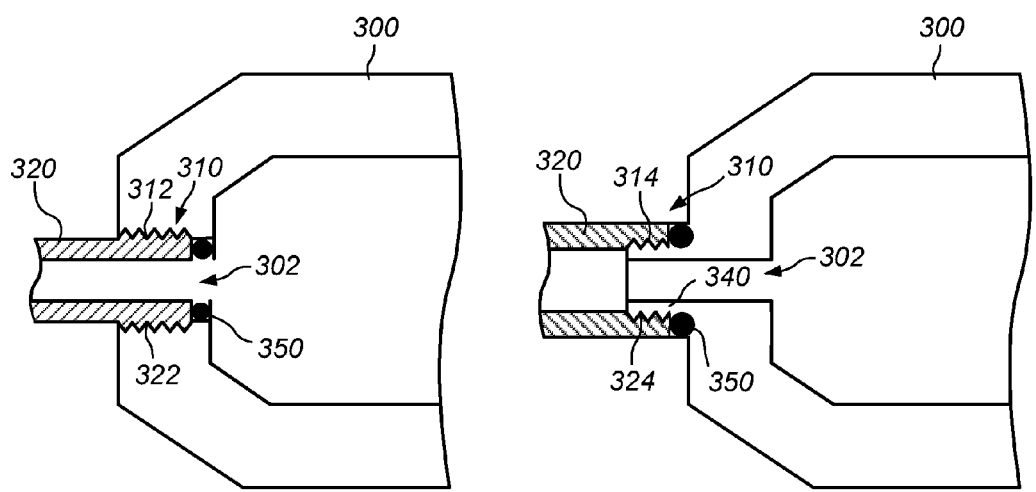
FIGS. 9A and 9B depict cross-sectional views of embodiments of a coupling portion of an opening in a body of a fiber producing device.

FIG. 9A depicts a cross-sectional view of a coupling portion 310 of an opening in a body 300 of a fiber producing device. Coupling portion 310 depicted in FIG. 9A may be used to couple a nozzle, a needle, a needle port, or an outlet conduit to body 300 of a fiber producing device. Coupling portion 310 includes, in one embodiment, threading 312 that couples with threading 322 of a removably couplable outlet element 320 (e.g., a nozzle, a needle, a needle port, or an outlet conduit). In one embodiment, threading 312 is formed on an interior wall of opening 302. Outlet element 320 includes threading 322 that is complementary to the threading on coupling portion 310 of opening 302 to allow coupling of the outlet element to the body. A seal 350 (e.g., an o-ring) may be positioned between outlet element 320 and body 300 to form a seal between the body and the outlet element.

An alternate embodiment of a coupling portion 310 of a body 300 of a fiber producing device is depicted in the cross-section drawing depicted in FIG. 9B. In an embodiment, coupling portion 310 includes a coupling member 340 formed proximate to an opening 302 formed in a sidewall of body 300. Coupling member 340 may protrude from opening 302. Coupling member 340 includes, in one embodiment, threading 314 formed on an external surface of the coupling member that couples with threading 324 of a removably couplable outlet element 320 (e.g., a nozzle, a needle, a needle port, or an outlet conduit). A seal 350 (e.g., an o-ring) may be positioned between outlet element 320 and body 300 to form a seal between the body and the outlet element.

Figure 10A:
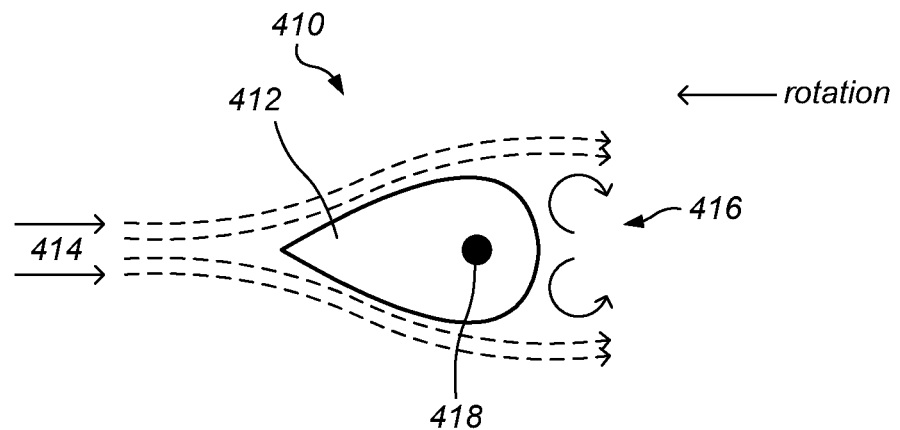
FIGS. 10A and 10B depict cross-section end views of embodiments of nozzles having a non-cylindrical profile.
Figure 10B:
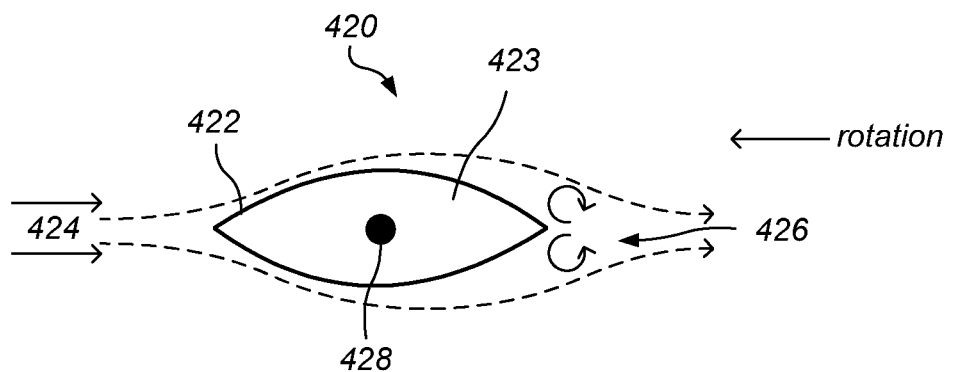

In an embodiment, one or more nozzles may be coupled to the body of a fiber producing device. During use material in the fiber producing device passes through the one or more nozzles and is ejected from the one or more nozzles to produce microfibers and/or nanofibers. In embodiments where the nozzles protrude from the body of a fiber producing device, the nozzles may be cooled by air striking the nozzle as the body is rotated. During a process in which a heated material is used, the cooling of the nozzles may cause the material passing through the nozzle to be cooled prior to exiting the nozzle. This cooling may cause inconsistent fiber production as the material properties (e.g., viscosity) change as the material is cooled. To minimize the cooling effect of air on the nozzles, the nozzles may be formed to have a non-cylindrical profile. FIGS. 10A and 10B depict cross-section end views of embodiments of nozzles having a non-cylindrical profile. In the embodiment shown in FIG. 10A, a nozzle 410 has an outer surface having tapered edge 412. Nozzle 410 is positioned on a body of a fiber producing device such that the nozzle is rotated in a direction leading with tapered edge 412 (in FIG. 10A this would be in a direction right to left or clockwise). Air 414 flows around the tapered edge creating a region of negative pressure 416 around orifice 418 of nozzle 410. Region of negative pressure 416 is believed to slow down the heat transfer from the nozzle to the air. Having a tapered leading edge may also reduce the disruption of air flow on fiber forming as the material exits the nozzle.

FIG. 10B depicts an alternate embodiment of a non-cylindrical nozzle. In the embodiment shown in FIG. 10B, a nozzle 420 has an outer surface having tapered leading edge 422 and a tapered trailing edge 423. Nozzle 420 is positioned on a body of a fiber producing device such that the nozzle is rotated in a direction leading with leading edge 422 (in FIG. 10B this would be in a direction right to left or clockwise). Air 424 flows around the tapered edge creating a region of negative pressure 426 around orifice 428 of nozzle 410. Region of negative pressure 426 is believed to slow down the heat transfer from the nozzle to the air and reduce the disruption of gas flow on fiber forming as the material exits the nozzle.

Figure 11A:
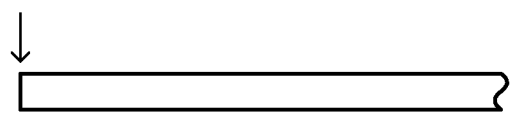
FIGS. 11A-11F depict various outlet configurations for nozzle tips and needle ends.
Figure 11B:
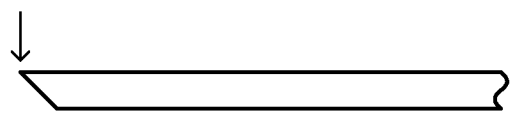
Figure 11C:
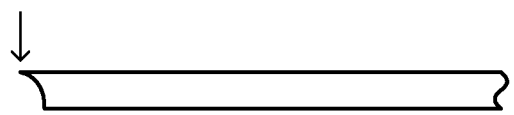
Figure 11D:
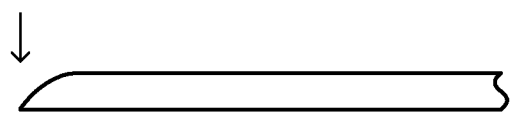
Figure 11E:
Figure 11F:
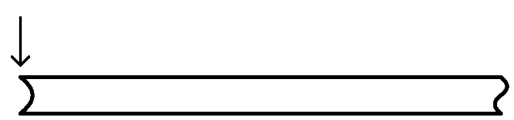

The end of a nozzle, a nozzle tip, and the end of a needle coupled to a fiber producing device may be angled or rounded to alter the fiber size and configuration. Examples of various outlets configurations that may be used for both nozzle tips and needle ends are shown in FIGS. 11A-11F. In each of the figures the downward pointing arrow indicates the direction of gas flow across the end of the nozzle tip/needle end. In FIG. 11A, a nozzle tip or needle end has a flat end. A variation of the nozzle tip or needle end which may be used to alter the properties of the fiber produced include an angled nozzle tip or needle end, as depicted in FIG. 11B, or various rounded nozzle tip or needle end configurations, as depicted in FIGS. 11C-11E. By changing the angle and configuration of a nozzle tip or needle end the material may be drawn into different fibers. In configuration 11F, a slight indentation is formed in nozzle tip or needle end to produce a region of reduced pressure at the end of the needle, facilitating production of fibers.

It has been further discovered that alterations in the angle of the nozzle or needle with respect to the body may also influence the properties of the produced fibers. For example, as depicted in the figures, nozzles and/or needles are typically positioned substantially perpendicular to the body. In some embodiments, nozzles or needles may be placed at an angle deviating from perpendicular by any amount. In some embodiments, the nozzle or needle may be placed on the body at an angle deviating from between about 1 to about 15 from perpendicular.

Figure 12A:
FIGS. 12A and 12B depict embodiments locking systems for a needle.

Production of desired fibers may therefore be controlled by the type of nozzle or needle used, the orientation of the nozzle or needle with respect to the direction of rotation, the nozzle tip or needle end configuration, and the angle of the nozzle or needle with respect to the body. In order to facilitate proper placement of the nozzle or needle on the body, different locking systems may be used. FIG. 12A shows a locking system that may be used for a needle. Needle 500 includes a protrusion 510 at the coupling end of needle 500. An opening 520, that the needle is to be coupled with, has a complementary shape to the protrusion at the end of needle 500. During use, needle 500 may only be inserted into opening 520 in the specific orientation that allows protrusion 510 to be inserted into the opening. A locking screw (not shown) may be used to lock needle 500 in place once the needle is properly inserted in opening 520. In this manner, the needle may be placed in the proper orientation without the user having to check for proper positioning of the needle. For example, if the tip of the needle has a specific configuration, (e.g., as depicted in FIGS.

11B-11F), the use of a locking system may ensure that the needle tip is in the proper orientation with respect to the rotation of the body.

Figure 12B:
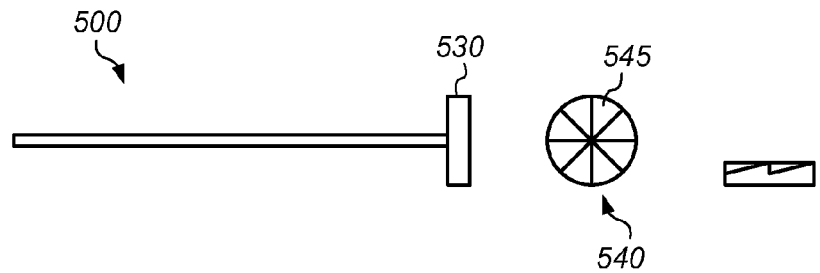
Figure 13A:
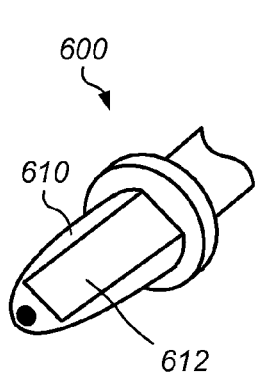
FIGS. 13A-13C depict embodiments of locking systems for a nozzle.
Figure 13B:
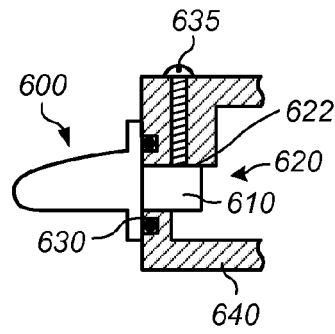

An alternate embodiment of a needle locking system is shown in FIG. 12B. Locking system 540 may include a plurality of angled protrusions 545 arranged in a circle and extending from a locking member. Needle coupling end 530 may also include a similar pattern of angled protrusions that will complement the protrusions on locking system 540. During use, needle coupling end may be mated with the protrusions of locking system 540 in a predetermined number of discrete positions. When placed in the desired position the needle may be locked in place using the locking system. In an embodiment, a locking screw (not shown) may be used to lock the needle in place once the needle is properly positioned. In alternate embodiments, a clamp or clamping mechanism may be used to secure the needle coupling portion to the locking system. In this manner, the needle may be ensured to be placed in a selected discrete the proper orientation. Locking system 540 further offers the additional feature of allowing the needle to be placed in discrete, predetermined positions with respect to the body Nozzles may also be coupled to a body through a locking system that positions the nozzle in a predetermined orientation. An embodiment of a locking system for a nozzle is depicted in FIGS. 13A and 13B. In this embodiment, a nozzle 600 may include a coupling portion 610. Nozzle 600 may be couplable to an opening 620 by sliding the nozzle coupling portion 610 into opening 620, in contrast to previous embodiments in which the nozzle included a threaded coupling portion. Coupling portion 610 of nozzle 600 has a flat portion 612 which is matched with a corresponding flat portion 622 of an opening. The requirement to match the flat portion of the nozzle coupling end with a flat portion of the opening ensures that the nozzle is placed in the proper orientation. A seal 630 (e.g., an o-ring) may be positioned between the nozzle and the body to form a seal. To secure nozzle 600 in opening 620, a set screw 635 may be used. In an embodiment, depicted in FIG. 13B, set screw 635 may extend through body 640 of a fiber producing device and contact the flat portion of the coupling portion 610 of nozzle 600 to secure the nozzle in the opening. Alternatively, the set screw may engage the nozzle coupling end at an angle extending through the sidewall of the body.

Figure 13C:
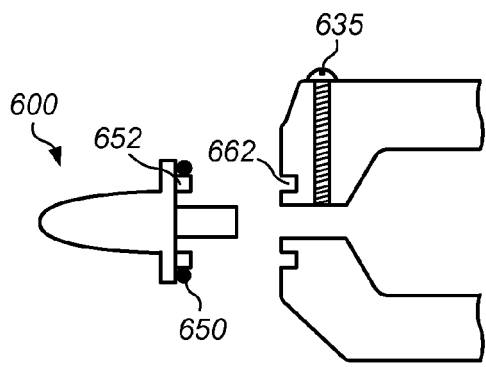

An alternate embodiment of a locking system for a nozzle is depicted in FIG. 13C. In this embodiment, a nozzle 600 may have a coupling end that includes one or more protrusions 652. Locking system includes one or more recess 662 which can be matched with one or more protrusions 652 of nozzle 600 to lock the nozzle in a predetermined position. The requirement to match protrusions 652 of nozzle 600 with recesses 662 ensures that the nozzle is placed in the proper orientation. A seal 650 (e.g., an o-ring) may be positioned between nozzle 600 and body to form a seal between the body and the nozzle. To secure the nozzle in the opening, a set screw 635 may be used. In an embodiment, set screw 635 may extend through the body, contacting the coupling end of nozzle to secure the nozzle in the opening.

Figure 14A:
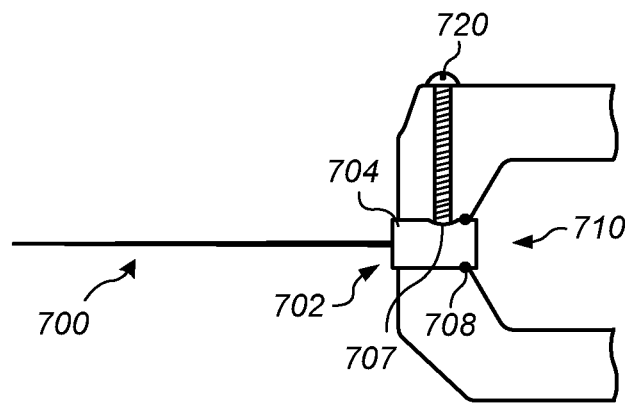
FIGS. 14A-14C depict alternate embodiments of locking systems for needles.

An embodiment of a locking system for a needle is depicted in FIG. 14A. A needle is couplable to an opening 710 of the body of a fiber producing device. Needle 700 includes a coupling portion 702 that includes a base 704 and a seal 708 positioned around at least a portion of the base. An indentation 707 may be formed in base 704. To secure needle 700 in the opening, a set screw 720 may be used. Set screw 720 may extend through the body of a fiber producing device and contact indentation 707 formed in base 704 of needle 700 to secure the needle in opening 710. Alternatively, the set screw may engage the indentation of the needle at an angle extending through the sidewall of the body. The formation of an indentation on the needle base helps secure the needle in the opening and helps a user to align the needle in the proper orientation. Seal 708 (e.g., an o-ring) helps to form a seal between the base and the opening.

Figure 14B:
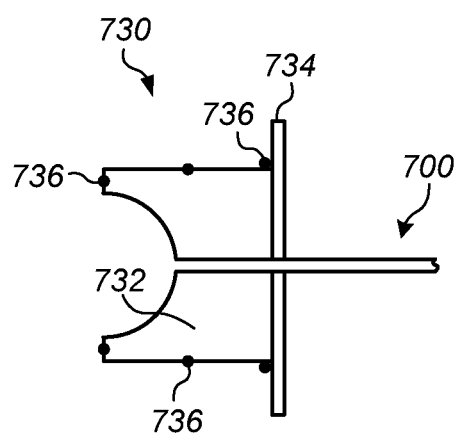
Figure 14C:
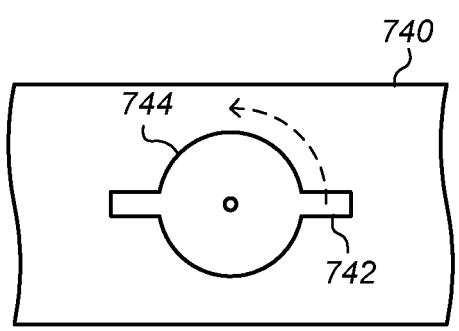

Another embodiment of a locking system for a needle is depicted in FIG. 14B and FIG. 14C. In this embodiment, a needle 700 is couplable to an opening of the body of a fiber producing device. Needle 700 includes a coupling portion 730 that includes base 732 and a locking tab 734 protruding from the base. An opening of the body of a fiber producing device, or a needle port, may have a locking system capable of securing needle 700. An example of a locking system 740 is depicted in FIG. 14C. Locking system 740 includes an indentation 742 that receives locking tab 734 and a portion of base 732. To secure the needle in an opening, needle 700 is oriented such that locking tab 734 is aligned with indentation 742 of locking system 740. Once locking tab 734 is inserted into indentation 742, base 732 can be turned to secure locking tab 734 under a portion 744 of locking system 740. A set screw may be used to secure the needle in the locking system. In some embodiments, a set screw may not be needed. Base 732 may include one or more seals 736. Seals 736 may provide a secure fitting between a portion of base 732 and the surface of the body or needle port. When in contact with the surface of the body or a needle port, the seal also provides an outward force against the base, causing a portion of the base to be compressed against an inner surface of the locking system. Additional seals help to form a more secure fitting between the base and the opening.

Figure 15A:
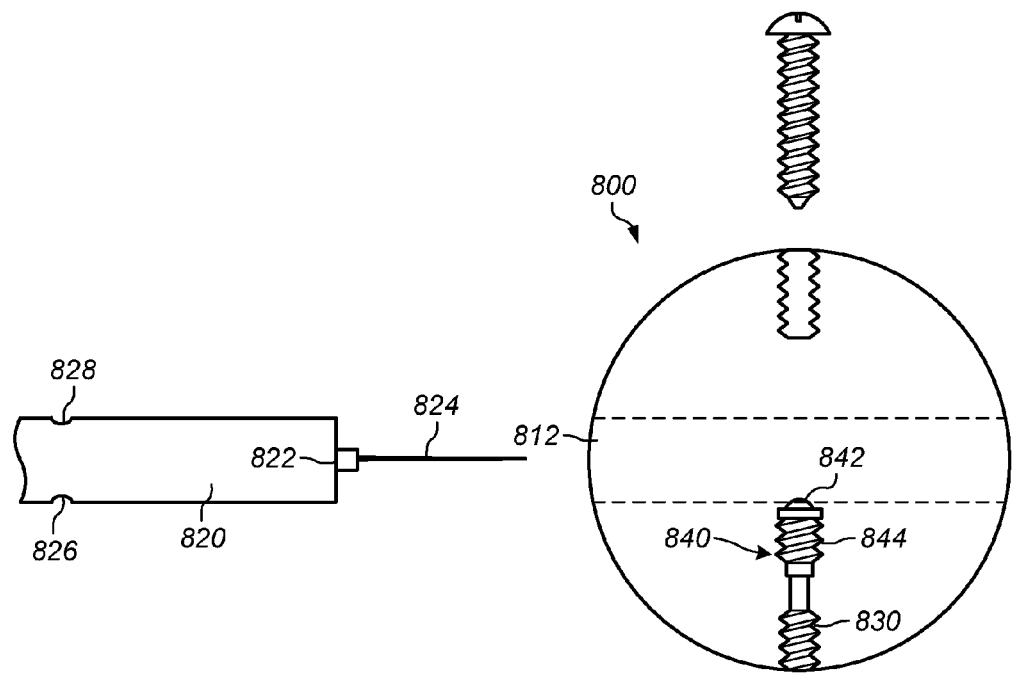
FIGS. 15A and 15B depict an alternate embodiment of a fiber producing device.
Figure 15B:
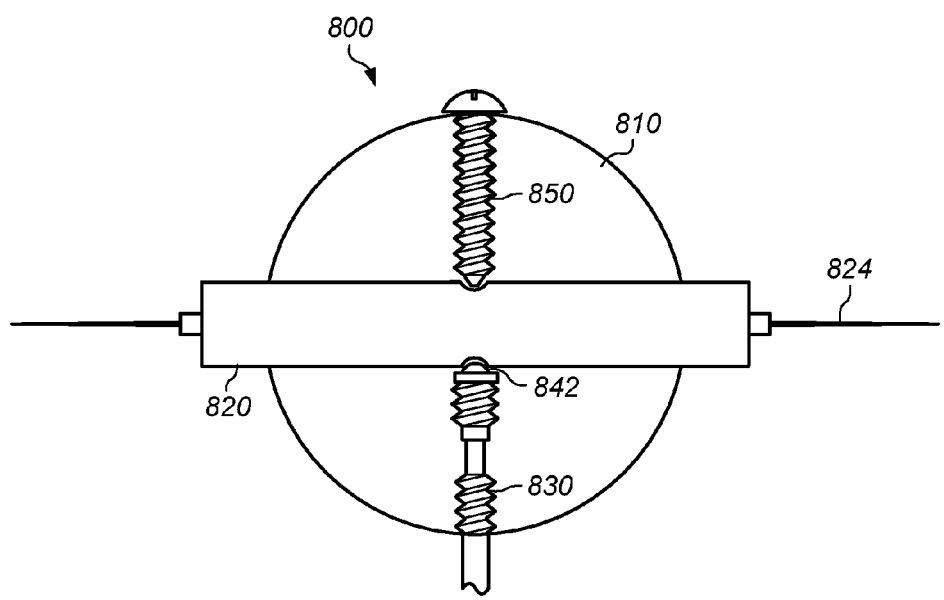

An alternate embodiment of a fiber producing device is depicted in FIGS. 15A and 15B. Fiber producing device 800 includes a hub 810 and a body 820. Body 820 acts as a reservoir in which material may be placed. Body 820 includes one or more openings 822 through which material may exit. One or more needles 824, or other outlet elements, may be coupled to openings 822. A hub 810 may be used to secure body 820. In an embodiment, hub 810 is a spherical hub that includes a cylindrical opening 812 to receive the body. A coupling member 830 is coupled to hub 810. Coupling member 830 may be used to couple hub 810 to a driver that is capable of rotating the hub. Coupling member 830 may be an elongated member extending from the body which may be coupled to a portion of the driver (e.g., a chuck or a universal threaded joint of the driver). Alternatively, coupling member 830 may be a receiver, as depicted in FIG. 15A, which will accept an elongated member from a driver (e.g., the coupling member may be a chuck or a universal threaded joint).

Body 820 is coupled to hub 810 by inserting the body into cylindrical cavity 812. A locking mechanism 840 is disposed in cylindrical cavity 812 of hub 810. In one embodiment, locking mechanism 840 includes a spring-loaded ball 842 which rests in a cavity 844 formed in the body and coupled to cylindrical cavity 812. Body 820 includes an indentation 826 that has a shape complementary to ball 842. To lock body 820 inside hub 810, body 820 is slid into cylindrical cavity 812. When body 820 reaches locking mechanism 840, the surface of the body contacts ball 842 and forces the ball into cavity 844, allowing the body to continue into the cylindrical cavity. Body 820 is pushed through cylindrical cavity until indentation 826 of the body aligns with ball 842. At this point, the spring forces ball 842 into the indentation, inhibiting further movement of the body along cylindrical cavity 844. To ensure that body 820 remains locked in hub 810, a set screw 850 may contact the body. The pressure of set screw 850 and the resistance force of ball 842 helps to inhibit further movement of body 820 within cylindrical cavity 812. In some embodiments, a second indentation 828 is formed in the body to receive the set screw 850. In some embodiments, body 820 has been preloaded with the material to be spun. While cavity 812 and body 820 are depicted as cylindrical, it should be understood that other shapes may be used.

During use, rotation of hub 810 causes material to be ejected through one or more of openings 822 to produce fibers. During rotation ball 842 and, optionally, set screw 850 secure body 820 within hub 810. When fiber formation is finished, set screw 850 may be withdrawn such that the set screw no longer contacts body 820. Removal of the set screw 850 may allow a force to be applied to body 820 sufficient to overcome the resistance created between ball 842 and body, allowing the body be slid out of hub 810. The removed body may be replaced by a second body and fiber production continued while the first body is being cleaned and replenished with material.

Figure 16:
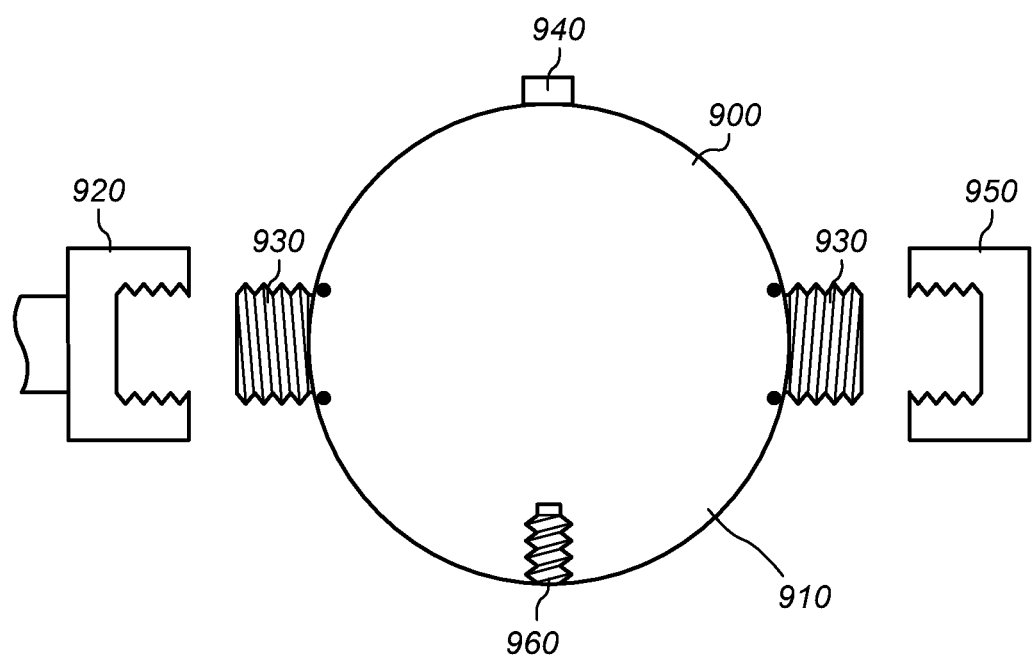
FIG. 16 depicts an alternate embodiment of a fiber producing device.

FIG. 16 depicts an alternate embodiment of a fiber producing device. Fiber producing device 900 includes a spherical body 910 which defines an internal cavity. Openings are formed in a sidewall of body 910, extending through the sidewall such that the opening allows transfer of material from the internal cavity through the sidewall. The openings, in one embodiment, communicate with a coupling member 930, which is couplable to an outlet element. In an embodiment, an outlet element 920 such as a nozzle, needle port, needle, or outlet conduit, may be removably coupled to body 910. Coupling member 960 may be used to couple body 910 to a driver that is capable of rotating the body. Coupling member 960 may be an elongated member extending from body 910 to a portion of a driver (e.g., a chuck or a universal threaded joint of the driver). Alternatively, coupling member 960 may be a receiver, as depicted in FIG. 16, which will accept an elongated member from a driver (e.g., the coupling member may be a chuck or a universal threaded joint). Spherical body also includes an inlet port 940 that may be used to introduce material into the internal cavity.

In some embodiments it is desirable to have a rotationally balanced system. Thus nozzles, needles, or needle ports are typically positioned as opposing pairs to maintain a rotationally balanced hub. Alternatively, if an odd number of nozzles, needles or needle ports are used, these devices may be positioned in a balanced orientation (e.g., three devices can be positioned at a 120 angle from each other). In some embodiments, however, it may not be desirable to have two or more devices that are producing fibers. It may be desirable to have only a single fiber producing outlet from the body. While this may be achieved by simply coupling a single outlet device to the hub, such a situation may create a rotationally unbalanced system that creates rotational stress on the body and the driver. To offset the weight of an unpaired outlet element, a counter weight may be coupled to an opposing (or a positionally balanced) outlet. For example, as depicted in FIG. 16, a counterweight 950 may be coupled to an opening, while an outlet element 920 is coupled to the opposing opening. Thus, material only exits the outlet element 920, while counterweight 950 inhibits material from being ejected through the opposing opening. Counterweight 950 helps to balance the system and reduce the rotational stress on the body and driver.

Figure 17A:
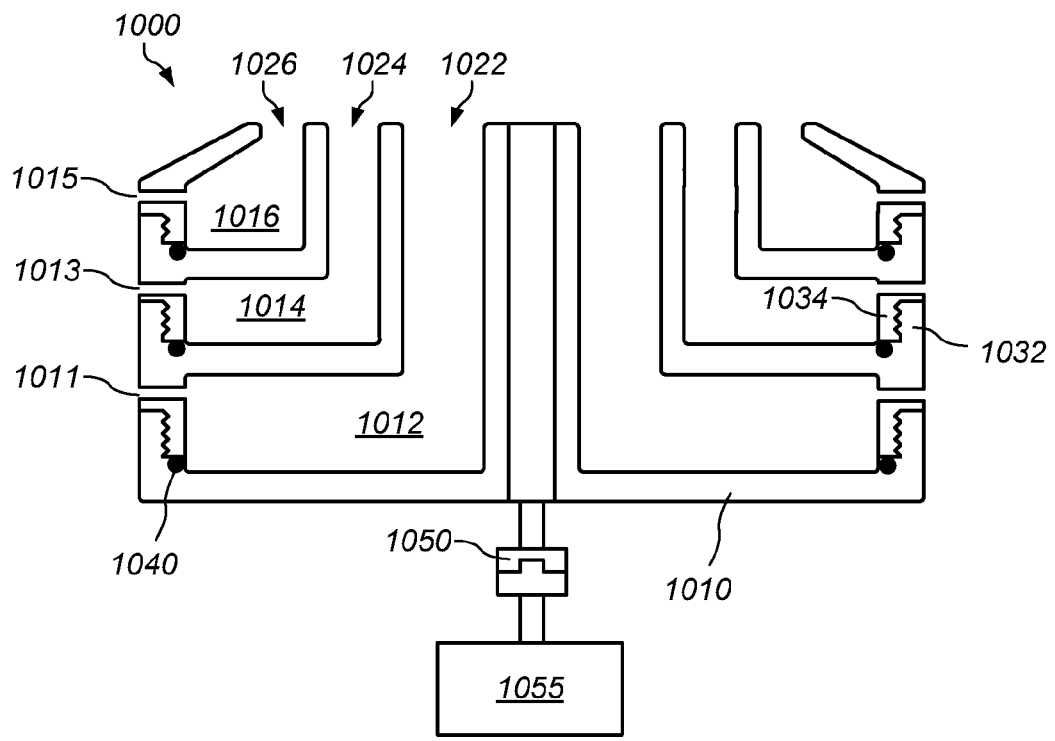
FIGS. 17A-17D depict examples of multiple level fiber producing device.
Figure 17B:
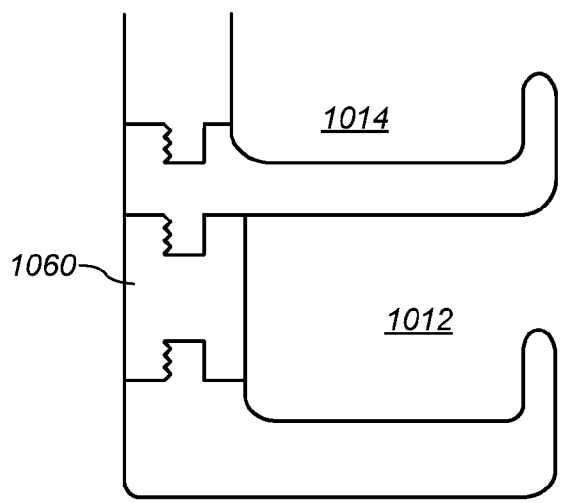

In some embodiments, it may be desirable to spin two or more different materials at the same time. For example, it may be desirable to spin two different types of polymers, or a polymer and a metal substantially simultaneously. This may be used to create blended microfibers and/or nanofibers by simultaneously producing different types of fibers from a single device. An example of a multiple level fiber producing device is depicted in FIGS. 17A and 17B. Fiber producing device 1000 includes a body 1010 having two or more chambers. For example, in the embodiment depicted in FIG. 17A, a fiber producing device 1000 includes three chambers, 1012, 1014, and 1016. Each of the chambers includes one or more openings (1022, 1024, and 1026, respectively) that allow material to be placed into the chambers. Each chamber further includes one or more openings (1011, 1013, and 1015, respectively) through which material disposed in the chambers may be ejected. During use, rotation of the fiber producing device causes material to be ejected through one or more of openings 1011, 1013, and 1015 of each chamber that includes material to produce fibers. In some embodiments, openings 1011, 1013, and 1015 may have a size and/or shape that causes the creation of microfibers and/or nanofibers as material is ejecting through the openings. In other embodiments, outlet elements may be coupled to one or more of openings 1011, 1013, and 1015. If different materials are placed in different chambers, two or more different fibers may thus be simultaneously produced.

In one embodiment, the chambers may be removably coupled to each other. For example, as depicted in FIGS. 17A and 17B, a second chamber 1014, may be coupled to first chamber 1012 through a coupling mechanism. In an embodiment, first chamber 1012 includes a coupling section 1032 having threading on the interior portion of the coupling section. Second chamber 1014 may have complementary threading on an exterior surface of a coupling section 1034. To assemble the multi chamber device, second chamber 1014 may be threaded onto the first chamber 1012. In a like manner, third chamber 1016 may be coupled to second chamber 1014. Furthermore, first chamber may be coupled to body 1010 using a similar coupling mechanism. While three chambers are depicted, it should be understood that more or less than three chambers may be coupled together. Each chamber material inlet (1022, 1024, and 1026) may be positioned such that material may be selectively added to each chamber (1012, 1014, and 1016, respectively), without adding material to other chambers. A seal 1040 (e.g., an o-ring) may be placed between coupling portions of the chambers to provide a seal.

Multilevel fiber producing device 1000 includes a coupling member 1050 which couples fiber producing device 1000 to a driver 1055 that is capable of rotating the fiber producing device. Coupling member 1050 may be an elongated member extending from the body which may be coupled to a portion of the driver (e.g., a chuck or a universal threaded joint of the driver). Alternatively, coupling member may be a receiver, as depicted in FIG. 17A, which will accept an elongated member from a driver (e.g., the coupling member may be a chuck or a universal threaded joint).

In some embodiments, it may be desirable to control the spacing between the chambers. For example, as depicted in FIG. 17A, the chambers are spaced apart from each other based on the size of the coupling portions. However, the coupling portions may not create a sufficient spacing to provide the desired separation of the chambers. In some embodiments, a spacer 1060, may be used to create additional separation between the chambers, as depicted in FIG. 17B. Use of spacers may help reduce the number of chambers needed to customize the fiber producing device. For example, rather than creating chambers having different size coupling portions, a variety of different spacers may be used to create different spacings between the chambers without having to modify the chambers.

Figure 17C:
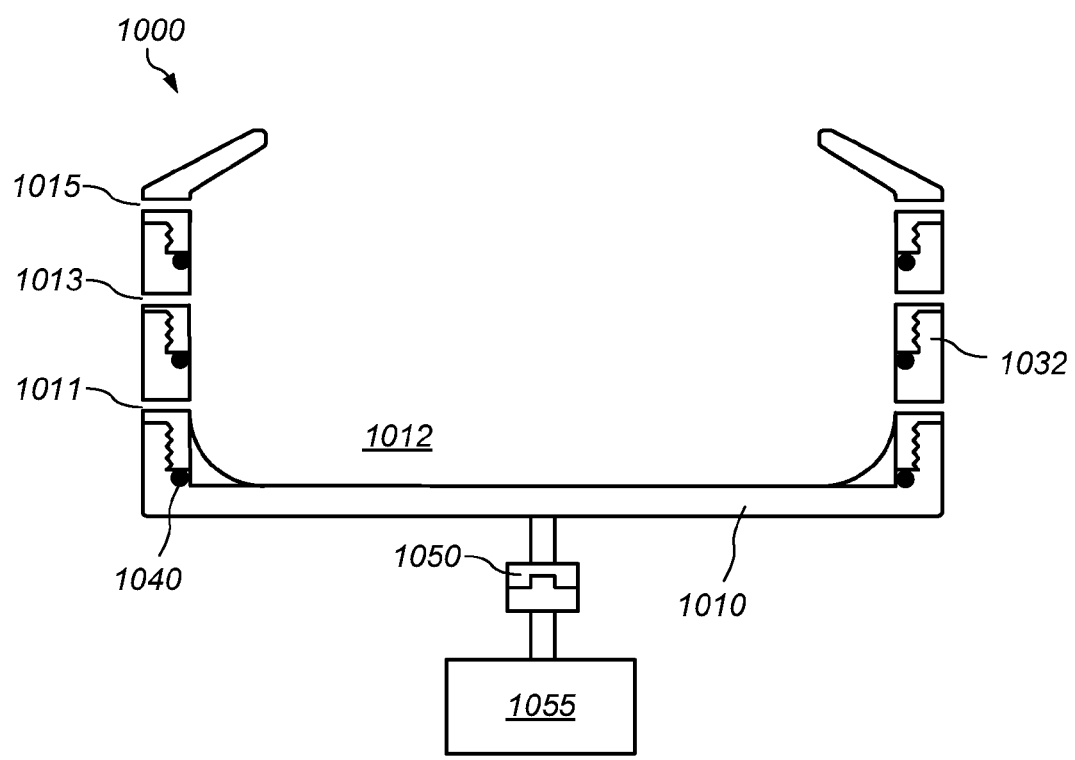

Another example of a multiple level fiber producing device is depicted in FIG. 17C. Fiber producing device 1000 includes a body 1010 having two or more levels. For example, in the embodiment depicted in FIG. 17C, a fiber producing device 1000 includes three levels having one or more openings (1011, 1013, and 1015, respectively) through which material disposed in the chambers may be ejected. An interior cavity 1012 of body 1010 may have a curved interior surface, curving from the bottom of the cavity toward openings 1011 of the first level. In this manner, material disposed in cavity 1012 is directed toward openings. Generally the diameter of openings 1011, 1013, and 1015 are set such that material moves up the interior surface of cavity 1012 until and reaches all of the openings at once. The openings may be a horizontally and/or vertically displaced from each other in a predetermined pattern. For example, the openings may be positioned in an ordered manner to form one or more levels of openings, as depicted in FIG. 17C.

During use, rotation of the fiber producing device causes material to be ejected through one or more of openings 1011, 1013, and 1015 of each level to produce fibers. In some embodiments, openings 1011, 1013, and 1015 may have a size and/or shape that causes the creation of microfibers and/or nanofibers as material is ejecting through the openings. In other embodiments, outlet elements may be coupled to one or more of openings 1011, 1013, and 1015. If different materials are placed in different chambers, two or more different fibers may thus be simultaneously produced.

In one embodiment, the levels may be removably coupled to each other. For example, as depicted in FIG. 17C, a second level may be coupled to first level through a coupling mechanism. In an embodiment, coupling section 1032 having threading on the interior portion of the coupling section joins the first level to the second level. Second level may have complementary threading on an exterior surface of a coupling section 1034. To assemble the multi chamber device, second level may be threaded onto the first level. In a like manner, third level may be coupled to second level. Furthermore, first level may be coupled to body 1010 using a similar coupling mechanism. While three levels are depicted, it should be understood that more or less than three levels may be coupled together. A seal 1040 (e.g., an o-ring) may be placed between coupling portions of the chambers to provide a seal.

Multilevel fiber producing device 1000 includes a coupling member 1050 which couples fiber producing device 1000 to a driver 1055 that is capable of rotating the fiber producing device. Coupling member 1050 may be an elongated member extending from the body which may be coupled to a portion of the driver (e.g., a chuck or a universal threaded joint of the driver). Alternatively, coupling member may be a receiver, as depicted in FIG. 17C, which will accept an elongated member from a driver (e.g., the coupling member may be a chuck or a universal threaded joint).

In some embodiments, it may be desirable to control the spacing between the chambers. For example, as depicted in FIG. 17C, the levels are spaced apart from each other based on the size of the coupling portions. However, the coupling portions may not create a sufficient spacing to provide the desired separation of the levels. In some embodiments, a spacer 1060, may be used to create additional separation between the levels, as depicted in FIG. 17B. Use of spacers may help reduce the number of chambers needed to customize the fiber producing device.

Figure 17D:
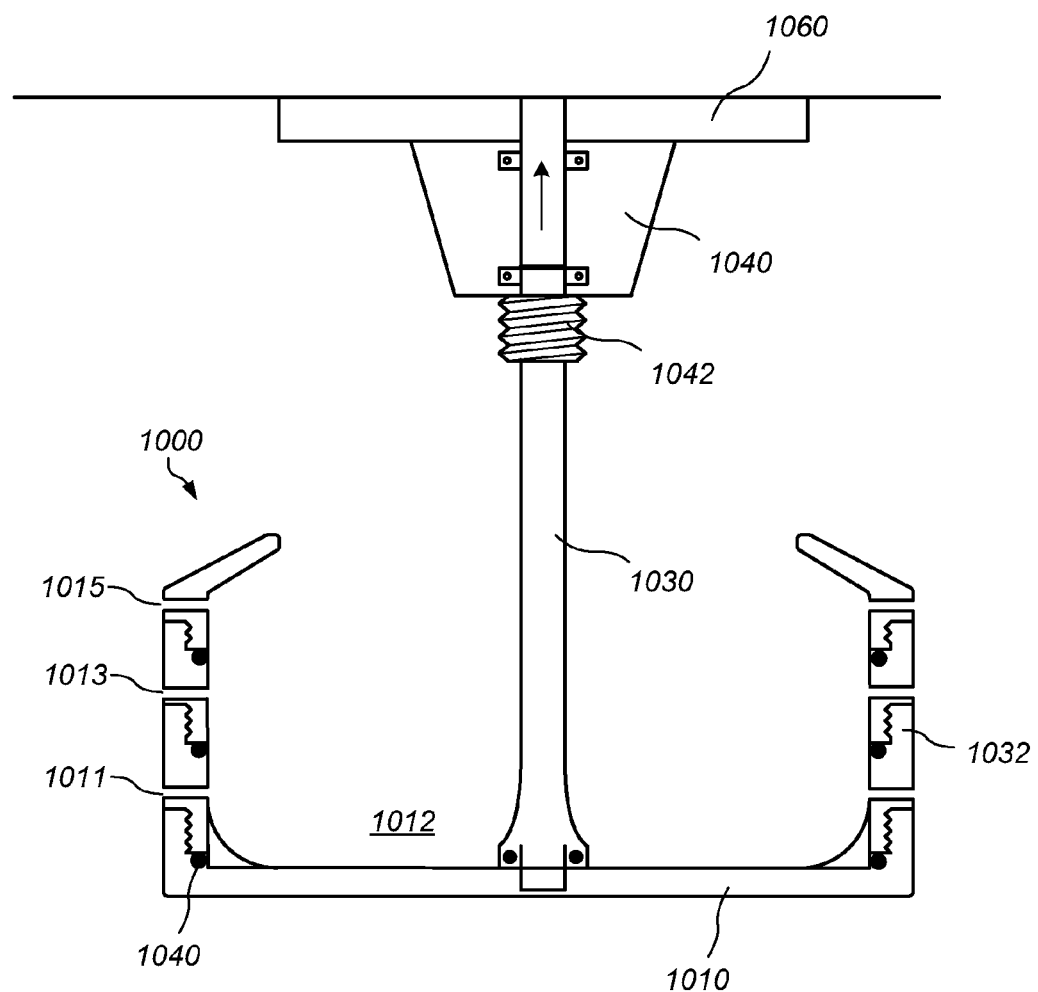

In some embodiments, the fiber producing device of FIG. 17C may be top mounted, as shown in FIG. 17D. Fiber producing device 1000 may be coupled to an upper support 1060 using coupling member 1030. Coupling member 1030 may be used to couple fiber producing device 1000 to a coupling element 1042 of a driver 1040 (e.g., a chuck coupler or a universal threaded joint of the driver). Alternatively, coupling member may be a receiver which will accept an elongated member from a driver (e.g., the coupling member may be a chuck or a universal threaded joint). Coupling element 1042 of driver may interact with coupling member 1030 of the fiber producing device to allow the coupling member to be adjustably positionable in the coupling element such that the distance between the fiber producing device and the driver is alterable. This may be useful for applications where the produced fibers are delivered to a substrate positioned below the fiber producing device. Assuming the substrate and driver are at a fixed distance from each other, altering the vertical distance between the fiber producing device and the driver also alters the vertical distance between an underlying substrate and the fiber producing device. Being able to alter the distance between the underlying substrate and the fiber producing device allows the fiber deposition patterns to be altered and customized for different substrates.

Figure 18:
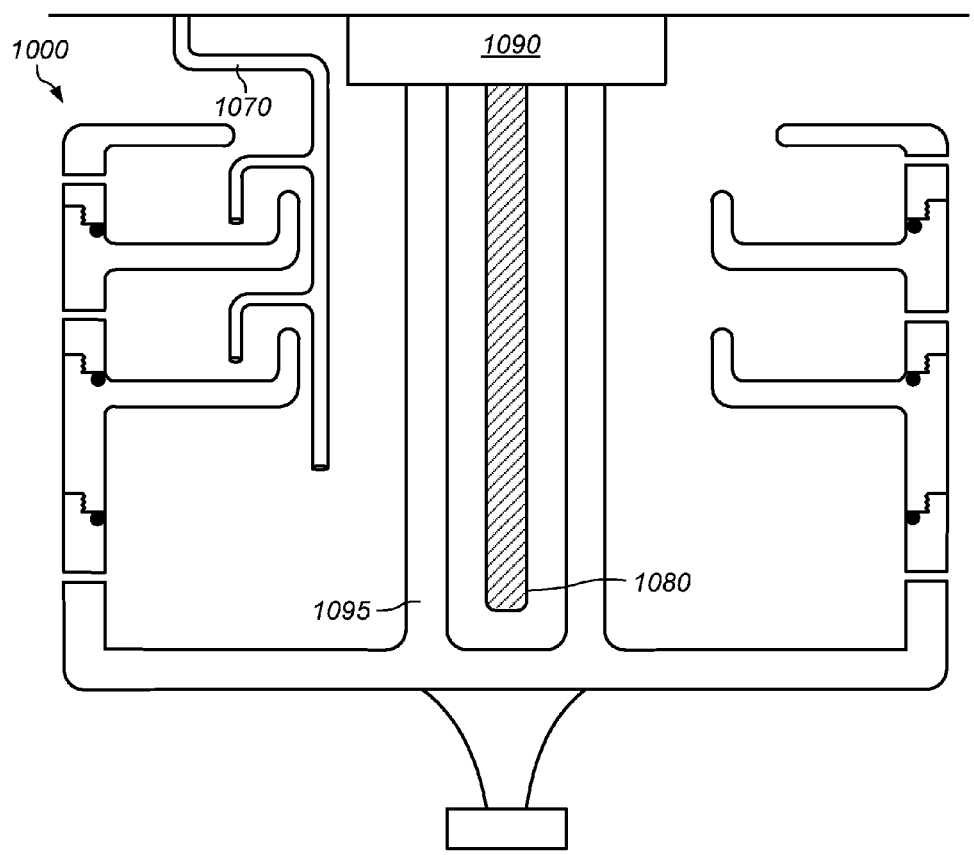
FIG. 18 depicts a multiple level fiber producing system having a material feed inlet.

Another example of a multiple chamber fiber producing system is depicted in FIG. 18. Fiber producing device 1000 includes a body having two or more chambers, as described with respect to FIGS. 17A and 17B. Each of the chambers includes one or more openings that allow material to be placed into the chambers. Each chamber further includes one or more openings through which material disposed in the chambers may be ejected. During use, rotation of the fiber producing device causes material to be ejected through one or more of the openings of each chamber that includes material to produce fibers. In some embodiments, openings may have a size and/or shape that cause the creation of microfibers and/or nanofibers by ejecting of the material through the openings. In some embodiments, one or more outlet elements may be coupled to one or more openings. If different materials are placed in different chambers, two or more different fibers may be simultaneously produced.

Fiber producing device 1000 may be incorporated into a fiber producing system that includes at least one material feed assembly 1070 and, optionally, a heating device 1080. During use, material may be fed through material feed assembly 1070 into the chambers. The use of a material feed assembly may allow substantially continuous use of a multi-level fiber producing device. While material feed assembly 1070 is depicted as a single tube feeder that feeds the same material to each chamber, it should be understood that the material feed assembly may be modified to include multiple tubes, each tube leading to a separate chamber, to allow simultaneous addition of different materials to each chamber. Heating device 1080 may be positioned proximate to the chambers to provide heat to each of the chambers. The system may also provide an upper support 1090 for the drive shaft 1095, to help minimize vibration and provide balancing of the system.

Figure 19:
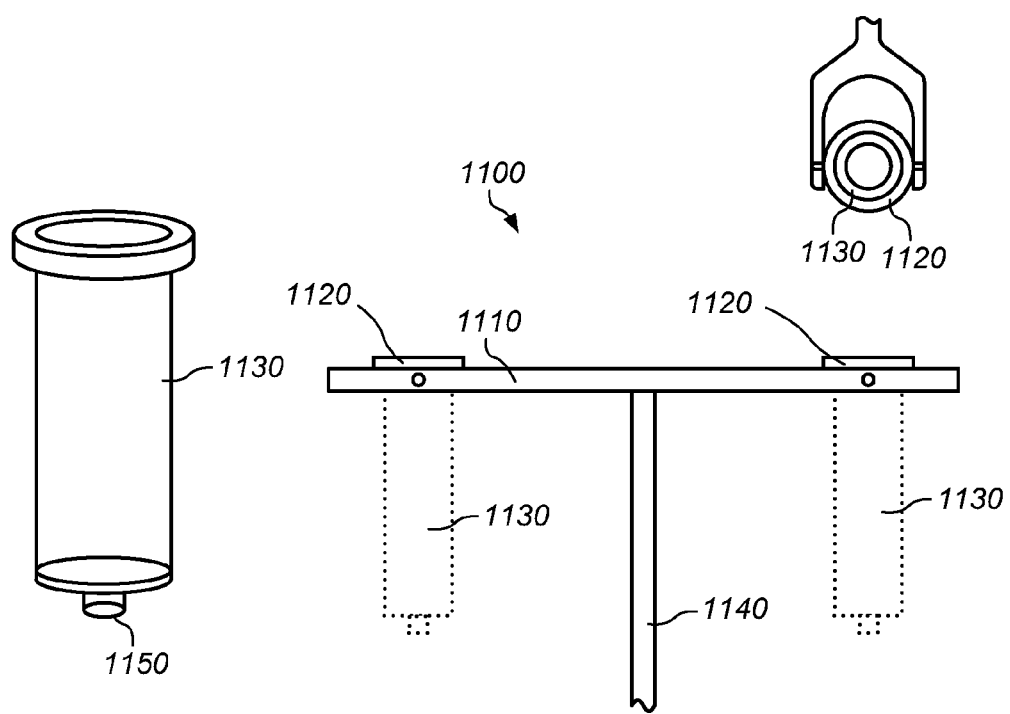
FIG. 19 depicts a fiber producing device having a circular support member.

An alternate embodiment of a fiber producing system is depicted in FIG. 19. In this embodiment, a fiber producing device 1100 includes a support member 1110 that includes two or more support elements 1120 coupled to the support member. At least one of the support elements 1120 is capable of holding a body 1130 containing a material to be spun into microfibers and/or nanofibers. Support member also includes a central coupling member 1140 that is couplable to a driver. Coupling member 1140 may be an elongated member extending from the body which may be coupled to a portion of the driver (e.g., a chuck or a universal threaded joint of the driver), as depicted in FIG. 19. Alternatively, coupling member may be a receiver which will accept an elongated member from a driver (e.g., the coupling member may be a chuck or a universal threaded joint).

In one embodiment, the fiber producing system of FIG. 19 includes one or more support elements 1020 that hold a cylindrical body 1030 having an outlet element 1050. Outlet element 1050 may be a nozzle, needle, needle port, or an outlet conduit. During use, one or more cylindrical bodies 1030 containing a material to be spun are coupled to support elements 1020. For example, cylindrical body 1030 may be inserted into a complementary cylindrical support element 1020 having an opening to allow the outlet element to extend from the support element. Alternatively, support element may be a ring coupled to support member 1110 that couples with an end portion of body 1030. Support element 1020 is pivotable to allow the position of a body coupled to support element to pivot during rotation. Rotation of support member 1110 causes material to be ejected from one or more of bodies 1030 to produce microfibers and or nanofibers. In some embodiments, less than all of the support elements may receive a body. In such circumstances a counterweight (e.g., a body that has a weight substantially equal to a filled body) may be placed in an opposing support element to maintain balance for the system. Generally, the fiber producing device of FIG. 19 is very similar to a tube centrifuge in operation.

Fibers created using the fiber producing devices described herein may be collected using a variety of fiber collection devices. Various exemplary fiber collection devices are discussed below, and each of these devices may be combined with one another. The simplest method of fiber collection is to collect the fibers on the interior of a collection wall that surrounds a fiber producing device. Fibers are typically collected from collection walls as nonwoven fibers.

The aerodynamic flow within the chamber influences the design of the fiber collection device (e.g., height of a collection wall or rod; location of same). The spinning fiber producing device develops an aerodynamic flow within the confinement of the apparatuses described herein. This flow may be influenced by, for example, the speed, size and shape of the fiber producing device as well as the location, shape, and size of the fiber collection device. An intermediate wall placed outside the collection wall may also influence aerodynamic flow. The intermediate wall may influence the aerodynamic flow by, for example, affecting the turbulence of the flow. Placement of an intermediate wall may be necessary in order to cause the fibers to collect on the fiber collection device. In certain embodiments, placement of an intermediate wall can be determined through experimentation. In an embodiment, a fiber producing device is operated in the presence of a fiber collection device and an intermediate wall, observing whether or not fibers are collected on the fiber collection device. If fibers are not adequately collected on the fiber collection device, the position of the intermediate wall is moved (e.g., making its diameter smaller or larger, or making the intermediate wall taller or shorter) and the experiment is performed again to see if adequate collection of fibers is achieved. Repetition of this process may occur until fibers are adequately collected on the fiber collection device.

Typically, fibers are collected on a collection wall or settle onto other designed structure(s). Temperature also plays a role on the size and morphology of the formed fibers. If the collection wall, for example, is relatively hotter than the ambient temperature, fibers collected on the collection wall may coalesce, leading to bundling of and/or welding of individual fibers. In some embodiments, the temperature of the collection wall and/or intermediate wall may be controlled, such as, for example, by blowing gas (e.g., air, nitrogen, argon, helium) between the intermediate wall and the collection wall. By controlling the flow rate, type, and temperature of this blowing gas, it is possible to control the temperature and morphology of the fibers. Wall parameters (e.g., height, location, etc.) may also influence the morphology of the fibers.

The intermediate wall may also be used to control, adjust, and/or influence the aerodynamic flow within the apparatus. Aerodynamic flow typically guides the fibers to rest on one or more fiber collection devices. If, upon formation, loose fibers float in an apparatus (due to their very small mass) without coming to rest on one or more fiber collection devices, it is likely that, for example, the intermediate wall is not positioned correctly, or the fiber collection device(s) is not correctly positioned, and/or the aerodynamic flow is not properly understood. An intermediate wall is typically taller than any collection wall that may be used (e.g., about 1.1 to about 3 times as high as the collection wall). The intermediate wall may surround a collection wall at a distance of from about 1 inch to about 5 inches, or from about 2 inches to about 4 inches, or about 3 inches. Intermediate wall may be about 10% to about 30% larger (e.g., 20% larger) than the collection wall. An intermediate wall may be segmented, and may have one or more holes in it.

Figure 20A:
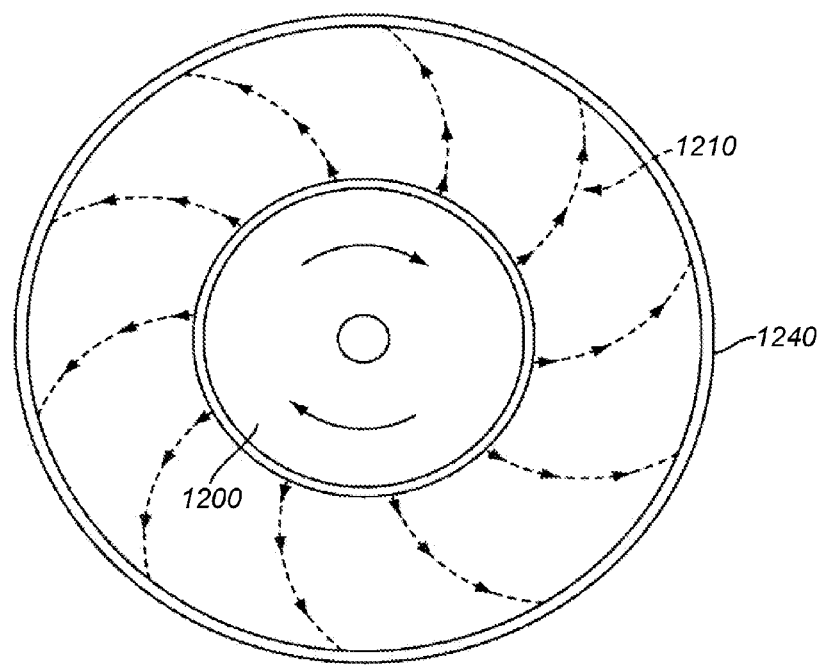
FIGS. 20A and 20B depict a top view of a fiber producing system that includes a fiber producing device and a collection wall.
Figure 20B:
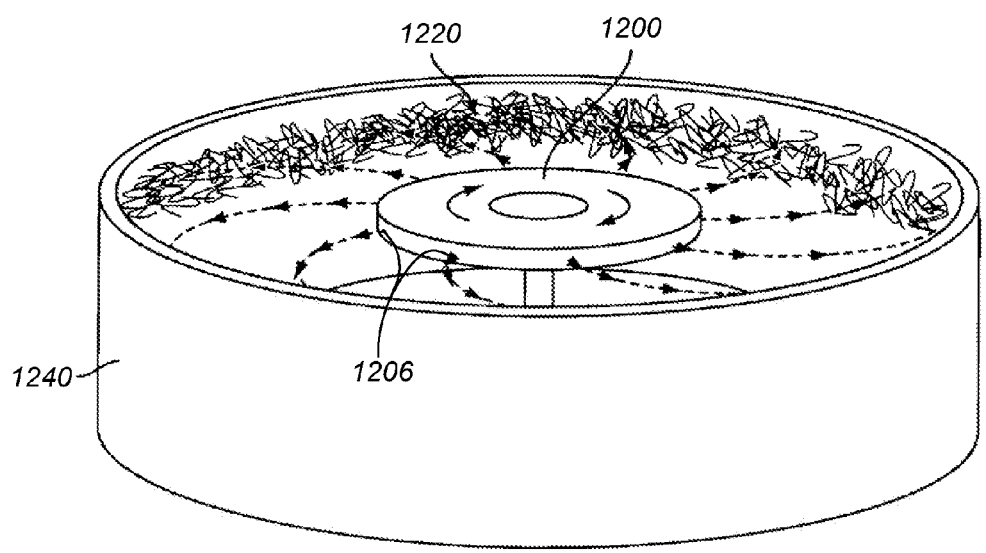

FIG. 20A shows a top view of a fiber producing system that includes a fiber producing device and a collection wall. FIG. 20B shows a projection view of a fiber producing system that includes a fiber producing device and a collection wall. As depicted, fiber producing device 1200 is spinning clockwise about a spin axis, and material is exiting openings 1206 of the body as fibers 1220 along various pathways 1210. The fibers are being collected on the interior of the surrounding collection wall 1240.

Figure 21A:
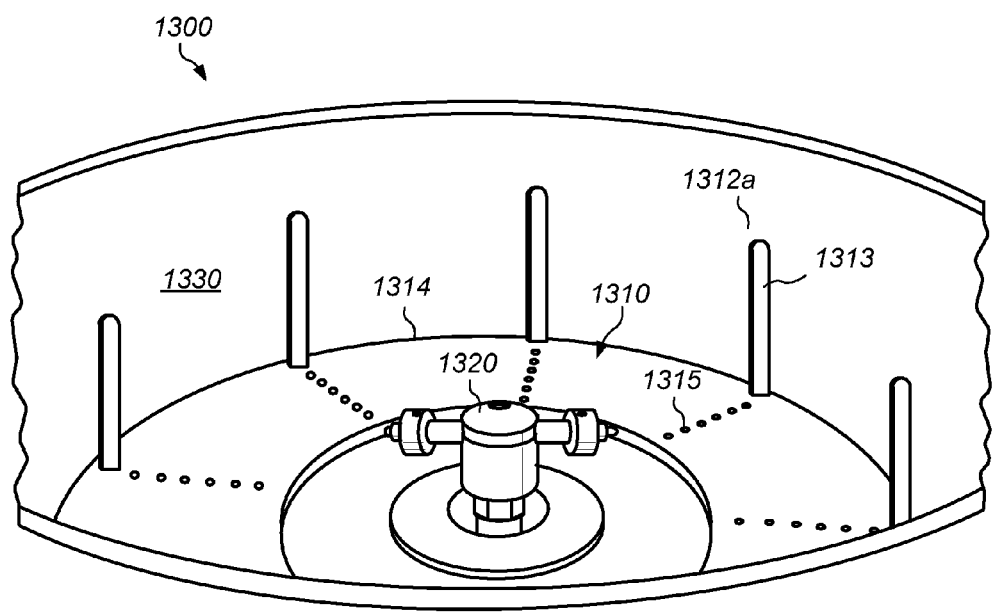
FIG. 21A depicts an embodiment of a collection system having projecting collection elements.

FIG. 21A depicts a perspective view of a fiber producing system 1300 that includes a collection system 1310 having a plurality of collection elements 1312a. Fiber producing system 1300 includes a fiber producing device 1320 that includes a body and one or more outlet elements coupled to the body, as has been previously described. The body of fiber producing device 1320 is coupled to a driver (not shown) that is capable of rotating the body. At least partially surrounding fiber producing device 1320 is a collection system 1310. In an embodiment, collection system 1310 collects fibers produced during rotation of fiber producing device 1320. Collection system 1310 includes one or more collection elements 1312a coupled to a collection system substrate 1314. In an embodiment, one or more of collection elements 1312a are in the form of a projection extending from the collection system substrate 1314. Collection elements may be in the form of straight projections 1312a extending from the collection system substrate 1314. In an embodiment, one or more collection elements comprise a projection comprising a substantially flat longitudinal surface 1313 extending from the collection element substrate to a distal end of the collection element. Use of collection elements having a flat surface assist in stopping the produced fibers without breaking the fibers, allowing longer fibers to be collected. One or more coatings (e.g., a teflon coating)" may be applied to the collection elements to reduce sticking of the fibers to the collection elements.

Figure 21B:
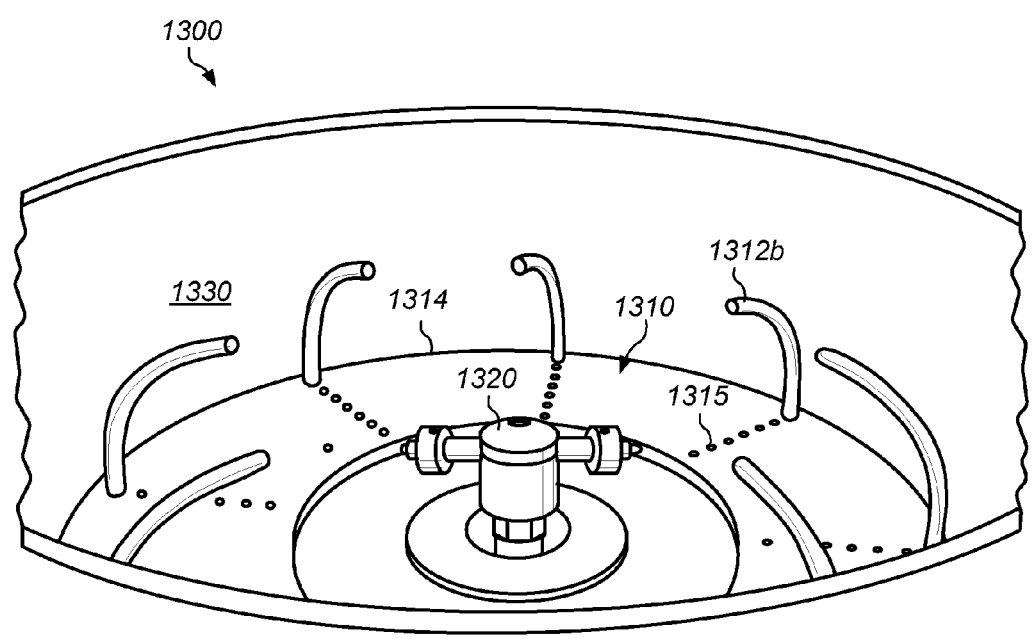
FIG. 21B depicts an embodiment of a collection system having arcuate collection elements.

In an alternate embodiment, a collection element 1312b is in the form of an arcuate projection, for example, as depicted in FIG. 21B. Use of arcuate projections provides a surface for the produced fibers to collect. Having an inward curved portion (curved toward the fiber producing device) at the top of the projections helps to retain the fibers on the projections.

In an embodiment, fiber producing system 1300 also includes a collection container 1330. Collection system 1310 and fiber producing device 1320 are positioned in collection container 1330. Collection container 1330 allows the system to be enclosed to inhibit the loss of fibers during production. A collection container lid (not shown) may be disposed on the collection container to create a fully enclosed system.

Collection elements 1312a may be removably coupled to collection system substrate 1314 through one or more openings 1315 formed in the collection element substrate. For example, as shown in FIG. 21, a plurality of openings may be formed in the collection element substrate 1314. Collection elements 1312a may be coupled to the collection system substrate 1314 via openings 1315. For example, a collection element 1312a may include a coupling portion that is insertable into the openings 1315 formed in the collection element substrate 1314. The coupling portion of collection element 1312 may be threaded and attachable by mating with a threaded opening formed in collection element substrate 1314. Alternatively, openings 1315 may extend through the substrate such that a coupling portion of collection element 1312a may extend through collection element substrate 1314. Collection element 1312a may be secured by a coupling member attached to the coupling portion on the underside of the substrate. Removably coupling collection elements allows the configuration and position (e.g., the distance from the fiber producing device) of the collection elements to be altered.

In an alternate embodiment, collection elements may be coupled to a collection substrate that allows the collection elements to be repositioned without having to remove the collection elements from the substrate. In one embodiment, a plurality of grooves is formed in the collection system substrate. Collection elements are coupled to the grooves and are movable along the grooves. In one embodiment, collection elements may be loosened from the substrate without removing the collection elements from the substrate. For example, loosening a nut connecting a bolt from the collection element to the substrate may allow the collection element to be moved along the groove. Once positioned, the nut may be retightened to secure the collection element in place.

Figure 22A:
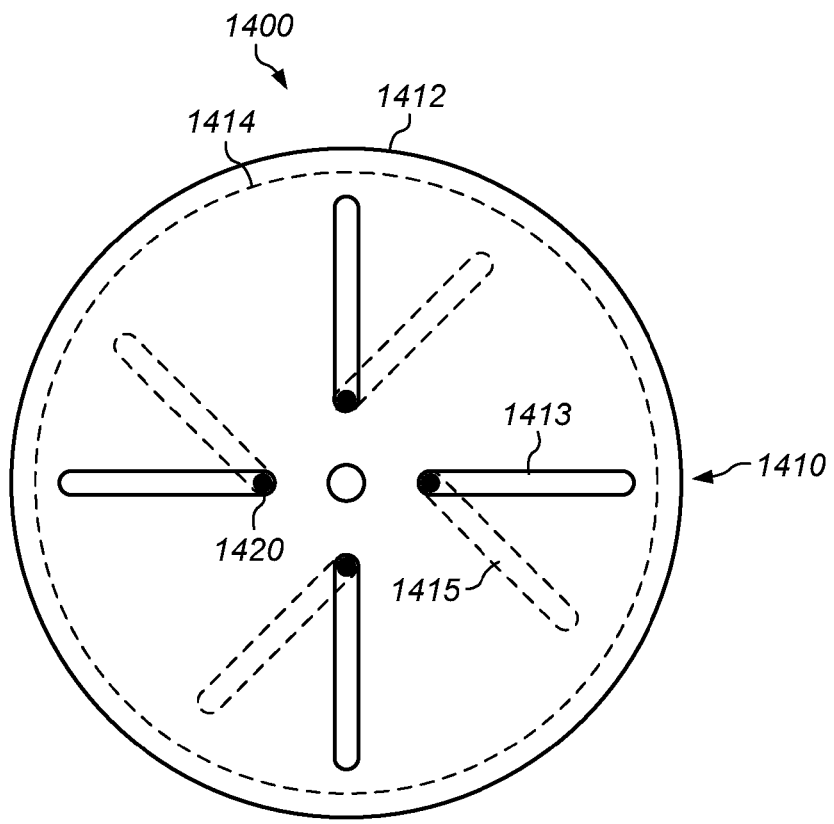
FIGS. 22A and 22B depict an alternate embodiment of a collection system.
Figure 22B:
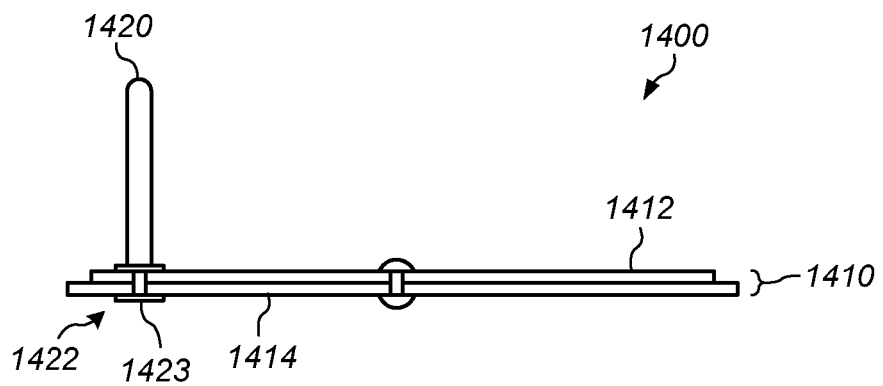

An alternate embodiment of a collection system is depicted in FIGS. 22A and 22B. Collection system 1400 includes a collection substrate 1410 that includes at least a first disk 1412 and a second disk 1414. First disk 1412 includes a plurality of grooves 1413 and second disk 1414 includes a plurality of grooves 1415. First disk 1412 is coupled to second disk 1414 such that portions of the grooves of the first and second disks are aligned, as depicted in FIG. 22A. Grooves 1413 of first disk 1412 are formed extending radially in a direction from the center of the first disk. Grooves 1415 of second disk 1414 are formed such that, when the centers of the first disk and second disk are coupled together, grooves 1415 of the second disk are at an angle with respect to grooves 1413 of the first disk. In some embodiments, grooves 1415 on second disk 1413 form an angle of about 45 with respect to grooves 1413 on first disk 1412, when the first disk and the second disk are coupled together. Collection elements 1420 are coupled to first disk 1412 and second disk 1414. In one embodiment, a coupling portion 1422 of collection element 1420 extends through one of grooves 1413 in first disk 1412 and one of grooves 1415 of second disk 1414, as depicted in FIG. 22B. Coupling portion 1422 may include a fastener 1423 coupled to the coupling portion to help inhibit removal of collection element 1420 from collection substrate 1410. With collection elements 1420 coupled to first disk 1412 and second disk 1414, the position of the collection elements may be altered by rotating the first disk with respect to the second disk. For example, in the embodiment depicted in FIG. 22A, as first disk 1412 is rotated in a clockwise direction, collection elements 1420 are forced along groove 1413 of the first disk and groove 1415 of second disk 1414 to a position further away from the center of the disks. In this manner, the effective diameter of the collection system (i.e., the distance the collection elements are from the center of the collection substrate) may be increased by clockwise of first disk 1412. To decrease the effective diameter of the collection system, first disk 1412 may be rotated in a counter-clockwise direction, causing collection elements 1420 to move toward the center of the first and second disks.

Figure 23A:
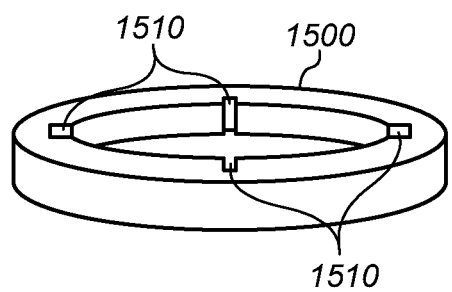
FIGS. 23A-23C depict embodiments of a collection system having removable collection substrates.
Figure 23B:
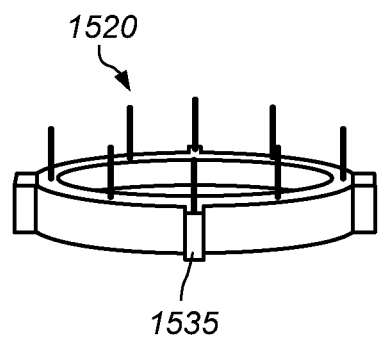
Figure 23C:
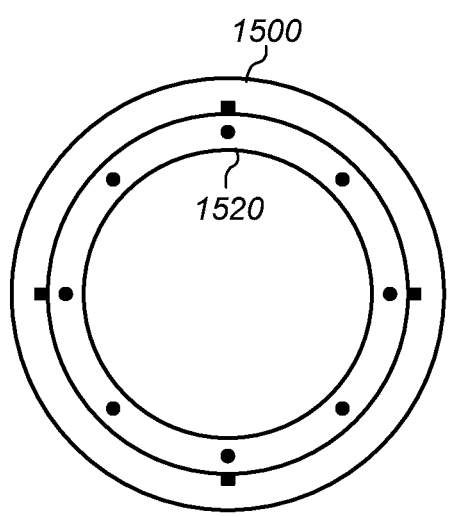

An alternate collection system is depicted in FIGS. 23A-23C. In an embodiment, a fiber producing device and a collection system are placed in a collection container. The collection system includes one or more collection elements coupled to a collection substrate. The collection substrate may be removably positionable within the collection container to adjust the position of the collection elements. In one embodiment, the collection elements are arcuate projections extending from the collection substrate, as previously described. FIG. 23A depicts an embodiment of a collection container 1500 capable of receiving a collection substrate. For example, a collection container 1500 may include one or more indentations 1510, configured to mate with one or more collection tabs formed on a collection substrate. FIG. 23B depicts a collection substrate 1520 having collection tabs 1525 that may be used to couple the collection substrate to collection container 1500. For example, tabs 1525 of collection substrate may be matched with indentations 1510 of collection container 1500 to allow the collection substrate to be removably positioned in the collection contained. FIG. 23C depicts collection substrate 1520 placed in a collection container 1500.

When desired, collection substrate 1520 may be removed from collection container 1500 and an alternate collection substrate may be placed in the collection container. For example, a collection substrate that includes collection elements that are closer or farther from the center of the collection container. In other embodiments, the collection substrate may be removed from the collection container and replaced with a collection substrate having collection elements positioned in different positions than the removed collection substrate. In this manner, the orientation of the collection elements may be modified without having to individually remove collection elements.

Figure 24:
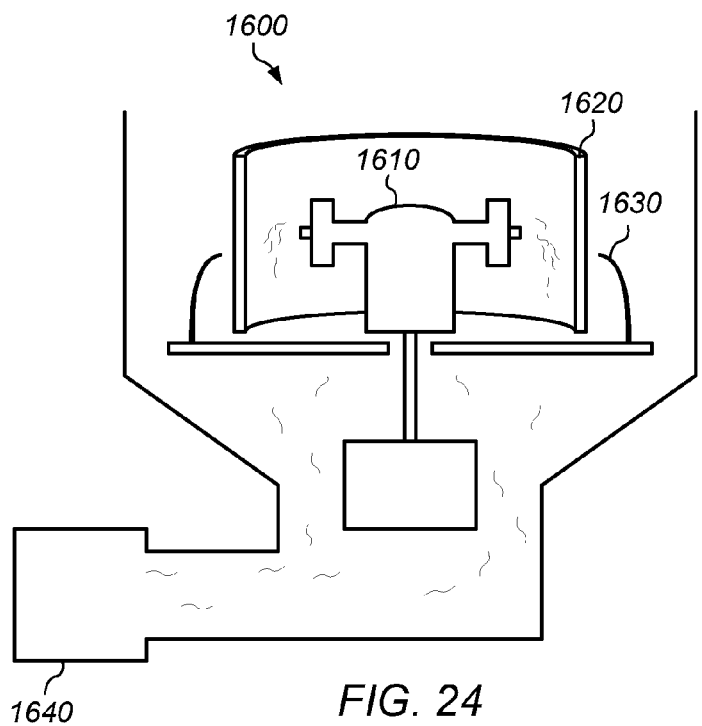
FIG. 24 depicts an embodiment of a diversion device coupled to a collection system.

For many applications, it may be desirable to substantially continuously produce nanofibers and/or microfibers. For fiber producing systems that make use of fiber collection elements, the removal of fiber from the collection system typically requires a stoppage of fiber production to allow removal of fibers from the collection elements. In an alternate embodiment a diversion device may be used to allow fiber production to continue while the produced fibers are being collected. FIG. 24 depicts an embodiment of a fiber producing system 1600 that includes a fiber producing device 1610 and a diversion device 1620 positionable between the fiber producing device and collection elements 1630. As fibers are produced by the fiber producing device 1610, the fibers may be collected on collection elements 1630 that are disposed around the fiber producing device. As the amount of fiber collected on collection elements 1630 increases, the collection elements may reach a point that the fibers are no longer being collected on the collection element and instead are being deposited inside the interior of the system. At this point the fibers may need to be removed from the collection element before further collection of the fibers may be accomplished. In an embodiment, a diversion device 1620 may be positioned between fiber producing device 1610 and the collection elements 1630 to divert the fibers being produced by the fiber producing device into a collection container 1640. While the fibers are diverted, material from collection elements 1630 may be removed and collected. Once collection elements 1630 are sufficiently cleared, diversion device 1620 may be removed and collection of the fibers on collection elements 1630 may be continued. In this way fiber collection may be accomplished without stopping the fiber producing device. The diverted fibers collected in the collection container may be used to form products, or recycled by combining with unspun material to form a material feed for the fiber producing device. In this manner, waste of material may be minimized.

Diversion may also be used at startup of the fiber producing system. For example, when rotation of the fiber producing device is initiated, the fibers being produced may not meet the desired specifications regarding size and/or consistency. The diversion device may be positioned between the fiber producing device and the collection elements in order to divert the produced fibers until the desired quality requirements are met, typically after a predetermined time. Once the desired fibers are being produced the diversion system may be removed to allow the fibers to be collected on the collection elements. The diverted material may be disposed of, reintroduced into the fiber producing device, or blended with unused material to form a material feed for the fiber producing device.

The conditions of the environment in which fibers are created may influence various properties of those fibers. For example, some metallic fibers, such as iron fibers, react with ambient air (becoming converted to iron oxides). For such applications, it is preferable to replace ambient air with an inert gas (e.g., nitrogen, helium, argon). Humid conditions may detrimentally affect the surfaces of many polymeric fibers, such as poly(ethylene oxide) (PEO) fibers. Thus, lowering humidity levels is preferable for processing of some materials. Similarly, drugs may be required to be developed under sterile conditions that are not maintained in ambient conditions, a sterile environment is therefore preferred in such situations.

The "environment" refers to the interior space defined by the housing that surrounds the components of a fiber producing device. For certain uses, the environment may simply be ambient air. Air may be blown into the environment, if desired. For other uses, the environment may be subjected to low-pressure conditions, such as from about 1 mm Hg to about 760 mm Hg, or any range derivable therein using, for example, a vacuum pump. Alternatively, the environment may be subjected to high-pressure conditions, such as conditions ranging from 761 mm Hg up to 4 atm or higher using, for example, a high pressure pump. The temperature of the environment may be lowered or raised, as desired, through the use of heating and/or cooling systems, which are described below. The humidity level of the environment may be altered using a humidifier, and may range from 0% to 100% humidity. For certain applications, such as drug development, the environment may be rendered sterile. If the components of an apparatus are each made of, for example, stainless steel, all components may be individually sterilized and assembled, such as in a clean room under conditions that maintain the sterility of the apparatus.

Several types of heating and cooling sources may be used in apparatuses and methods as discussed herein to independently control the temperature of, for example, a fiber producing device, a collection wall, an intermediate wall, a material, and/or the environment within an apparatus. Examples of heat sources that may be employed include resistance heaters, inductive heaters and radiant heaters (e.g. infrared heaters). Peltier or Thermoelectric Cooling (TEC) devices may be used for heating and/or cooling purposes. Cold gas or heated gas (e.g., air or nitrogen) may also be pumped into the environment for cooling or heating purposes. Conductive, convective, or radiation heat transfer mechanisms may be used for heating and cooling of various components of the apparatuses.

Figure 25:
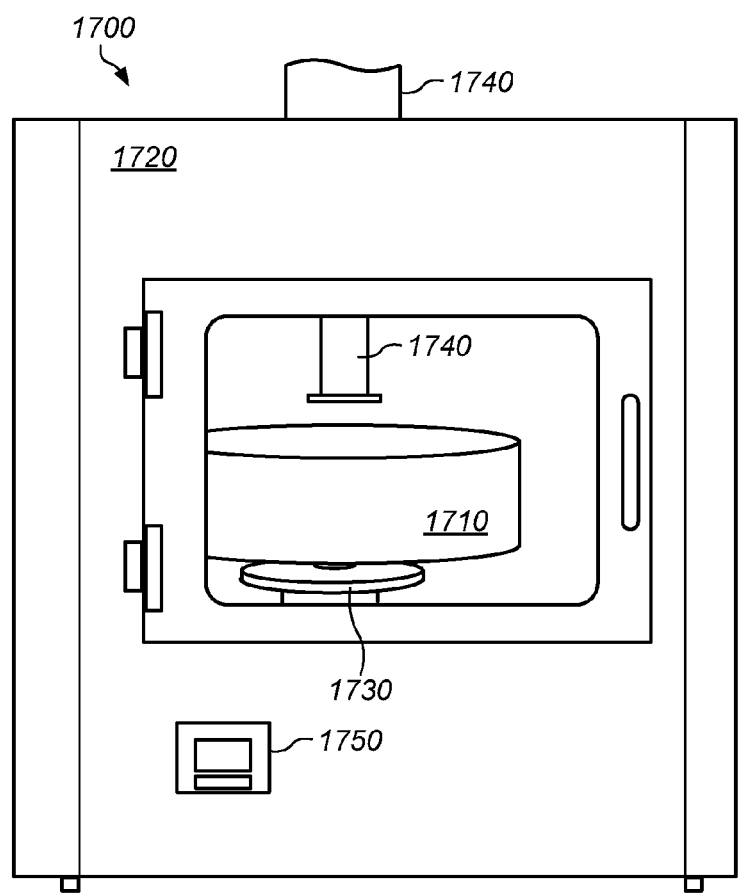
FIG. 25 depicts a fiber producing system disposed in a housing.

FIG. 25 shows a perspective view of an embodiment of a fiber producing system 1700. System 1700 includes a fiber producing device disposed in a collection container 1710 as has been previously described. Collection container 1710 is positioned in housing 1720, which creates an enclosed environment for fiber production. Driver 1730, such as a variable speed motor, is coupled to a fiber producing device disposed in collection container 1710. A heating unit (not shown) is enclosed within housing 1720 and directs heat (thermal energy) to the fiber producing device and/or the environment. While a single fiber producing system is depicted in the housing, it should be understood that multiple fiber producing systems may be disposed in the same housing. In some embodiments, multiple fiber producing systems may be coupled to multiple drivers and disposed in a housing. In some embodiments, multiple fiber producing systems may be coupled to a single driver, for example, on a single driver axel that is coupled to the multiple fiber producing devices.

An inlet port 1740 is coupled to housing 1720, extending into the interior of the housing. Inlet port 1740 may be used to input gasses (e.g., gases such as air, nitrogen, helium, argon, etc.) into the internal environment of housing 1720, or allows gasses to be pumped out of the internal environment of the housing 1720. Inlet port 1740 may also include one or more conduits for conveying material to the fiber producing device. For example, a fiber producing device may include an opening in the top surface of the device, as has been shown previously. Alignment and/or coupling of an inlet tube with the opening may allow material to be sent to the fiber producing device when the device is being prepared to be used, or while the device is spinning (to allow continuous production of fibers) while the housing is closed.

Indicators for power and electronics and control switches 1750 are positioned on the exterior of a wall of housing 1720. A control system of the fiber producing system may allow a user to change certain parameters (e.g., RPM, temperature, and environment) to influence fiber properties. One parameter may be changed while other parameters are held constant, if desired. One or more control boxes in an apparatus may provide various controls for these parameters, or certain parameters may be controlled via other means (e.g., manual opening of a valve attached to a housing to allow a gas to pass through the housing and into the environment of an apparatus). It should be noted that the control system may be integral to the apparatus (as shown in FIG. 25) or may be separate from the housing. For example, a control system may be modular with suitable electrical connections to the fiber producing system.

Components of apparatuses may be made from a variety of materials. In certain embodiments, the components of an apparatus may be made from stainless steel. For example, the fiber producing device, collection wall and housing may each be made from stainless steel. In this situation, the components may be used for, e.g., low melting metals like tin (232° C.), zinc (420° C.), silver (962° C.) and alloys thereof. In certain embodiments, ceramic components may be used for high melting alloys, such as gold (1064° C.) and nickel (1453° C.). Manipulation of high melting alloys may require blanketing the environment of the components with an inert gas, such as nitrogen or helium, with appropriate sealing of the housing.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e.g., thinner), may also impact strain rate. Strain rates may be controlled by a variable speed fiber producing device. Strain rates applied to a material may be varied by, for example, as much as 50-fold (e.g., 1000 rpm to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For melt spinning of polymers, a fiber producing device may be kept at a temperature of up to 200° C. For melt spinning involving metals, a fiber producing device may be kept at temperatures of 450° C. or higher. For solution spinning, ambient temperatures of the fiber producing device are typically used. In drug development studies the temperature of the fiber producing device may be between, for example, 4° C. and 80° C. When producing ceramic or metal fibers, the temperatures utilized may be significantly higher. For higher temperatures, it will typically be necessary to make appropriate changes in the materials of the housing of an apparatus and/or the interior components (e.g., substitution of metal for plastic), or in the apparatus itself (e.g., addition of insulation). Such changes may also help avoid undesirable reactions, such as oxidation.

The level of material in the fiber producing device may be monitored by a control system. In an embodiment, inlet port 1730 may include one or more fluid sensors that are positioned proximate to the fiber producing device, in a position that allows the fluid sensor to measure the level of fluid in the fiber producing device. In one embodiment, a fluid sensor is an optical fluid level sensor that is optically coupled to the fluid in the fiber producing device. Examples of optical fluid sensors include, but are not limited to, laser fluid sensors, infrared fluid sensors, and ultraviolet fluid sensors. Optical fluid sensors include LED based fluid sensors. In other embodiments, a fluid level sensor is an ultrasonic fluid level sensor. The fluid sensor may be coupled to a controller. During use, controller may discontinue production of fibers if the fluid level in the fiber producing device is below a predetermined level. In other embodiments, controller may send a control signal to a material supply source to send more material into the fiber producing device, if the fluid level inside of the fiber producing device falls below a predetermined level. Inlet port 1730 may include one or more conduits coupled to a material supply source that conveys the material to the fiber producing device when a control signal is received.

Figure 26:
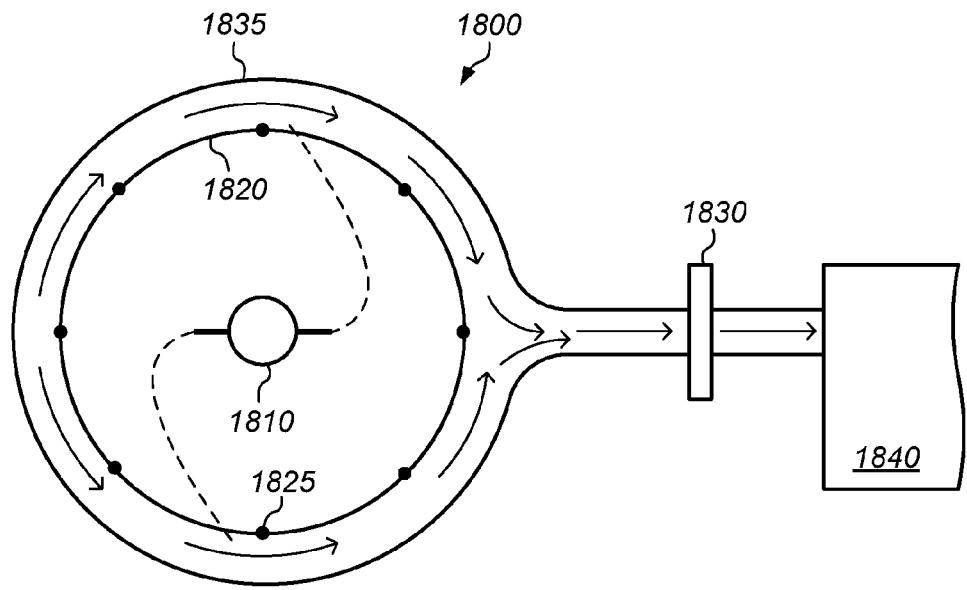
FIG. 26 depicts a fiber producing system having a gas flow collection system.

Generally, it is preferred that fibers produced in a fiber producing system are collected without being contacted by the users. An embodiment of a fiber producing system that includes a collection system is depicted in FIG. 26. Fiber producing system 1800 includes a fiber producing device 1810 coupled to a driver. A collection system 1820 at least partially surrounds fiber producing device 1810. Collection system 1820 may include one or more collection elements 1825 positioned around fiber producing device 1810, a gas flow device 1830, a collection conduit 1835 and a collection chamber 1840. During use fibers produced by fiber producing device 1810 are collected on collection elements 1825. As the amount of fiber collected on collection elements 1825 increases, the collection elements may reach a point that the fibers begin to be deposited inside collection conduit 1835. Activation of gas flow device 1830 creates a flow of gas through the fiber producing system flowing toward a collection chamber 1840. In an embodiment, gas flows from collection elements 1820 toward collection chamber 1840. The flow of gas may dislodge collected fiber from collection elements 1825 and direct the dislodged fibers toward collection chamber 1840. In one embodiment, gas flow device 1830 is activated when the fibers collected on collection elements 1825 reach a predetermined amount. Alternatively, gas flow device 1830 may be run continuously as the fibers are produced. The collection system may further include a collection conduit 1835 surrounding at least a portion of the fiber producing device. Collection chamber 1840 is coupled to collection conduit 1835. Gas flow device 1830 is coupled to collection conduit 1835. Gas produced by gas flow device 1830 creates a current of gas flowing through collection conduit 1835 toward collection chamber 1840. The produced fibers are transferred through collection conduit 1835 to collection chamber 1840 by the gas flow produced by the gas flow device. Collection conduit 1835 may be a separate conduit formed to conduct the fiber to the chamber. Alternatively, a wall of a collection container, as described earlier, may define at least the outer wall of the collection conduit.

In another embodiment, collection elements 1825 may be cutting elements (e.g., wires) that are capable of cutting and/or breaking the fibers that are produced by the fiber producing device. The wires may extend from a bottom surface of the collection substrate toward a top surface of the collection system. The cut or broken fibers are pulled by the gas produced by the gas flow device, through a collection conduit, into the chamber.

Figure 27:
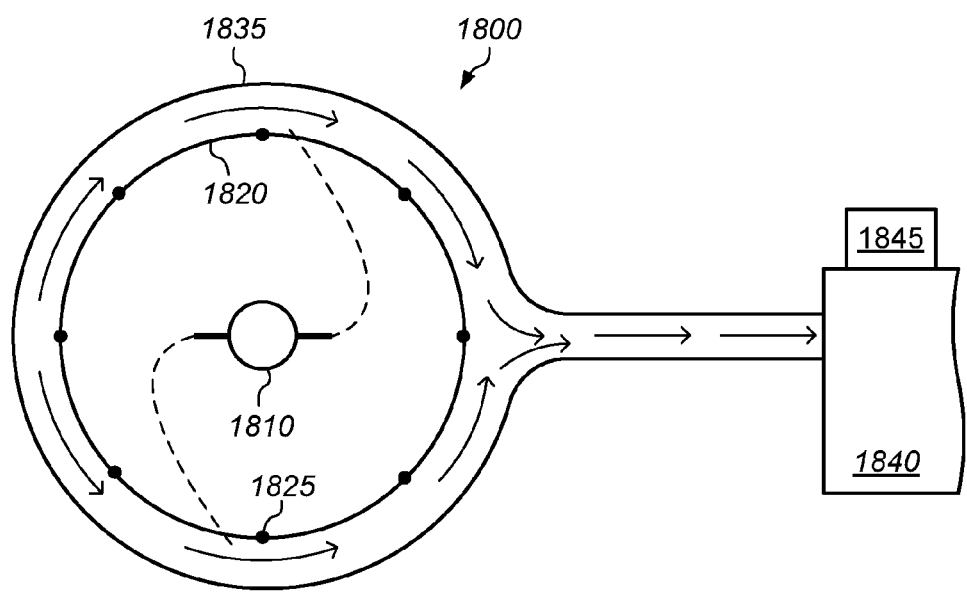
FIG. 27 depicts a fiber producing system having a vacuum collection system.

An embodiment of a fiber producing system that includes a collection system is depicted in FIG. 27. Fiber producing system 1800 includes a fiber producing device 1810 coupled to a driver. A collection system 1820 at least partially surrounds fiber producing device 1810. Collection system 1820 may include one or more collection elements 1825 positioned around fiber producing device 1810, a gas flow device 1830, a collection conduit 1835 and a collection chamber 1840. During use fibers produced by fiber producing device 1810 are collected on collection elements 1825. As the amount of fiber collected on collection elements 1825 increases, the collection elements may reach a point that the fibers begin to be deposited inside collection conduit 1835. Activation of a vacuum device 1845, positioned, e.g., in a collection chamber creates a flow of gas through the fiber producing system flowing toward the collection chamber 1840. In an embodiment, gas flows from collection elements 1820 toward collection chamber 1840. The flow of gas may dislodge collected fiber from collection elements 1825 and direct the dislodged fibers toward collection chamber 1840. In one embodiment, gas flow device 1830 is activated when the fibers collected on collection elements 1825 reach a predetermined amount. Alternatively, gas flow device 1830 may be run continuously as the fibers are produced. The collection system may further include a collection conduit 1835 surrounding at least a portion of the fiber producing device. Collection chamber 1840 is coupled to collection conduit 1835. Gas flow device 1830 is coupled to collection conduit 1835. A vacuum device 1845 creates a current of gas flowing through collection conduit 1835 toward collection chamber 1840. The produced fibers are transferred through collection conduit 1835 to collection chamber 1840 by the gas flow produced by the gas flow device. Collection conduit 1835 may be a separate conduit formed to conduct the fiber to the chamber. Alternatively, a wall of a collection container, as described earlier, may define at least the outer wall of the collection conduit.

In another embodiment, collection elements 1825 may be cutting elements (e.g., wires) that are capable of cutting and/or breaking the fibers that are produced by the fiber producing device. The wires may extend from a bottom surface of the collection substrate toward a top surface of the collection system. The cut or broken fibers are pulled by the gas produced by the gas flow device, through a collection conduit, into the chamber.

Figure 28:
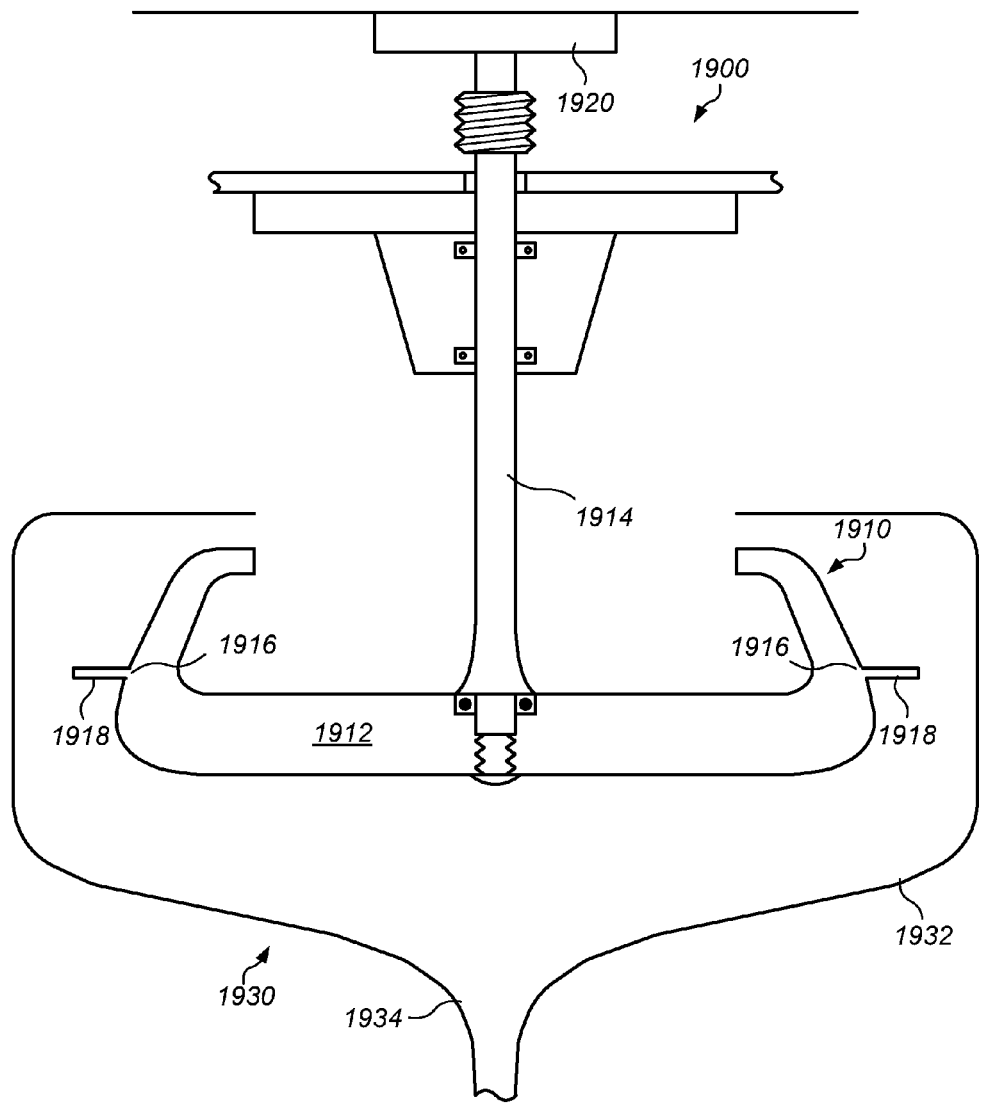
FIG. 28 depicts a fiber producing system with a driver mounted above the fiber producing device.

Another embodiment of a fiber producing system is depicted in FIG. 28. Fiber producing system 1900 includes a fiber producing device 1910. Fiber producing device includes a body 1912 and a coupling member 1914. Body 1912 comprises one or more openings 1916 through which material disposed in the body may pass through during use. One or more outlet elements 1918 (e.g., nozzles, needles, needle ports or outlet conduits) may be coupled to one or more openings 1916. As discussed previously, interior cavity of the body may include angled or rounded walls to help direct material disposed in body 1912 toward openings 1916. Coupling member 1914 may be an elongated member (as depicted in FIG. 28) extending from the body which may be coupled to a portion of a driver 1920 (e.g., a chuck or a universal threaded joint of the driver). Alternatively, coupling member may be a receiver which will accept an elongated member from a driver (e.g., the coupling member may be a chuck or a universal threaded joint).

Fiber producing system may include a driver 1920 coupled to coupling member 1914. Driver 1920 is positioned above fiber producing device 1910 when the fiber producing device is coupled to the driver. Driver 1920 is capable of rotating fiber producing device 1910 during use. Suitable drivers include commercially available variable electric motors, such as a brushless DC motor.

Fiber producing system 1900 may further include a collection system 1930. Collection system may include a collection wall 1932 at least partially surrounding fiber producing device 1910. Collection system 1930 may further include a collection conduit 1934 coupled to collection wall 1932. Collection conduit 1934, in one embodiment, may be an integral part of collection wall 1932. During use, fibers produced by fiber producing device 1910 may collect on collection wall 1932 and be transferred to collection conduit 1934. In one embodiment, collection conduit 1934 is positioned below fiber producing device 1910 such that the produced fibers are collected on collection wall 1932 and fall into the collection conduit. In some embodiments, a gas flow device (not shown) or a vacuum system (not shown) may be used to create a gas stream conducting fibers from collection wall 1932 toward collection conduit 1934. Collection conduit 1934 may be coupled to a collection chamber that is used to collect fibers.

Figure 29:
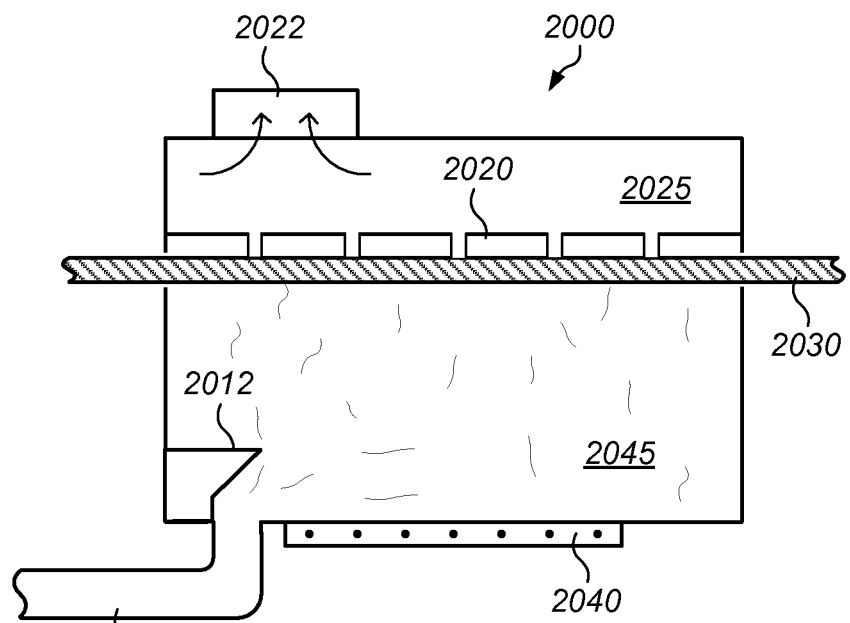
FIG. 29 depicts an embodiment of a portion of fiber producing system configured for deposition of fibers on a substrate.

In an embodiment, a fiber producing system may be used to deposit microfibers and/or nanofibers on a substrate. An embodiment of a deposition system 2000 configured for deposition of fibers on a substrate is shown in FIG. 29. Any fiber producing device, as described previously may be coupled to deposition system 2000. Deposition system 2000 includes an inlet conduit 2010 and a substrate support 2020. Inlet conduit 2010 may be coupled to either a fiber producing device, or a collection chamber that collects fibers from a fiber producing device. During use fibers are conducted through inlet conduit 2010 into deposition system 2000 where the microfibers and/or nanofibers produced by the fiber producing device are deposited onto a substrate 2030. A substrate 2030 may be held in a fixed position by substrate support 2020. Substrate support 2020 may position substrate 2030 in a flow of microfibers and/or nanofibers created in deposition system 2000.

In an embodiment, a flow of fibers may be created using a gas flow system, a vacuum, or a combination of a gas flow system and vacuum. For example, in one embodiment, a gas flow generator 2040 may be disposed in a bottom of deposition system 2000. During use a flow of gas is created, flowing from the bottom of deposition system 2000 toward substrate 2030. The fibers that are generated and passed to deposition system 2000 are directed into the substrate by the gas flow. Alternatively, a fiber collection system coupled to inlet conduit 2010 may produce a gas flow, as described above, that causes a stream of fibers to flow through the inlet conduit into deposition system 2000. A fiber deflector 2012 may be coupled to inlet conduit 2010 to direct incoming fibers toward substrate 2030.

In an alternate embodiment, a vacuum device 2022 is coupled to deposition system 2000. In an embodiment, vacuum system 2022 is coupled to substrate support 2020. During use, a vacuum is applied to an upper chamber 2025 formed between substrate support 2020 and the top of deposition system 2000. A lower chamber 2045 is defined by substrate support 2020 and the bottom of deposition system 2000. Lower chamber 2045 includes inlet conduit 2010. Substrate support 2020 may have one or more openings 2024 that pass through the substrate support, coupling upper chamber 2025 to lower chamber 2045. Application of a vacuum to upper chamber 2025 creates a flow of gas from lower chamber 2045 thorough substrate support 2020, to upper chamber 2025. Thus fibers disposed in lower chamber are drawn toward and into substrate 2030 disposed on substrate support 2020. A vacuum created in upper chamber may also provide a holding force to hold substrate 2030 against substrate support 2020.

In an embodiment, both a gas flow device and a vacuum system may be used together to create a flow of fibers in deposition system 2000. For example, gas flow device 2040 may be disposed at the bottom of deposition system 2000, or may be part of the fiber producing system coupled to the deposition system. Gas flow device 2040 creates a flow of fibers through inlet conduit 2010 into deposition system 2000 and toward substrate 2030. Deposition system 2000 may also include a vacuum device 2022 coupled to upper chamber 2025. During use, a vacuum is applied to upper chamber 2025 creating a flow of gas from lower chamber 2045 toward the upper chamber. Gas coming in from gas flow device 2040 or from inlet conduit, helps provide a gas flow from lower chamber 2045 toward the substrate 2030. The fibers directed to substrate 2030, in some embodiments, may become at least partially embedded in the substrate.

In an embodiment, deposition system 2000 may be used to deposit microfibers and/or nanofibers on a moving substrate. In an embodiment, substrate support 2020 may allow substrate 2030 to be moved through deposition system 2000, positioning the portion of the substrate that is disposed in the deposition system in a flow of microfibers and/or nanofibers. In an embodiment, a substrate 2030 may be a sheet of material having a length that is longer than the length of deposition system 2000. The sheet of material may be passed through deposition system 2000 at a rate that allows a predetermined amount of fibers to be deposited on the substrate before the substrate exits the deposition system. The substrate may be coupled to a substrate conveyance system that moves the substrate through the deposition system.

Figure 30:
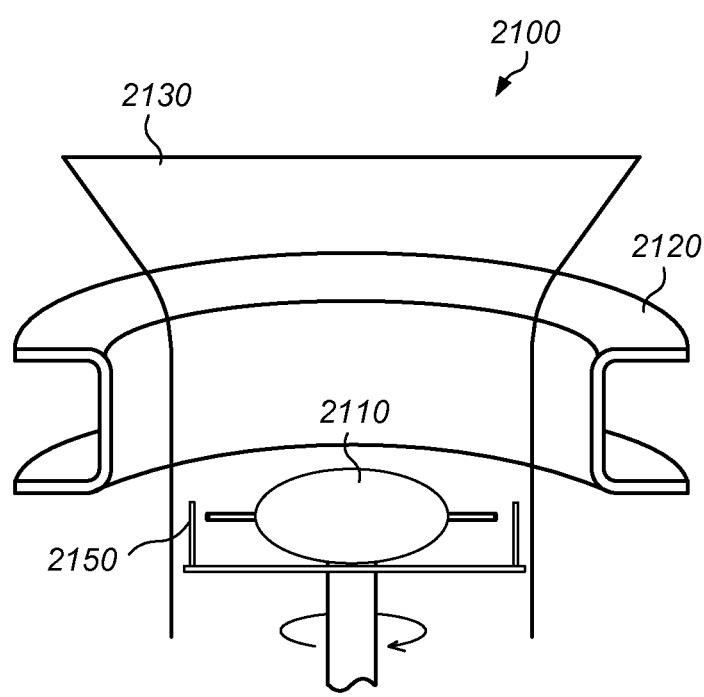
FIG. 30 depicts an embodiment of a fiber producing system configured for continuous deposition of fibers on a substrate.

An alternate embodiment of a continuous feed substrate deposition system is depicted in FIG. 30. In FIG. 30 deposition of microfibers and/or nanofibers is performed in the fiber producing system, rather than in a separate deposition system. For example, in place of the collection elements described above with respect to fiber producing systems, fiber producing system 2100 includes a substrate support 2120 positioned around at least a portion of a fiber producing device 2110. As depicted in FIG. 30, a substrate support 2120 may be configured for continuous feeding of a substrate 2130 past fiber producing device 2110. Alternatively, substrate support 2120 may hold an entire substrate proximate to the fiber producing device. In the embodiment depicted in FIG. 30, substrate support 2120 is curved around at least a portion of fiber producing device 2110. In some embodiments, substrate support 2120 may be positioned substantially completely around fiber producing device 2110. Substrate support 2120 includes a substantially rounded edge that allows continuous feed of the substrate at an angle. During use, a substrate may be fed through the fiber deposition system over substrate support 2120. As the substrate is fed through the fiber producing system, fiber producing device 2110 may be operated to produce microfibers and/or nanofibers that are deposited on the substrate.

In an embodiment, to control fiber length, one or more cutting elements 2150 may be positioned between fiber producing device 2110 and substrate support 2120. Cutting elements 2150 may be positioned to cut and/or break fibers, produced by the fiber producing device prior to the fibers reaching the substrate.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester, polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or micro-electric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning. Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 1 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

Figure 32:
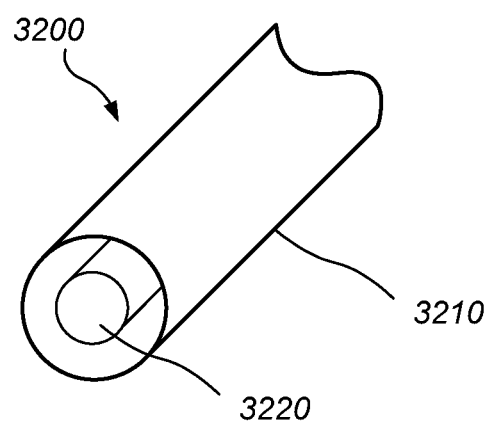
FIG. 32 depicts a coaxial outlet element.

In one embodiment, coaxial fibers may be produced using an outlet element having a two or more coaxial conduits. FIG. 32 depicts an outlet element 3200 having an outer conduit 3210 and an inner conduit 3220. The inner conduit 3220 is sized and positioned inside of the outer conduit 3210 such that the material may flow through the inner conduit and the outer conduit during use. The outlet element 3200 depicted in FIG. 32 may be part of a needle or nozzle (e.g., a nozzle tip). The use of an outlet element 3200 having coaxial conduits allows the formation of coaxial fibers. Different materials may be passed through each of conduits 3210/3220 to produce fibers of mixed materials in which an inner fiber (produced from the inner conduit) is at least partially surrounded by an outer fiber (produced from the outer conduit). The formation of coaxial fibers may allow fibers to be formed having different properties that are selectable based on the materials used to form the fibers. Alternatively, the same material passes through each of conduits 3210/3220 forming a coaxial fiber formed from the same material.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid).

In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly(methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP).

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or a ceramic oxides (e.g., PVP with germanium/palladium/platinum).

The fibers that are created may be, for example, one micron or longer in length. For example, created fibers may be of lengths that range from about 1 µm to about 50 cm, from about 100 µm to about 10 cm, or from about 1 mm to about 1 cm. In some embodiments, the fibers may have a narrow length distribution. For example, the length of the fibers may be between about 1 µm to about 9 µm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for clean up. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Figure 31:
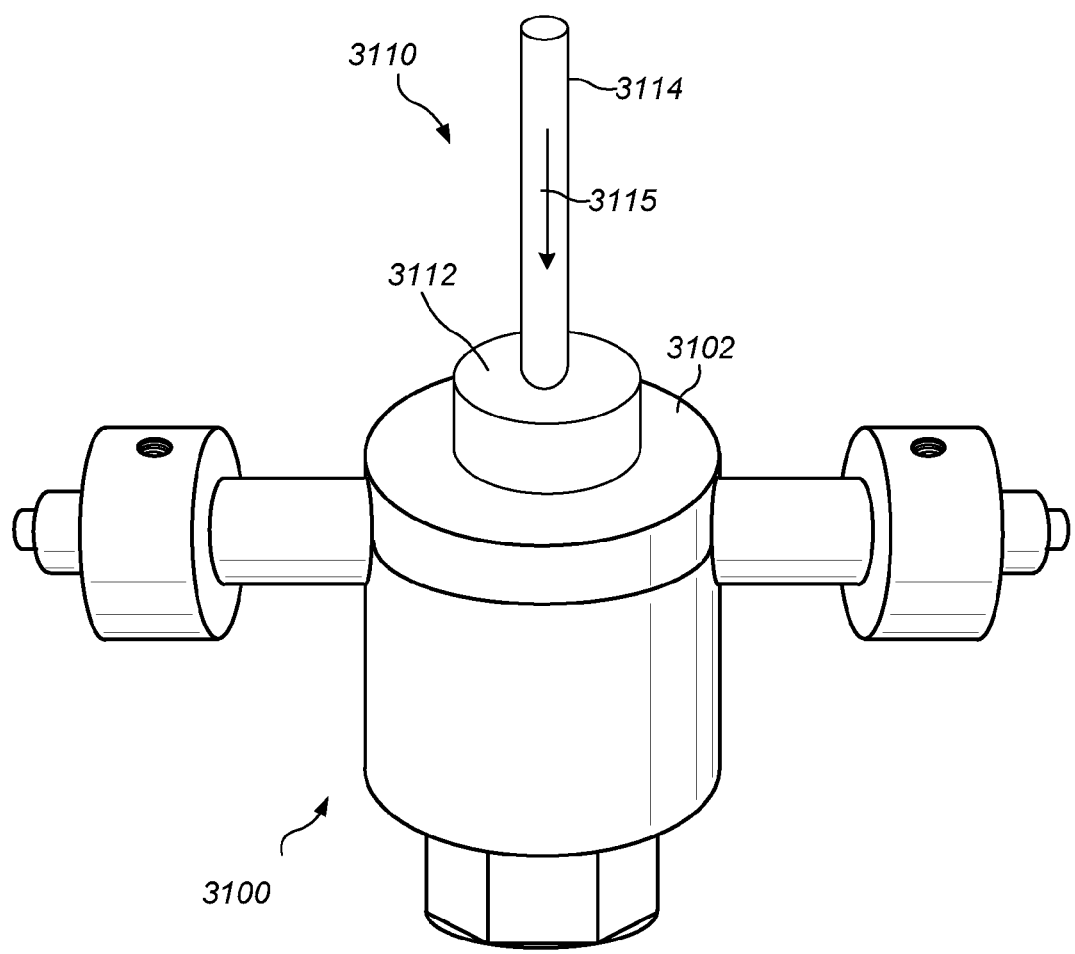
FIG. 31 depicts an embodiment of a purge system coupled to a fiber producing device.

Purge system may be coupled to an opening of the fiber producing device used to feed material into the body of the fiber producing device. In an embodiment, a purge system 3110 is coupled to body 3120 of a fiber producing device 3100, as depicted in FIG. 31. The purge system is couplable to a body 3102 of the fiber producing device. Purge system 3110 includes a sealing member 3112 coupled to a gas transfer member 3114. When coupled to body, sealing member 3112 may form a seal between an opening (depicted in FIG. 7) of fiber producing device 3100 and the purge system sealing member 3112 such that pressurized gas 3115 may be sent into the fiber producing device. During use, gas transfer member may be coupled to a pressurized gas source through a conduit. The pressurized gas may force any material disposed in an opening out of the openings (and any devices coupled to the openings) to clear material out the fiber producing device. All of the material in the fiber producing device may be forced out of the openings such that the fiber producing device is substantially clear of material and ready for the next use. Alternatively, material may remain in the fiber producing device after purging, however, the material in the openings and any devices coupled to the opening may be cleared out. In this manner the openings, which are generally more difficult to clean, are cleaned prior to the discontinuation of fiber production.

In one embodiment, a material feed inlet is coupled to a fiber producing device such that material may be substantially continuously fed to the fiber producing device (as shown in FIG. 25). Material feed line may be coupled to a material supply source. In an embodiment, material feed inlet may also be coupled to a purge gas source. One or more valves may be disposed between the purge gas source, the supply source and the material feed inlet to allow switching between the material and the purge gas. In an embodiment, material may pass through the material inlet into the fiber producing device during fiber production. When fiber production is to be discontinued, the vales(s) may be switched too allow purge gas to pass through the material inlet and into the fiber producing device, driving at least some of the material out of the openings and any devices coupled to the openings. One or more of the valves may be coupled to a controller that automatically performs a purge during a programmed or user selected shutdown of the system.

Figure 33:
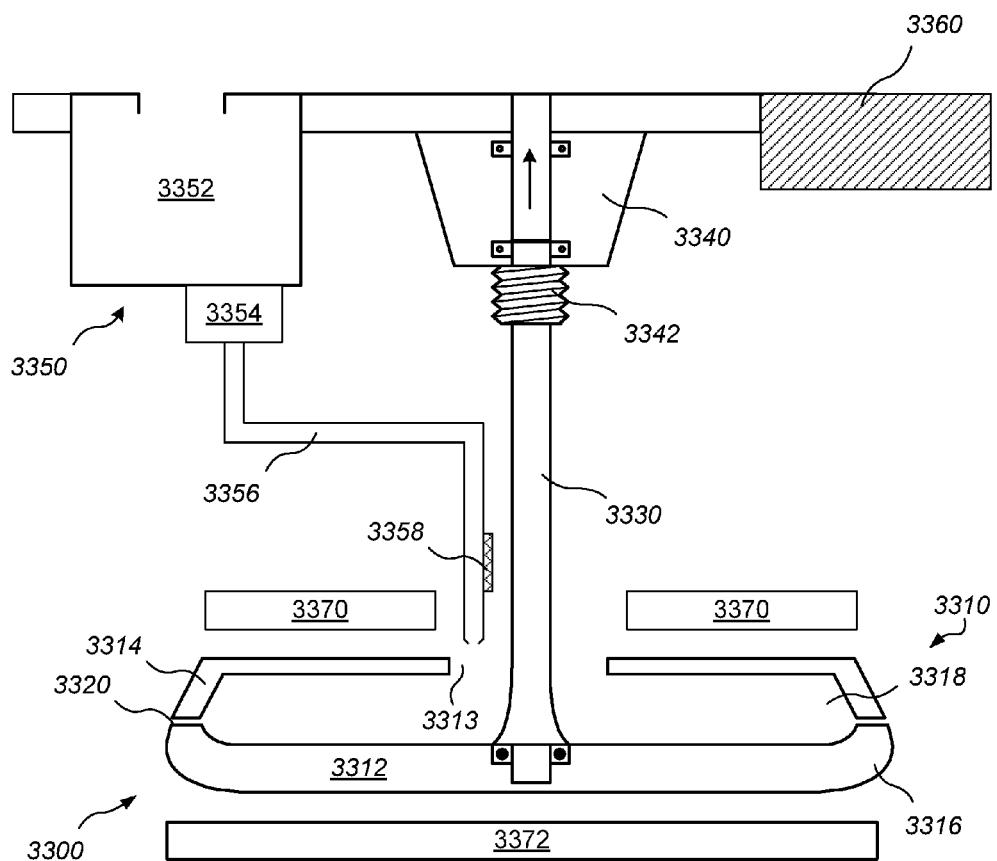
FIG. 33 depicts an inverted fiber producing system having a continuous liquid mixture feed.

Another embodiment of a fiber producing system is depicted in FIG. 33. Fiber producing system 3300 includes a fiber producing device 3310. Fiber producing device includes a body 3312 and a coupling member 3314. In one embodiment, body 3312 comprises a first member 3314 and a second member 3316 coupled together. Alternatively, body 3312 may be a single unitary member. First member 3314 and second member 3316 together define an internal cavity 3318. One or more openings 3320 extend through the body through which material disposed in the body may pass through during use. One or more outlet elements (e.g., nozzles, needles, needle ports or outlet conduits) may be coupled to one or more openings 3320. As discussed previously, internal cavity of the body may include angled or rounded walls to help direct material disposed in internal cavity 3318 of body 3312 toward openings 3320.

Coupling member 3330 may be an elongated member extending from the body. In one embodiment, coupling member 3330 is coupled to the second member 3316 of body 3312 and extends away from the second member through internal cavity 3318. Coupling member 3330 may be used to couple fiber producing device 3310 to a coupling element 3342 of a driver 3340 (e.g., a chuck coupler or a universal threaded joint of the driver). Alternatively, coupling member may be a receiver which will accept an elongated member from a driver (e.g., the coupling member may be a chuck or a universal threaded joint). Coupling element 3342 of driver may interact with coupling member 3330 of the fiber producing device to allow the coupling member to be adjustably positionable in the coupling element such that the distance between the fiber producing device and the driver is alterable. This may be useful for applications where the produced fibers are delivered to a substrate positioned below the fiber producing device. Assuming the substrate and driver are at a fixed distance from each other, altering the vertical distance between the fiber producing device and the driver also alters the vertical distance between an underlying substrate and the fiber producing device. Being able to alter the distance between the underlying substrate and the fiber producing device allows the fiber deposition patterns to be altered and customized for different substrates.

Fiber producing system 3300 may include a driver 3340 coupled to coupling member 3330. Driver 3340 is positioned above fiber producing device 3330 when the fiber producing device is coupled to the driver. Driver 3330 is capable of rotating fiber producing device 3310 during use. Suitable drivers include commercially available variable electric motors, such as a brushless DC motor.

Fiber producing system 3330 may further include a material delivery system 3350. Material delivery system 3350 includes a material storage container 3352, a pump 3354, and a conduit 3356 for conducting a liquid mixture to fiber producing device 3310. A mixture of material in a liquid is stored in storage container 3352. A mixture of material in a liquid may be formed by dissolving the material in a suitable solvent to form a solution of the material. The mixture of material in a liquid is transferred to fiber producing device 3352 using pump 3354 coupled to storage container 3352. Pump 3352 collects the liquid mixture and creates a flow of liquid material through conduit 3356. The liquid mixture enters fiber producing device 3310 from conduit 3356 through an opening 3313 formed in the fiber producing device. A fluid level sensor 3358 is optically coupled to the liquid mixture disposed in the fiber producing device. Fluid sensor 3358 provides a measurement of the amount of fluid disposed in the fiber producing device. During use, the pump flow rate may be adjusted based on the amount of fluid in the fiber producing device. In one embodiment, material delivery system 3350 substantially continuously delivers material to fiber producing device 3310 while the fiber producing device is rotating. Positioning of conduit 3356 outside of the fiber producing device allows continuous delivery of material while the fiber producing device is rotating.

Driver 3340 may be mounted to arm 3360. In one embodiment, arm 3360 may be coupled to a support (not shown). Arm 3360 may be coupled to a support such that the arm is movable with respect to the support. For example, arm 3360 may allow driver 3340 and the coupled fiber producing device 3310 (referred to as the "driver/fiber producing device assembly") to be moved (e.g., swung) away from the substrate to allow maintenance to be performed on the fiber producing device (e.g., changing the fiber producing device, purging the fiber producing device, etc. Arm 3360 may also allow the horizontal position of the driver/fiber producing device assembly to be altered. In an embodiment, arm 3360 allows the driver/fiber producing device assembly to be moved along a horizontal fixed path. This allows the placement of the driver/fiber producing device assembly to be altered with respect to an underlying substrate. In some embodiments, a motor may be coupled to the driver/fiber producing device assembly to allow automated movement of the driver/fiber producing device assembly with respect to the substrate.

In one embodiment, the pattern of fibers deposited by a fiber producing device 3310 in an inverted configuration, as described with respect to FIG. 33, may not be sufficient to provide uniform coverage of the underlying substrate. In order to improve coverage, the driver/fiber producing device assembly may be horizontally moved with respect to the substrate to provide a more even coverage to the underlying substrate. For example, arm may allow the driver/fiber producing device assembly to be moved along a fixed horizontal path. When the substrate is positioned below the fiber producing device, fiber production may be started and the driver/fiber producing device assembly may be horizontally moved to produce a more homogenous deposition of fibers on the substrate. The horizontal movement of the driver/fiber producing device assembly may be coordinated with the movement of the underlying substrate through the fiber deposition system. In an alternate embodiment, the arm may be configured to rotate the driver/fiber producing device assembly with respect to the substrate. Rotation of the driver/fiber producing device assembly may allow a more even distribution of the fibers in the substrate.

In some embodiments, fiber producing device may be heated. One or more heating devices 3370 and 3372, may be thermally coupled to fiber producing device 3310. In some embodiments, a heating device 3370 may be ring shaped heating device to allow the coupling member to extend through the heating device. Heating device 3372 may be a planar substrate disposed below the fiber producing device or ring shaped. In some embodiments, heating devices 3370 and 3372 may have a diameter that is less than the diameter of fiber producing device 3310. It has been generally found that during production of fibers, the produced fibers may be drawn to the heat from the heating devices if the fibers come to close to such devices. By reducing the diameter of the heating devices to be less then the diameter of the fiber producing devices, the loss of fiber due to contact with the heating devices is minimized. Further details regarding heating devices are described with respect to the heating device depicted in FIG. 39.

Figure 34:
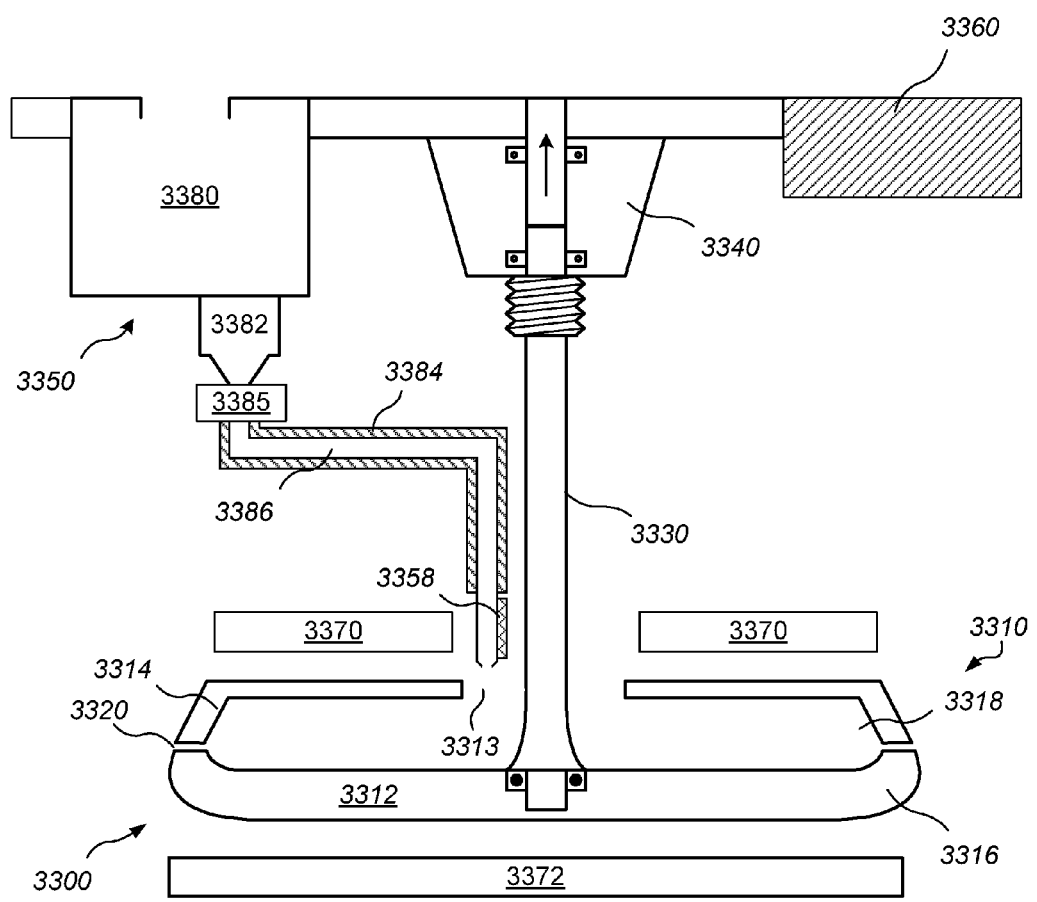
FIG. 34 depicts an inverted fiber producing device having a continuous melt feed.

Another embodiment of a fiber producing system is depicted in FIG. 34. The fiber producing system depicted in FIG. 34 is similar to the system depicted in FIG. 33. The system in FIG. 34, however, is configured for use in melt spinning procedures, while the system of FIG. 33 is configured for use in solution spinning procedures. To accommodate melt spinning processes, the material delivery system 3350 includes a material storage container 3380 and an extruder 3382. Solid material is stored in material storage container 3380 and transferred to extruder 3382. Extruder 3382 receives material from material storage container 3380 and melts the material producing a melt. The melt is transferred to metered melt pump 3385 that meters and pumps the molten material though the conduit 3386 to the fiber producing device. Conduit 3386 is formed of a material capable of transporting the heated material from the extruder to the fiber producing device. In some embodiments, conduit 3386 is at least partially surrounded by insulation 3384 to inhibit cooling of the heated material as it is transferred to the fiber producing device. Heating devices 3370 and 3372 are used to keep the fiber producing device at a sufficient temperature to maintain the material in a melted state.

In an alternate embodiment, extruder 3382 may be replaced with a material feed hopper. Material feed hopper may be used to channel a solid material disposed in material storage container 3380 directly into the fiber producing device. The fiber producing device may be heated to melt at least a portion of the solid material that is transferred from the material storage container into the fiber producing device. Heating devices, as described previously, may be used to heat the fiber producing device prior to or after the solid material is placed in the fiber producing device. In this manner, the use of an extruder and insulated conduits may be avoided, reducing the energy requirements of the system.

Figure 35:
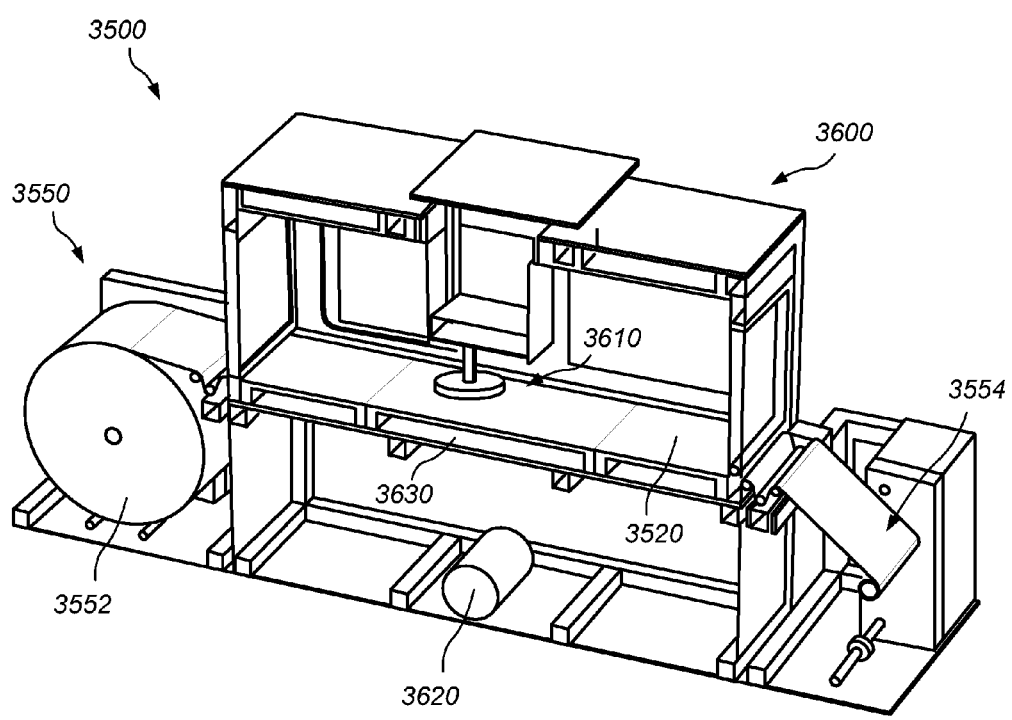
FIG. 35 depicts a substrate deposition system.

A top driven fiber producing system is particularly useful for depositing fibers onto a substrate. An embodiment of a system for depositing fibers onto a substrate is shown in FIG. 35. Substrate deposition system 3500 includes a deposition system 3600 and a substrate transfer system 3550. Deposition system 3600 includes a fiber producing system 3610, as described herein. Deposition system produces and directs fibers produced by a fiber producing device toward a substrate 3520 disposed below the fiber producing device during use. Substrate transfer system moves a continuous sheet of substrate material through the deposition system.

Figure 36:
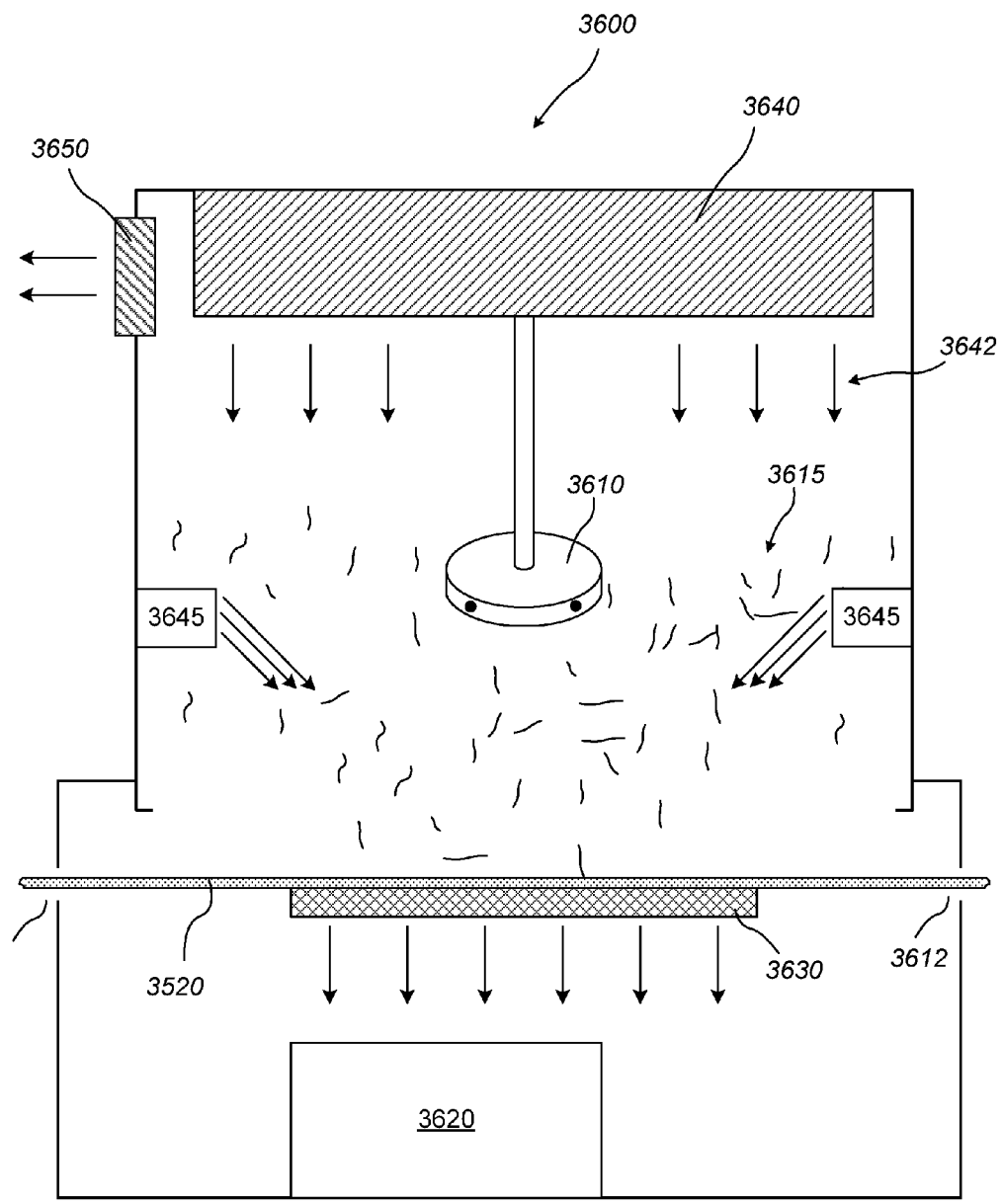
FIG. 36 depicts a fiber deposition system.

Deposition system 3600, in one embodiment, includes a top mounted fiber producing device 3610. During use, fibers produced by fiber producing device 3610 are deposited onto substrate 3520. A schematic diagram of deposition system 3600 is depicted in FIG. 36. Fiber deposition system may include one or more of: a vacuum system 3620, an electrostatic plate 3630, and a gas flow system 3640. A vacuum system produces a region of reduced pressure under substrate 3520 such that fibers produced by fiber producing device 3610 are drawn toward the substrate due to the reduced pressure. Alternatively, one or more fans may be positioned under the substrate to create an air flow through the substrate. Gas flow system 3640 produces a gas flow 3642 that directs fibers formed by the fiber producing device toward the substrate. Gas flow system may be a pressurized air source or one or more fans that produce a flow of air (or other gase). The combination of vacuum and air flow systems are used to produce a "balanced air flow" from the top of the deposition chamber through the substrate to the exhaust system by using forced air (fans, pressurized air) and exhaust air (fans, to create an outward flow) and balancing and directing the airflow to produce a fiber deposition field down to the substrate. Deposition system 3600 includes substrate inlet 3614 and substrate outlet 3612.

An electrostatic plate 3630 is also positioned below substrate 3520. The electrostatic plate is a plate capable of being charged to a predetermined polarity. Typically, fibers produced by the fiber producing device have a net charge. The net charge of the fibers may be positive or negative, depending on the type of material used. To improve deposition of charged fibers, an electrostatic plate may be disposed below substrate 3520 and be charged to an opposite polarity as the produced fibers. In this manner, the fibers are attracted to the electrostatic plate due to the electrostatic attraction between the opposite charges. The fibers become embedded in the substrate as the fibers move toward the electrostatic plate.

A pressurized gas producing and distribution system may be used to control the flow of fibers toward a substrate disposed below the fiber producing device. During use fibers produced by the fiber producing device are dispersed within the deposition system. Since the fibers are composed primarily of microfibers and/or nanofibers, the fibers tend to disperse within the deposition system. The use of a pressurized gas producing and distribution system may help guide the fibers toward the substrate. In one embodiment, a pressurized gas producing and distribution system includes a downward gas flow device 3640 and a lateral gas flow device 3645. Downward gas flow device 3640 is positioned above or even with the fiber producing device to facilitate even fiber movement toward the substrate. One or more lateral gas flow devices 3645 are oriented perpendicular to or below the fiber producing device. In some embodiment, lateral gas flow devices 3645 have an outlet width equal to the substrate width to facilitate even fiber deposition onto substrate. In some embodiments, the angle of the outlet of one or more lateral gas flow devices 3645 may be varied to allow better control of the fiber deposition onto the substrate. Each lateral gas flow devices 3645 may be independently operated.

During use of the deposition system, fiber producing device 3610 may produce various gasses due to evaporation of solvents (during solution spinning) and material gasification (during melt spinning). Such gasses, if accumulated in the deposition system may begin to effect the quality of the fiber produced. In some embodiment, the deposition system includes an outlet fan 3650 to remove gasses produced during fiber production from the deposition system.

Substrate transfer system 3550, in one embodiment, is capable of moving a continuous sheet of substrate material through the deposition system. In one embodiment, substrate transfer system 3550 includes a substrate reel 3552 and a take up reel system 3554. During use, a roll of substrate material is placed on substrate reel 3552 and threaded through deposition system 3600 to the substrate take up reel system 3554. During use, substrate take up reel system 3554 rotates, pulling substrate through deposition system at a predetermined rate. In this manner, a continuous roll of a substrate material may be pulled through fiber deposition system.

Figure 37:
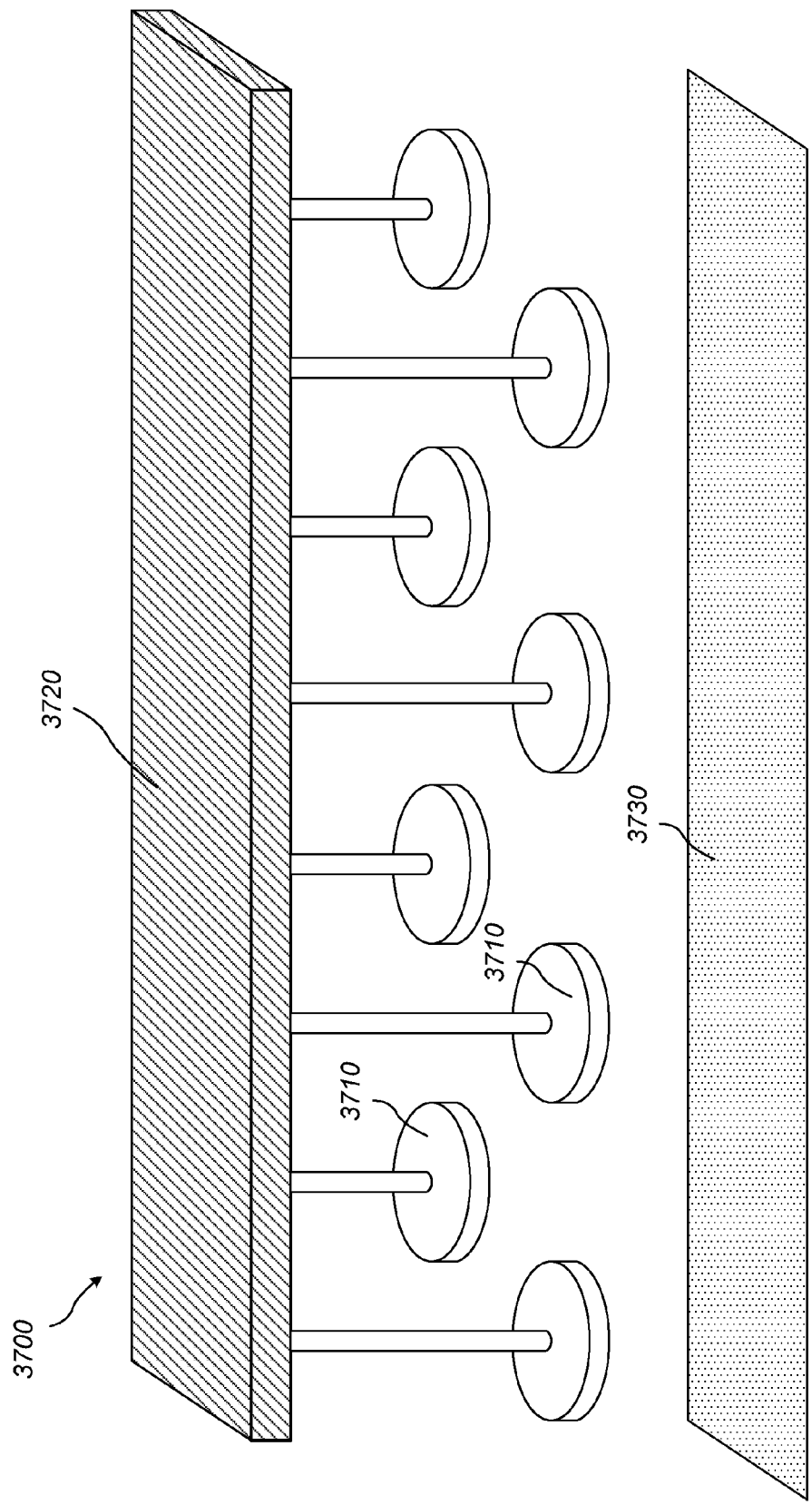
FIG. 37 depicts a deposition system that includes multiple fiber producing devices.

In some embodiments, it may be difficult for a single fiber producing device to produce a sufficient amount of fibers to provide a desired level of fibers to an entire substrate. In order to ensure adequate and even coverage of fibers on a substrate, a substrate deposition system may include two or more fiber producing devices, as depicted in FIG. 37. A fiber deposition system 3700 may include two or more fiber producing devices 3710 coupled to a driver unit 3720. Driver unit is coupled to fiber producing devices 3710. In one embodiment, driver unit 3720 includes a plurality of drivers, each driver being coupled to a fiber producing device 3710. The drive unit includes a controller capable of individually operating each of the drive units such that two or more of the fiber producing devices substantially simultaneously produce fibers. In an alternate embodiment, driver unit includes a single driver that simultaneously operates all of the fiber producing devices coupled to the driver unit. In such an embodiment, all of the fiber producing devices substantially simultaneously produce fibers to ensure complete coverage of the underlying substrate 3730.

Figure 38A:
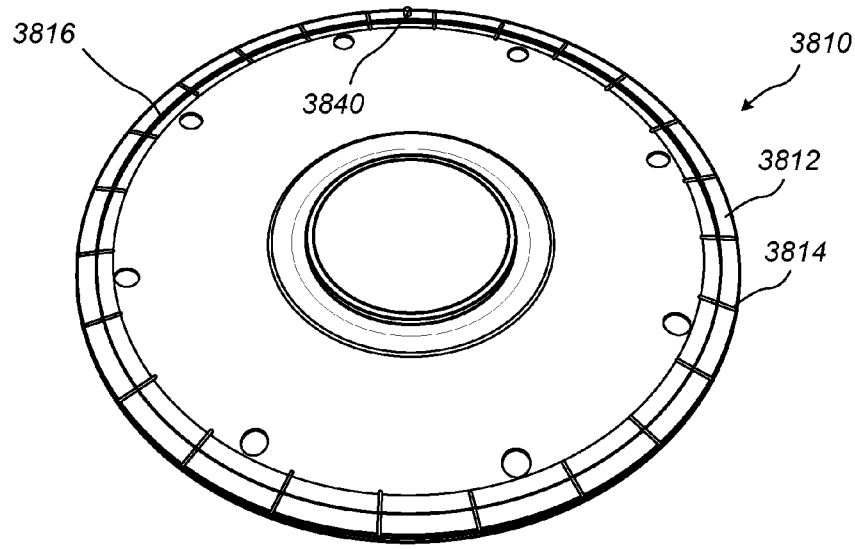
FIGS. 38A-D depict an embodiment of a fiber producing device.
Figure 38B:
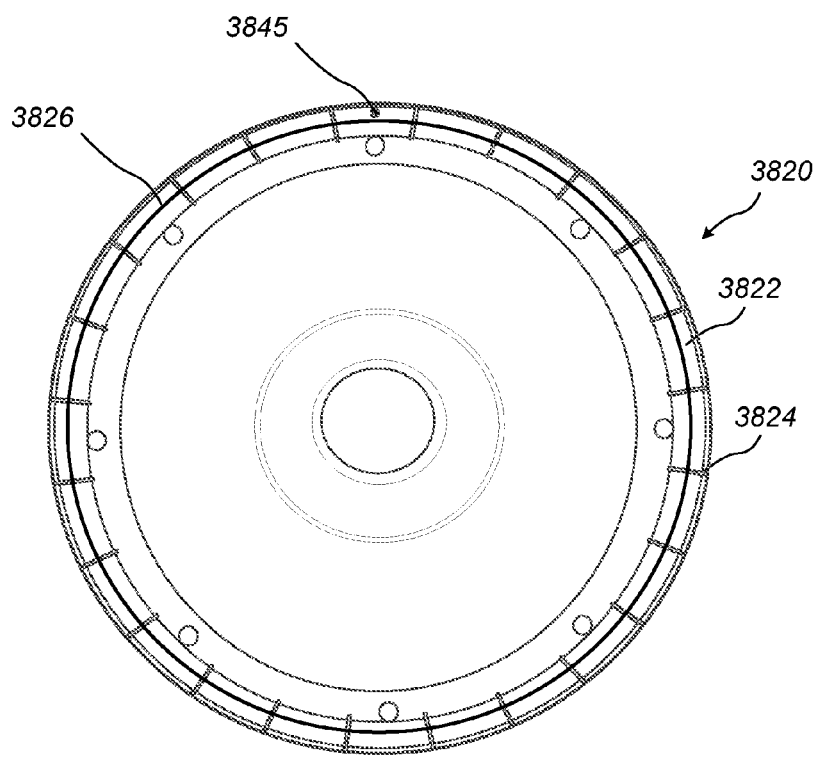
Figure 38C:
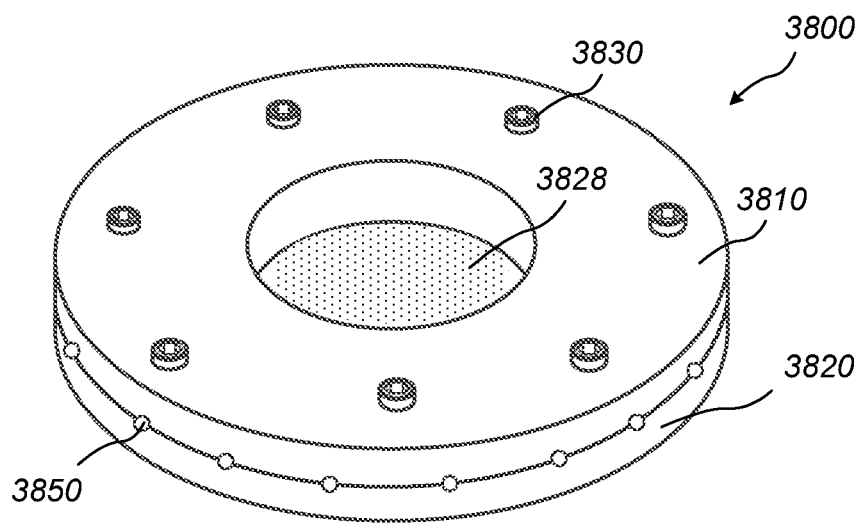

An embodiment of a fiber producing device is depicted in FIGS. 38A-C. Fiber producing device 3800 includes a body comprising a first member 3810 (FIG. 38A) and a second member 3820 (FIG. 38B). First member 3810 includes a first member coupling surface 3812. First member coupling surface 3812 includes one or more grooves 3814 extending along the width of the first member coupling surface. Second member 3820 includes a second member coupling surface 3822 and a coupling member 3828. Second member coupling surface 3822 comprising one or more grooves 3824 extending along the width of the second member coupling surface. Coupling member 3828 may be used to couple the body to a driver of a fiber producing system.

The body is formed by coupling first member 3810 to second member 3820. To couple the first and second members, first member coupling surface 3812 is contacted with second member coupling surface 3822. One or more fasteners 3830 may be used to secure the first member and second member together. When the first member coupling surface is coupled to the second member coupling surface to form the body, the first member and the second member together define an internal cavity of the body. In one embodiment, fasteners 3830 have an effect on the pattern of fiber produced by the fiber producing device. For example, the head of a fastener produces external gas currents due to the high speed of rotation of the fiber producing device. Additional components may be added on either side of the body or incorporated directly onto the surface of the body to produce external gas currents. These external gas currents can effect the pattern of fibers produced. The pattern of fibers produced by the fiber producing device may be altered by using fasteners having different head configurations. Alternatively, the position of fasteners may be altered to change the fiber deposition pattern. For example, the one or more fasteners may be left out of existing holes. Alternatively, the body may include a plurality of holes. The pattern of fibers produced by the fiber producing device may be altered by changing which of the plurality of holes are used to couple the first and second members together. In another embodiment. The height of the fasteners may be altered by loosing and or tightening the fasteners. Thus the height of the head of one or more fasteners may be varied to alter the pattern of fibers produced by the fiber producing device.

In some embodiments, it is desirable that grooves 3814 of the first member are substantially aligned with groves 3824 of the second member. When the grooves are aligned, the grooves together form one or more openings 3850 extending from the interior cavity to an outer surface of the body. During use, rotation of the body material disposed in the internal cavity of the body is ejected through one or more openings 3850 to produce microfibers and/or nanofibers. Material may be placed into the body of fiber producing through a first member opening 3828 formed in first member 3810. In one embodiment, first member is ring shaped and material is added to the internal cavity through a central opening of the ring shaped first member.

In order to ensure proper alignment of the first member with the second member, the first member may include a first alignment element 3816 disposed on the first coupling member surface 3812. The second member may include a second alignment element 3826 disposed on the second member coupling surface 3822. First alignment element 3816 couples with second alignment element 3826 when first member 3810 is properly aligned with second member 3820. This may help to ensure that grooves 3814 and 3824 are properly aligned. In one embodiment, one of the first or second alignment elements includes a projection extending form the coupling surface, and the other of the first or second alignment elements includes an indentation complementary to the projection.

In an embodiment, the first alignment element may be a first alignment ring 3816 disposed on the first coupling member surface 3812. The second member may include a second alignment ring 3826 disposed on the second member coupling surface 3822. First alignment ring 3816 interlocks with second alignment ring 3826 when first member 3810 is properly aligned with second member 3820. The interlocking first and second rings center the first member and second member with each other. In one embodiment, first and second rings interlock with each other on an angle so that the first and second members are centered to one another. Alignment is further insured by the use of a projection 3840 formed in the first member which fits into a suitable indentation 3845 formed in the second member. Projection 3840 and indentation 3845 help ensure that the first and second members are coupled in the same rotational position such that the grooves of the first and second members are aligned.

In an embodiment, where the fiber producing device is coupled to a driver positioned above the fiber producing device, the coupling member extends through the internal cavity defined by the first and second members and through the first member. Alternatively, where the fiber producing device is coupled to a driver positioned below the fiber producing device, the coupling member is coupled to an outer surface of the second member, extending away from the second member.

Figure 38D:
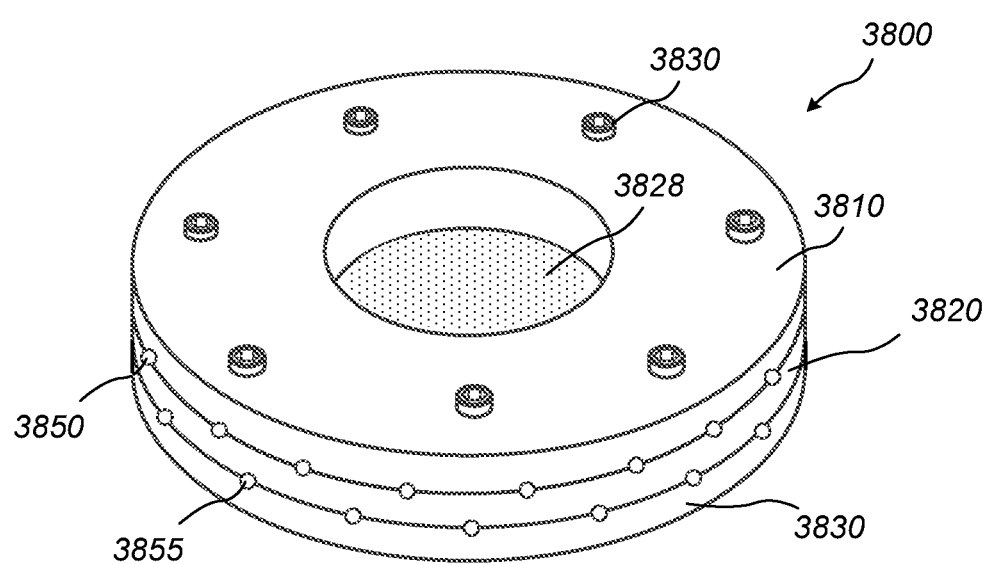

An embodiment of a multiple layer fiber producing device is depicted in FIG. 38D. Fiber producing device 3800 includes a body comprising a first member 3810, a second member 3820, and a third member 3830. It should be understood that while three members are shown, any number of members may be coupled together to form a multiple layer fiber producing device. The body is formed by coupling first member 3810 to second member 3820 and second member to third member 3830. Second member includes a second member coupling surface and an additional coupling surface, disposed on the side opposite to the second member coupling surface. Both the second member coupling surface and the second member additional coupling surface include grooves extending along the width of the respective surfaces. First and second members couple together by contacting first member coupling surface with the second member coupling surface. Grooves of the first member are substantially aligned with groves of the second member to form one or more openings 3850 extending from the interior cavity to an outer surface of the body. Second and third members also couple together by contacting the second member additional coupling surface with the third member coupling surface. Grooves of the second member additional coupling surface are substantially aligned with groves of the third member coupling surface to form one or more openings 3850 extending from the interior cavity to an outer surface of the body.

During use, material disposed in the internal cavity of the body is ejected through one or more openings 3850 and one or more openings 3855 to produce microfibers and/or nanofibers. Material may be placed into the body of fiber producing through a first member opening formed in first member 3828. In one embodiment, material is added to the internal cavity through a central opening of the first member.

Figure 39:
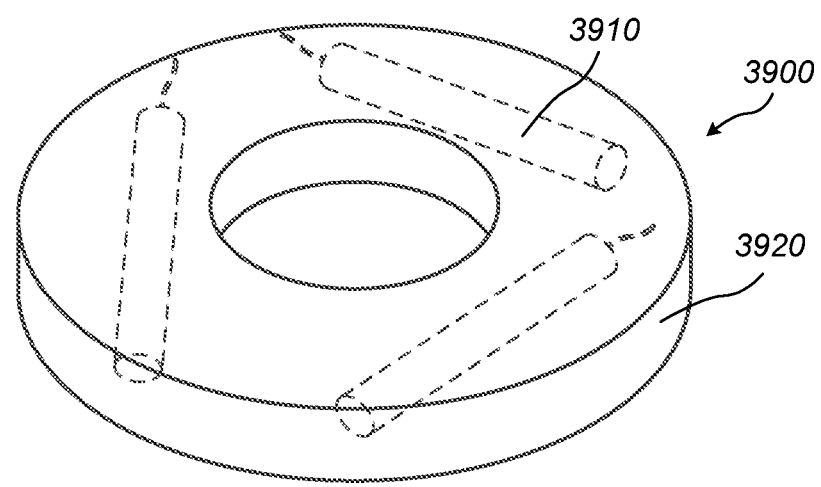
FIG. 39 depicts an embodiment of a heating device.

An embodiment of a heating device 3900 is depicted in FIG. 39. One or more heating elements 3910 are coupled to a heating device substrate 3920. Heating substrate 3920 is formed of a thermally conductive material (e.g., stainless steel, iron, etc.). Heating elements 3910 may provide heat to heat substrate 3920. Substrate 3920 is thermally coupled to one or more components of a fiber producing system (e.g., a fiber producing device). In one embodiment, heating elements 3910 may be cartridge heaters that are disposed within substrate 3920. For example, one or more openings may be formed in substrate 3920 and the cartridge heaters disposed in the openings. During use, an electric current may be applied to one or more of the cartridge heaters to heat the substrate.

While the heating device is depicted as having a ring shaped substrate, it should be understood that other shapes may be used.

In an alternate embodiments, a heating device used to heat a fiber producing device is a radiant heater. An infrared heater is an example of a radiant heater that may be used to heat a fiber producing device.

Figure 40:
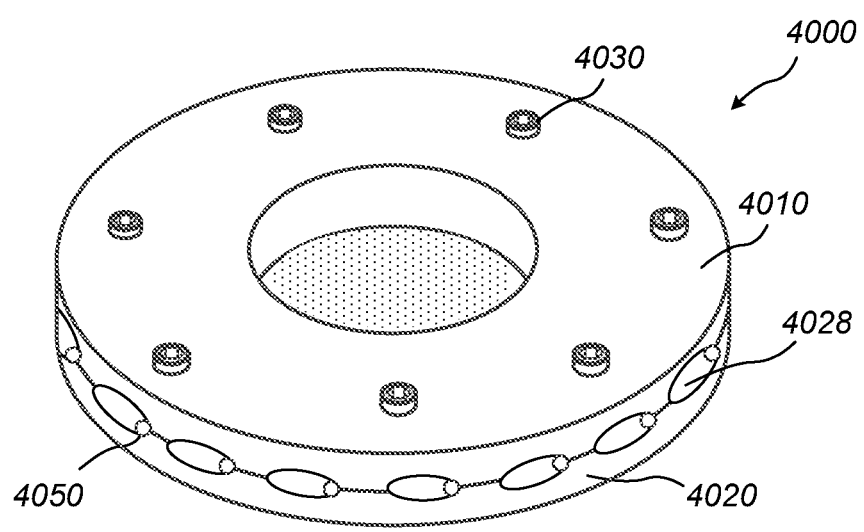
FIG. 40 depicts an alternate embodiment of a fiber producing device.

An embodiment of a fiber producing device is depicted in FIG. 40. Fiber producing device 4000 includes a body comprising a first member 4010 and a second member 4020. The body is formed by coupling first member 4010 to second member 4020. First and second members couple together by contacting first member coupling surface with second member coupling surface. In some embodiments, it is desirable that grooves of the first member are substantially aligned with groves of the second member. When the grooves are aligned, the grooves together form one or more openings 4050 extending from the interior cavity to an outer surface of the body. During use, rotation of the body material disposed in the internal cavity of the body is ejected through one or more openings 4050 to produce microfibers and/or nanofibers. Material may be placed into the body of fiber producing through a first member opening formed in first member 4010. In one embodiment, first member is ring shaped and material is added to the internal cavity through a central opening of the ring shaped first member.

One or more fasteners 4030 may be used to secure the first member and second member together. When the first member coupling surface is coupled to the second member coupling surface to form the body, the first member and the second member together define an internal cavity of the body. One or more channels 4028 may be added on either side of the body surrounding openings 4050 and extending away from the openings. Channels 4028 help alter the external gas currents produced when the fiber producing device is spinning. These external gas currents can affect the pattern of fibers produced and/or the size of the fibers produced. The pattern of fibers produced by the fiber producing device may be altered by using channels having different sizes and/or shapes. In some embodiments, channels 4028 are concave channels that allow the fiber producing material ejected from the openings to run along the channel and be ejected at an angle away from the body.

Figure 41A:
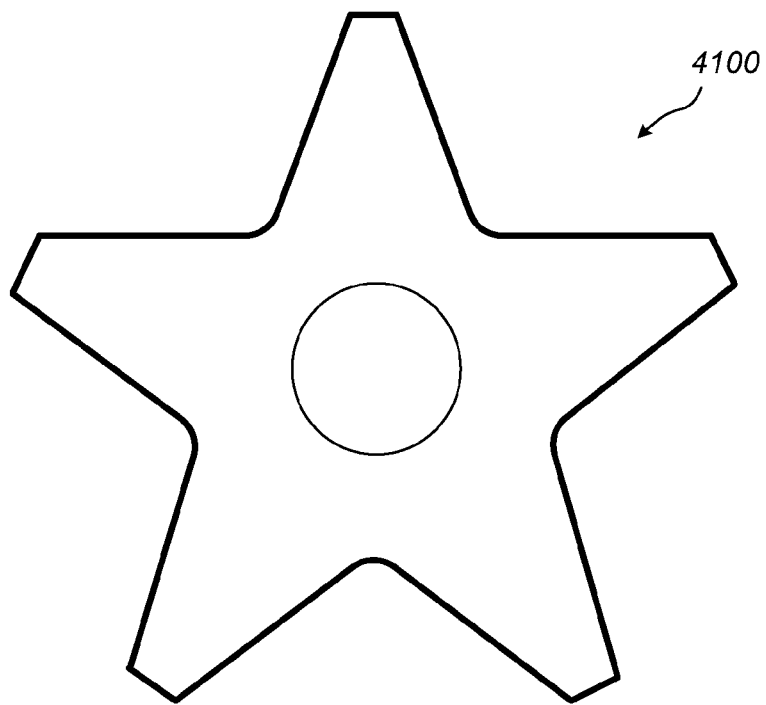
FIG. 41a-b depict a star shaped fiber producing device.
Figure 41B:
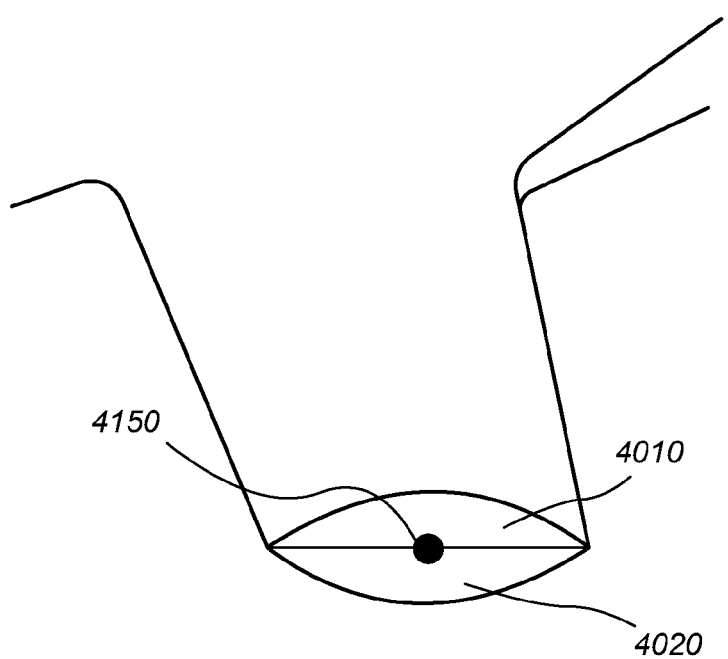
Figure 42:
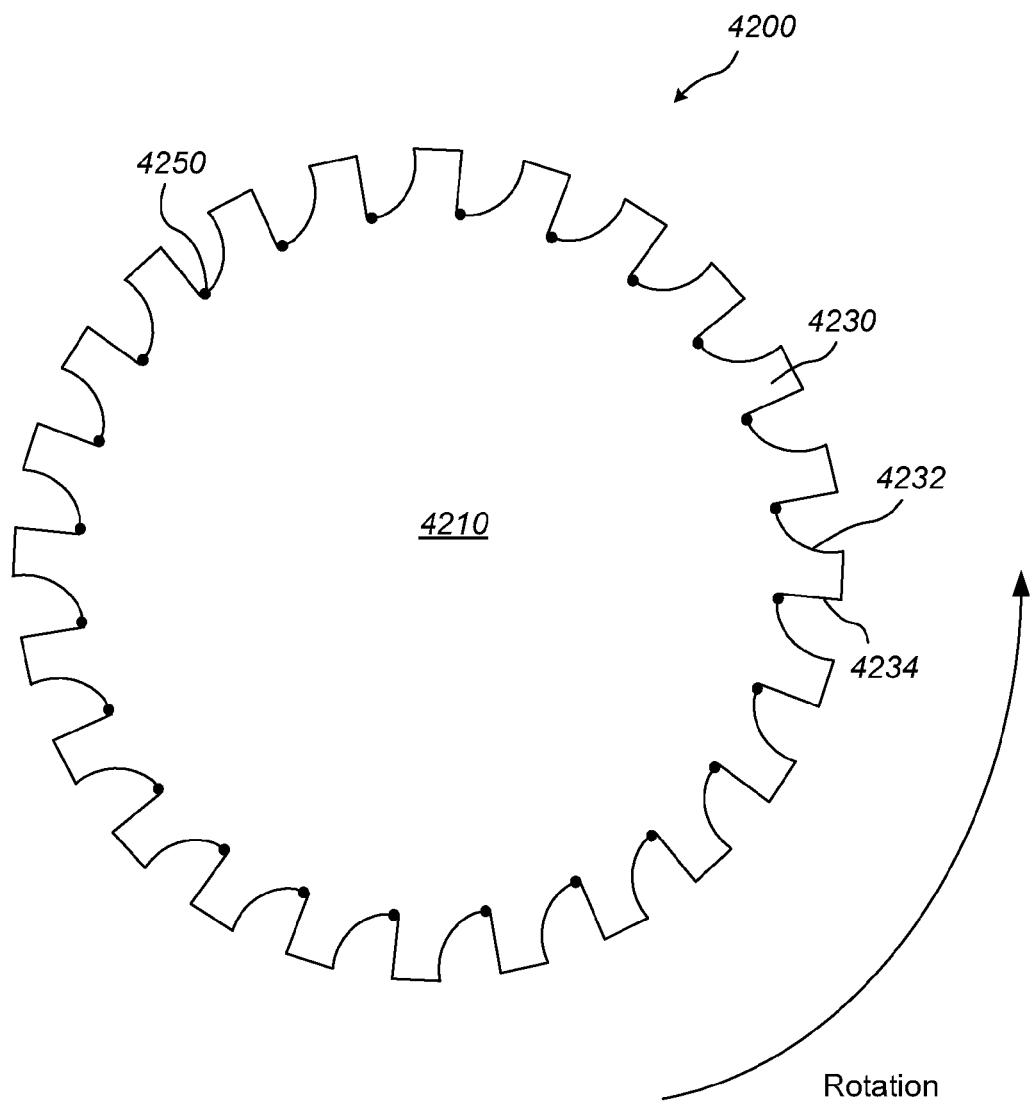
FIG. 42 depicts a gear shaped fiber producing device.

Fiber producing devices may be formed in different shapes. Non-limiting examples of fiber producing devices having alternate shapes are depicted in FIGS. 41A-B and FIG. 42. In an embodiment depicted in FIG. 41A, fiber producing device 4100 includes a body that is in the form of a star. The body of the fiber producing device is composed of a first member 4110 and a second member 4120, as depicted in FIG. 41B. The body is formed by coupling first member 4110 to second member 4120. First and second members couple together by contacting first member coupling surface with second member coupling surface. In some embodiments, it is desirable that grooves of the first member are substantially aligned with groves of the second member. When the grooves are aligned, the grooves together form one or more openings 4150 extending from the interior cavity to an outer surface of the body. During use, rotation of the body material disposed in the internal cavity of the body is ejected through one or more openings 4150 to produce microfibers and/or nanofibers. Material may be placed into the body of fiber producing through a first member opening formed in first member 3810. In one embodiment, material is added to the internal cavity through a central opening 4140 of the first member. In some embodiments, each arm of fiber producing device 4100 may have an aerodynamic profile. The use of an aerodynamic profile may reduce drag forces on the fiber producing device as the device is spun during use. Additionally, the profile of the arms may be adjusted to control the physical properties of the fibers being produced.

In another embodiment, a gear shaped fiber producing device, as depicted in FIG. 42 may be used to produce nanofibers and/or microfibers. Gear shaped fiber producing device 4200 may be formed from a single unitary device, or from two or more separate pieces that are coupled together as had been described above. Fiber producing device 4200 includes a plurality of protruding segments 4230 extending from central body 4210. Each segment 4230 is defined by sidewalls 4232 and 4234. Sidewalls 4232 are substantially straight, while sidewalls 4234 are curved. The segments 4230 are positioned such that the straight sidewalls 4232 of a segment are positioned across from the curved sidewall of an adjacent segment 4234. Thus a gap is formed between the segments having a curved and straight boundary.

In contrast to other fiber producing devices, openings 4250 are formed in between the protruding segments 4230, rather than at the end of the segments. During use, material disposed in the body of fiber producing device 4200 is ejected through openings 4250. When the fiber producing device is rotating, the material exits openings 4250 and is carried to the curved sidewalls 4234. The material runs along the curved sidewalls and is ejected from the fiber producing device. The amount of arc on curved sidewalls 4234 may be adjusted to alter the size and/or direction that the fibers are produced.

APPLICATIONS

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, non-woven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for use in a microfiber and/or nanofiber producing system, the device comprising:
    a body comprising a plurality of openings and a coupling member, wherein the body is configured to receive material to be produced into a fiber;
    needle ports coupled to the openings, wherein needles are removably couplable to the needle ports during use; and
    needles coupled to one or more of the needle ports, wherein at least one needle comprises an opening having a diameter and/or shape that produces microfibers during use, and wherein at least one needle comprises an opening having a diameter and/or shape that produces nanofibers during use;
    wherein, during use, rotation of the body coupled to the driver causes material in the body to be ejected through one or more needles to produce microfibers and nanofibers.

2. The device of claim 1, wherein the body comprises one or more sidewalls and a top, together defining an internal cavity, wherein one or more openings extend through a sidewall of the body, communicating with the internal cavity.

3. The device of claim 1, wherein the body comprises one or more sidewalls and a top, together defining an internal cavity, and wherein an interior surface of the sidewall is angled from a bottom wall toward one or more of the openings.

4. The device of claim 1, wherein the body comprises one or more sidewalls and a top, together defining an internal cavity, and wherein an interior surface of the sidewall is rounded from a bottom wall toward one or more of the openings.

5. The device of claim 1, wherein the body comprises one or more sidewalls and a top, together defining an internal cavity, and wherein an interior surface of the sidewall has an oval shape such that the long axis of the oval interior sidewall is in alignment with one or more of the openings.

6. A microfiber and/or nanofiber producing system comprising:
    a fiber producing device comprising:
        a body comprising a plurality of openings and a coupling member, wherein the body is configured to receive material to be produced into a fiber;
        needle ports coupled to the openings, wherein needles are removably couplable to the needle ports during use; and
        needles coupled to one or more of the needle ports, wherein at least one needle comprises an opening having a diameter and/or shape that produces microfibers during use, and wherein at least one needle comprises an opening having a diameter and/or shape that produces nanofibers during use;
    a driver capable of rotating the fiber producing device, wherein the fiber producing device is couplable to the driver through the coupling member;
    wherein, during use, rotation of the fiber producing device coupled to the driver causes material in the body to be ejected through one or more needles to produce microfibers and nanofibers.

7. The system of claim 6, wherein the driver is positioned above the fiber producing device, when the fiber producing device is coupled to the driver.

8. The system of claim 6, further comprising a heating device thermally coupled to the fiber producing device.

9. The system of claim 8, wherein the heating device comprises one or more heating elements coupled to a ring-shaped substrate.

10. The system of claim 8, wherein the heating device comprises an infrared radiant heater.

11. The system of claim 6, wherein the fiber producing device is enclosed in a chamber, and wherein the environment inside the chamber is controllable.

12. The system of claim 6, wherein the driver is capable of rotating the fiber producing device at speeds of greater than about 1000 rpm.

13. The system of claim 6, further comprising a collection system surrounding at least a portion of the fiber producing device, wherein fibers produced during use are at least partially collected on the collection system.

14. The system of claim 13, wherein the collection system comprises one or more collection elements coupled to a collection substrate, wherein the one or more collection elements at least partially surround the fiber producing device.

15. The system of claim 14, wherein the collection elements comprise a projection extending from the collection substrate surface.

16. A method of producing microfibers and/or nanofibers, comprising:
    placing material in a fiber producing device, the fiber producing device comprising:

a body comprising a plurality of openings and a coupling member, wherein the body is configured to receive material to be produced into a fiber; and needle ports coupled to the openings, wherein needles are removably couplable to the needle ports during use; and needles coupled to one or more of the needle ports, wherein at least one needle comprises an opening having a diameter and/or shape that produces microfibers during use, and wherein at least one needle comprises an opening having a diameter and/or shape that produces nanofibers during use;

rotating the fiber producing device at a speed of at least about 1000 rpm, wherein rotation of the fiber producing device causes material in the body to be passed through one or more needles to produce microfibers and nanofibers; and collecting at least a portion of the produced microfibers and nanofibers.

17. The device of claim 1, wherein one or more of the needle ports are luer-lock connectors.

18. The device of claim 1, wherein one or more of the needle ports are removable couplable to the body.

19. The device of claim 1, further comprising one or more outlet conduits coupling one or more of the needle ports to one or more of the openings.

20. The device of claim 1, further comprising a sealing ring positioned between one or more of the needle ports and the body.

21. The device of claim 1, wherein one or more of the needle ports comprise a locking member positioned to inhibit removal of a needle positioned in a needle port during use.

22. The device of claim 1, wherein one or more of the needle ports comprise a locking system used to couple a needle to the needle port, wherein the locking system locks the coupled needle in a predetermined orientation with respect to the body.

23. The method of claim 16, wherein the fibers are formed without subjecting the material to an externally-applied electric field that is sufficient to draw a fiber from the openings of the fiber producing device.

24. The method of claim 16, further comprising:
heating the material to a temperature sufficient to at least partially melt the material;
heating the fiber producing device to a temperature at or near the temperature sufficient to at least partially melt the material; and
placing the heated material in the heated fiber producing device.

25. The method of claim 16, further comprising:
placing material in a fiber producing device; and
heating the fiber producing device to a temperature at or near the temperature sufficient to at least partially melt the material disposed in the fiber producing device.

26. The method of claim 16, further comprising mixing the material with a solvent to produce a mixture of the material in a solvent, and placing the mixture in the fiber producing device.

* * * * *